United States Patent
Lee et al.

(10) Patent No.: US 9,307,272 B2
(45) Date of Patent: Apr. 5, 2016

(54) PURCHASE TRANSACTION METHOD FOR IPTV PRODUCT AND IPTV RECEIVER THEREOF

(75) Inventors: Joonhui Lee, Seoul (KR); Gomer Thomas, Arlington, WA (US); Hyeonjae Lee, Seoul (KR); Kyungho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 13/087,113

(22) Filed: Apr. 14, 2011

(65) Prior Publication Data

US 2011/0258654 A1 Oct. 20, 2011

Related U.S. Application Data

(60) Provisional application No. 61/326,216, filed on Apr. 20, 2010, provisional application No. 61/324,753, filed on Apr. 16, 2010, provisional application No. 61/422,662, filed on Dec. 14, 2010, provisional application No. 61/435,796, filed on Jan. 25, 2011.

(51) Int. Cl.
| | |
|---|---|
| *H04N 7/16* | (2011.01) |
| *H04N 21/2362* | (2011.01) |
| *H04N 21/45* | (2011.01) |
| *H04N 21/472* | (2011.01) |
| *H04N 21/6405* | (2011.01) |
| *H04N 21/6408* | (2011.01) |
| *H04N 21/643* | (2011.01) |
| *H04N 21/658* | (2011.01) |

(52) U.S. Cl.
CPC ....... *H04N 21/2362* (2013.01); *H04N 21/4516* (2013.01); *H04N 21/47202* (2013.01); *H04N 21/47211* (2013.01); *H04N 21/6405* (2013.01); *H04N 21/6408* (2013.01); *H04N 21/64322* (2013.01); *H04N 21/6581* (2013.01)

(58) Field of Classification Search
USPC .................................................. 725/1, 86–87
See application file for complete search history.

(56) References Cited

U.S. PATENT DOCUMENTS

| | | | | |
|---|---|---|---|---|
| 8,756,103 | B1 * | 6/2014 | Amidon et al. | 705/14.4 |
| 2003/0229898 | A1 * | 12/2003 | Babu et al. | 725/87 |
| 2006/0064716 | A1 * | 3/2006 | Sull et al. | 725/37 |
| 2009/0132383 | A1 | 5/2009 | Piepenbrink et al. | |
| 2011/0258654 | A1 * | 10/2011 | Lee et al. | 725/1 |

FOREIGN PATENT DOCUMENTS

| | | |
|---|---|---|
| KR | 10-2009-0101079 A | 9/2009 |
| WO | WO 2009/143891 A1 | 12/2009 |

* cited by examiner

*Primary Examiner* — Pankaj Kumar
*Assistant Examiner* — Charles N Hicks
(74) *Attorney, Agent, or Firm* — Dentons US LLP

(57) ABSTRACT

A purchase transaction method for IPTV product and IPTV receiver thereof using the same are provided. The purchase transaction method for IPTV product includes requesting to make a purchase for a offering by using a identifier of the offering, wherein the offering is a combination of one or more products to be purchased and purchase terms for the products; and obtaining a response returned from the request to indicate success or failure of the requested purchase.

25 Claims, 55 Drawing Sheets

FIG.9

```
<complexType name="ProgramInformationType">
    <sequence>
        <element name="BasicDescription"
            type = "epg:BasicContentDescriptionType"/>
        <element name="OtherIdentifier"
            type = "mpeg7:UniqueIDType"
            minOccurs = "0"
            maxOccurs = "unbounded"/>
        <element name="AVAttributes"
            type = "epg:AVAttributesType"
            minOccurs = "0"/>
        <element name="MemberOf"
            type = "tva:BaseMemberOfType"
            minOccurs = "0"
            maxOccurs = "unbounded"/>
        <element name="DerivedFrom"
            type = "tva:DerivedFromType"
            minOccurs = "0"/>
        <element name="EpisodeOf"
            type = "tva:EpisodeOfType"
            minOccurs = "0"/>
        <element name="PartOfAggregatedProgram"
            type = "tva:CRIDType"
            minOccurs = "0"/>
        <element name="AggregationOf"
            type = "tva:AggregationOfType"
            minOccurs = "0"/>
    </sequence>
    <attribute name="programId"
        type = "tva:CRIDType"
        use = "required"/>
    <attribute name="metadataOriginIDRef"
        type = "tva:TVAIDRefType"
        use = "optional"/>
    <attribute ref = "xml:lang" use = "optional"/>
</complexType>
```

FIG.11

```
<complexType name="BasicContentDescriptionType">
    <sequence>
        <element name="Title" type="mpeg7:TitleType" minOccurs="0" maxOccurs="unbounded"/>
        <element name="MediaTitle" type="mpeg7:TitleMediaType" minOccurs="0"
maxOccurs="unbounded"/>
        <element name="ShortTitle" type="tva:ShortTitleType" minOccurs="0"
maxOccurs="unbounded"/>
        <element name="Synopsis" type="tva:SynopsisType" minOccurs="0" maxOccurs="unbounded"/>
        <element name="PromotionalInformation" type="mpeg7:TextualType" minOccurs="0"
maxOccurs="unbounded"/>
        <element name="ProgramURL" type="anyURI" minOccurs="0" maxOccurs="unbounded"/>
        <element name="ProgramInfoURL" type="anyURI" minOccurs="0" maxOccurs="unbounded"/>
        <element name="Keyword" type="tva:KeywordType" minOccurs="0" maxOccurs="unbounded"/>
        <element name="Genre" type="tva:GenreType" minOccurs="0" maxOccurs="unbounded"/>
        <element name="RRTParentalGuidance" type="epg:RRTParentalGuidanceType" minOccurs="0"
maxOccurs="unbounded"/>
        <element name="ParentalGuidance" type="mpeg7:ParentalGuidanceType" minOccurs="0"
maxOccurs="unbounded"/>
        <element name="Language" type="mpeg7:ExtendedLanguageType" minOccurs="0"
maxOccurs="unbounded"/>
        <element name="CaptionLanguage" type="tva:CaptionLanguageType" minOccurs="0"
maxOccurs="unbounded"/>
        <element name="SignLanguage" type="tva:SignLanguageType" minOccurs="0"
maxOccurs="unbounded"/>
        <element name="CreditsList" type="epg:CreditsListType" minOccurs="0"/>
        <element name="AwardsList" type="epg:AwardsListType" minOccurs="0"/>
        <element name="BoxOffice" type="tva:PriceType" minOccurs="0" maxOccurs="unbounded"/>
        <element name="RelatedMaterial" type="tva:RelatedMaterialType" minOccurs="0"
maxOccurs="unbounded"/>
        <element name="ProductionDate" type="tva:TVATimeType" minOccurs="0"/>
        <element name="ProductionLocation" type="mpeg7:regionCode" minOccurs="0"
maxOccurs="unbounded"/>
        <element name="CreationCoordinates" type="tva:CreationCoordinatesType" minOccurs="0"
maxOccurs="unbounded"/>
        <element name="DepictedCoordinates" type="tva:DepictedCoordinatesType" minOccurs="0" maxOccurs="unbounded"
maxOccurs="unbounded"/>
        <element name="ReleaseInformation" type="tva:ReleaseInformationType" minOccurs="0" maxOccurs="unbounded"
maxOccurs="unbounded"/>
        <element name="Duration" type="duration" minOccurs="0"/>
        <element name="PurchaseList" type="epg:PurchaseListType" minOccurs="0"/>
    </sequence>
    <attribute name="programFormat" use="optional">
     <simpleType>
      <restriction base="string">
        <enumeration value="Series"/>
        <enumeration value="Movie"/>
        <enumeration value="Paid program"/>
        <enumeration value="Special"/>
      </restriction>
     </simpleType>
    </attribute>
    <attribute name="copyRestrictions" type="epg:CopyControlInformationType" use="optional"/>
</complexType>
```

FIG.14

```
<complexType name="PurchaseItemType">
    <sequence>
      <element name="Price" type="tva:PriceType" maxOccurs="unbounded"/>
      <element name="Purchase" type="epg:PurchaseType" minOccurs="0" maxOccurs="unbounded"/>
      <element name="Description" type="mpeg7:TextualType" minOccurs="0" maxOccurs="unbounded"/>
      <element name="PricingServerURL" type="anyURI" minOccurs="0" maxOccurs="unbounded"/>
      <element name="Title" type="mpeg7:TextualType" maxOccurs="unbounded"/>
      <element name="ProgramInstance">
        <complexType>
          <sequence>
            <element name="Program" type="tva:CRIDRefType" minOccurs="0"/>
            <element name="Instance" type="epg:InstanceMetadataIdRefType"/>
          </sequence>
        </complexType>
      </element>
      <element name="DescriptionImage" minOccurs="0">
        <complexType>
          <complexContent>
            <extension base="mps:ResourceLocatorType">
              <attribute name="HorizontalSize" type="unsignedShort"/>
              <attribute name="VerticalSize" type="unsignedShort"/>
            </extension>
          </complexContent>
        </complexType>
      </element>
      <element name="AVAttributes" type="tva:AVAttributesType" minOccurs="0"/>
    </sequence>
    <attribute name="start" type="dateTime" use="optional"/>
    <attribute name="end" type="dateTime" use="optional"/>
    <attribute name="PurchaseID" type="tva:TVAIDType" use="optional"/>
</complexType>
```

FIG.15

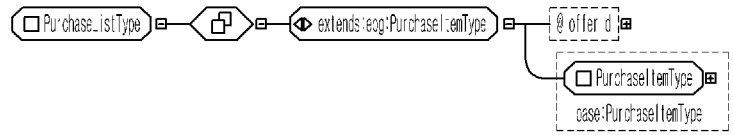

FIG.16

```
<complexType name="PurchaseListItemType">
    <complexContent>
        <extension base="epg:PurchaseItemType">
            <attribute name="offerId" type="gt:assetIdType" use="required"/>
        </extension>
    </complexContent>
</complexType>
```

FIG. 17

| Name | R/O | Semantics |
|---|---|---|
| PurchaseListItemType | | Type definition for an in-line PurchaseItem element in a purchase list. |
| offerId | R | The offerId attribute *shall* be a globally unique identifier, with the syntax and semantics of the CreatorAssetId defined in the ATIS CoD standard. It identifies the combination of the product to which the PurchaseList is attached and the purchase terms of this PurchaseListItem element. |

FIG. 18

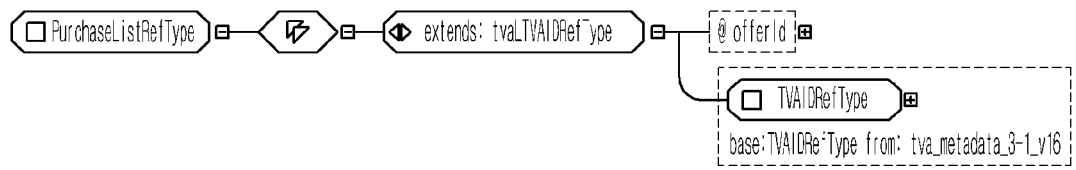

FIG. 19

```
<complexType name="PurchaseListRefType">
    <simpleContent>
        <extension base="tva:TVAIDRefType">
            <attribute name="offerId" type="gt:assetIdType" use="required"/>
        </extension>
    </simpleContent>
</complexType>
```

FIG.20

| Name | R/O | Semantics |
|---|---|---|
| PurchaseListRefType | | Type definition for a PurchaseIdRef element in a PurchaseList. This element references a PurchaseInformation element in the PurchaseInformationTable. |
| offerId | R | The offerId attribute *shall* be a globally unique identifier, with the syntax and semantics of the CreatorAssetId defined in the ATIS CoD standard.  It identifies the combination of the product to which the PurchaseList is attached and the purchase terms of the PurchaseInformation element referenced by this PurchaseListRef element. |

FIG.21

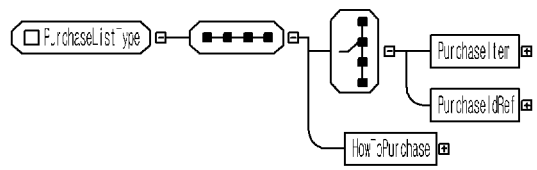

FIG.22

```
<complexType name="PurchaseListType">
   <sequence>
      <choice minOccurs="0" maxOccurs="unbounded">
         <element name="PurchaseItem" type="epg:PurchaseListItemType"/>
         <element name="PurchaseIdRef" type="epg:PurchaseListRefType"/>
      </choice>
      <element name="HowToPurchase" type="mpeg7:TextualType" minOccurs="0" maxOccurs="unbounded"/>
   </sequence>
</complexType>
```

FIG.23

| Name | R/O | Semantics |
|---|---|---|
| PurchaseListType | | Type definition for a purchase list. |
| PurchaseItem | O | In-line description of purchase terms for an offer. |
| PurchaseIdRef | O | Identifies a PurchaseInformation element in the PurchaseInformationTable which gives purchase terms for an offer. The value of the PurchaseIdRef element *shall* match the purchaseId attribute of a PurchaseInformation element in the PurchaseInformationTable. |
| HowToPurchase | O | Textual description of how to make a purchase; for example, what phone number to call. |

FIG.24

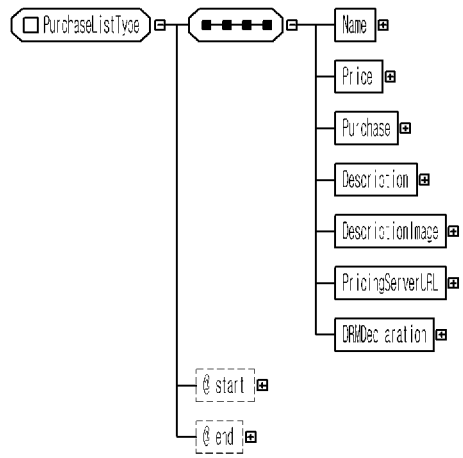

FIG.25

```
<complexType name="PurchaseItemType">
  <sequence>
    <element name="Name" type="mpeg7:TextualType" maxOccurs="unbounded"/>
    <element name="Price" type="tva:PriceType" maxOccurs="unbounded"/>
    <element name="Purchase" type="epg:PurchaseType" minOccurs="0" maxOccurs="unbounded"/>
    <element name="Description" type="mpeg7:TextualType" minOccurs="0" maxOccurs="unbounded"/>
    <element name="DescriptionImage" minOccurs="0">
      <complexType>
        <complexContent>
          <extension base="mps:ResourceLocatorType">
            <attribute name="HorizontalSize" type="unsignedShort"/>
            <attribute name="VerticalSize" type="unsignedShort"/>
          </extension>
        </complexContent>
      </complexType>
    </element>
    <element name="PricingServerURL" type="anyURI" minOccurs="0" maxOccurs="unbounded"/>
    <element name="DRMDeclaration" type="tva:DRMDeclarationType" minOccurs="0"/>
  </sequence>
  <attribute name="start" type="dateTime"/>
  <attribute name="end" type="dateTime"/>
</complexType>
```

FIG.26

| Name | R/O | Semantics |
|---|---|---|
| PurchaseItemType | | XML type for specifying purchase price and terms for an offer. |
| Name | R | Name for the price and terms represented by this PurchaseItem element – *may* have multiple instances for different languages. |
| Price | R | Price of the offer – *may* have multiple instances for different currencies. |
| Purchase | O | Purchase terms for the offer. The PurchaseType element of the Purchase element *shall* reference a Term in a suitable classification scheme, such as the TV-Anytime PurchaseTypeCS<br>The QuantityUnit element of the Purchase element *shall* reference a Term in a suitable classification scheme, such as the TV-Anytime UnitTypeCS |
| Description | O | Freeform text description of the offer – *may* have multiple instances in different languages. |
| DescriptionImage | O | A DescriptionImage element *shall* give a Locator for an image containing a description of the price and terms represented by this PurchaseItem element. |
| PricingServerURL | O | Pointer to server where additional information about offer is available. |
| DRMDeclaration | O | Digital rights information related to the offer. |
| start | O | Start date and time for period of validity of offer. |
| end | O | End date and time for period of validity of offer. |

FIG.27

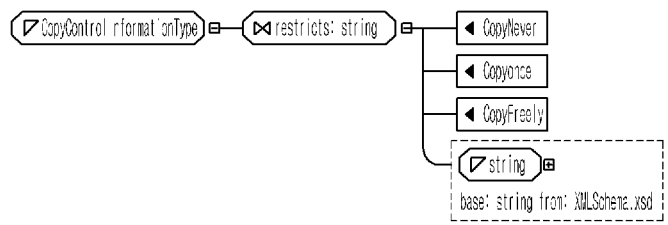

FIG.28

```
<simpleType name="CopyControlInformationType">
    <restriction base="string">
        <enumeration value="CopyNever"/>
        <enumeration value="CopyOnce"/>
        <enumeration value="CopyFreely"/>
    </restriction>
</simpleType>
```

FIG.29

| Name | R/O | Semantics |
|---|---|---|
| CopyControlInformationType | | XML type definition for specifying a copy control level. |
| CopyNever | | No copies are allowed. |
| CopyOnce | | One copy is allowed, but no more than one. |
| CopyFreely | | An unlimited number of copies are allowed. |

FIG.30

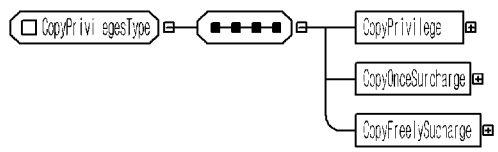

FIG.31

```
<complexType name="CopyPrivilegesType">
    <sequence>
        <element name="CopyPrivilege" type="epg:CopyControlInformationType"/>
        <element name="CopyOnceSurcharge" type="tva:PriceType" minOccurs="0"/>
        <element name="CopyFreelySurcharge" type="tva:PriceType" minOccurs="0"/>
    </sequence>
</complexType>
```

FIG.32

| Name | R/O | Semantics |
|---|---|---|
| CopyPrivilegesType | | XML type definition for specifying copy privileges included in base price, and optionally specifying prices for additional privileges. |
| CopyPrivilege | R | Copy privileges included in base price of offer. |
| CopyOnceSurcharge | O | Fee that can be paid to allow copying once, if that is not included in base price. |
| CopyFreelySurcharge | O | Fee that can be paid to allow copying freely, if that is not included in base price. |

FIG.33

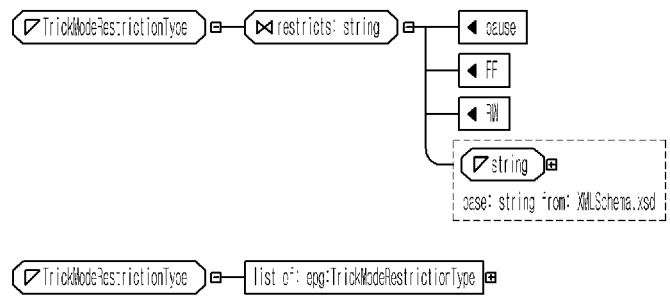

FIG.34

```
<simpleType name="TrickModeRestrictionType">
    <restriction base="string">
        <enumeration value="pause"/>
        <enumeration value="FF"/>
        <enumeration value="RW"/>
    </restriction>
</simpleType>

<simpleType name="TrickModeRestrictionsType">
    <list itemType="epg:TrickModeRestrictionType"/>
</simpleType>
```

FIG.35

| Name | R/O | Semantics |
|---|---|---|
| TrickModeRestrictionType | | XML type definition for kinds of trick modes that can be disallowed. |
| pause | | Pause. |
| FF | | Fast forward. |
| RW | | Rewind. |

| Name | R/O | Semantics |
|---|---|---|
| TrickModeRestrictionsType | | Type definition for list of trick modes which are disallowed. |

FIG.36

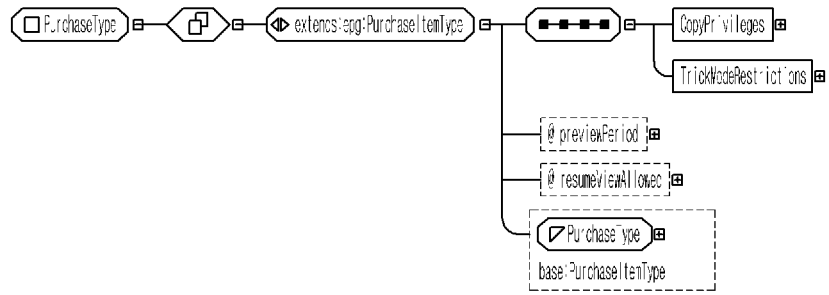

FIG.37

```
<complexType name="PurchaseType">
    <complexContent>
        <extension base="tva:PurchaseType">
            <sequence>
                <element name="CopyPrivileges" type="epg:CopyPrivilegesType" minOccurs="0"/>
                <element name="TrickModeRestrictions"
                    type="epg:TrickModeRestrictionsType" minOccurs="0"/>
            </sequence>
            <attribute name="previewPeriod" type="duration" use="optional"/>
            <attribute name="resumeViewAllowed" type="boolean" use="optional"/>
        </extension>
    </complexContent>
</complexType>
```

FIG. 38

| Name | R/O | Semantics |
|---|---|---|
| PurchaseType | | XML type definition for specifying purchase model for PPV or CoD offer. |
| CopyPrivileges | O | Copy privileges included in offer. |
| previewPeriod | O | Preview period allowed by offer; i.e., amount of time program can be played before incurring a charge. |
| resumeViewAllowed | O | Flag indicating whether consumer can pause the playout and resume later under this offer without paying an additional charge. |

FIG. 39

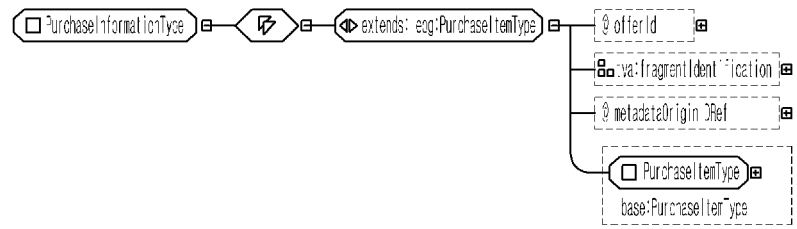

FIG. 40

```
<complexType name="PurchaseInformationType">
  <complexContent>
    <extension base="epg:PurchaseItemType">
      <attribute name="purchaseId" type="tva:TVAIDType" use="required"/>
      <attributeGroup ref="tva:fragmentIdentification"/>
      <attribute name="metadataOriginIDRef" type="tva:TVAIDRefType"/>
    </extension>
  </complexContent>
</complexType>
```

| Name | R/O | Semantics |
|---|---|---|
| purchaseId | R | Identifies the PurchaseInformation element. The purchaseId attribute *shall* be unique among all PurchaseInformation elements in the PurchaseInformationTable. |

FIG.43

```
<complexType name="ProgramInformationType">
   <sequence>
     <element name="BasicDescription" type="epg:BasicContentDescriptionType"/>
     <element name="OtherIdentifier" type="mpeg7:UniqueIDType" minOccurs="0" maxOccurs="unbounded"/>
     <choice minOccurs="0">
        <element name="AVAttributes" type="epg:AVAttributesType" minOccurs="0"/>
        <element name="MediaAttributes" type="epg:AVAttributesType" maxOccurs="unbounded"/>
     </choice>
     <element name="MemberOf" type="tva:BaseMemberOfType" minOccurs="0" maxOccurs="unbounded"/>
     <element name="DerivedFrom" type="tva:DerivedFromType" minOccurs="0"/>
     <element name="EpisodeOf" type="tva:EpisodeOfType" minOccurs="0"/>
     <element name="PartOfAggregatedProgram" type="tva:CRIDType" minOccurs="0"/>
     <element name="AggregationOf" type="tva:AggregationOfType" minOccurs="0"/>
     <element name="RequiredEEProfile" type="itfee:ISSProfileLevelType" minOccurs="0" maxOccurs="unbounded"/>
   </sequence>
   <attribute name="programId" type="tva:CRIDType" use="required"/>
   <attributeGroup ref="tva:fragmentIdentification"/>
   <attribute name="metadataOriginIDRef" type="tva:TVAIDRefType"/>
   <attribute ref="xml:lang"/>
</complexType>
```

FIG.44

| Name | R/O | Semantics |
|---|---|---|
| ProgramInformationType | | XML type for a ProgramInformation element giving information about a program. |
| BasicDescription | O | See TV-Anytime specification |
| OtherIdentifier | O | See TV-Anytime specification |
| AVAttributes | O | See TV-Anytime specification    The AVAttributes element is intended for use when the program has only a single media instance (encoding) associated with it, since only one instance of AVAttributes can appear. |
| MediaAttributes | O | Description of properties of a media instance (encoding) of the program described by an element of this BasicContentDescriptionType. The MediaAttributes element is intended for use when the program has multiple media instances (encodings) for it. |
| MemberOf | O | See TV-Anytime specification    The crid attribute of the MemberOf element *shall* match the GroupId of a GroupInformation element in the GroupInformationTable of this schema. |
| DerivedFrom | O | See TV-Anytime specification    The crid attribute of the DerivedFrom element *shall* match the ProgramId of a ProgramInformation element in the ProgramInformationTable of this schema. |
| EpisodeOf | O | See TV-Anytime specification    The crid attribute of the EpisodeOf element *shall* match the GroupIdD of a GroupInformation element in the GroupInformationTable of this schema. |
| PartOfAggregatedProgram | O | See TV-Anytime specification    The crid attribute of the PartOfAggregatedProgram element *shall* match the ProgramId of a ProgramInformation element in the ProgramInformationTable of this schema. |
| AggregationOf | O | See TV-Anytime specification    The crid attribute of each AggregatedProgram sub-element of the AggregationOf element *shall* each match the ProgramId of a ProgramInformation element in the ProgramInformationTable of this schema. |
| RequiredEEProfile | O | The RequiredEEProfile *shall* specify an Execution Environment profile needed in the ITF in order to play out the program. Multiple instances of this element are permitted, of which the Execution Environment in the ITF needs to match one in order to play out the program. When omitted, there is no requirement placed on the Execution Environment. |
| ProgramId | R | The ProgramId's "crid:" URL *shall* be a globally unique identifier for a program described by this ProgramInformation element. |

FIG.45

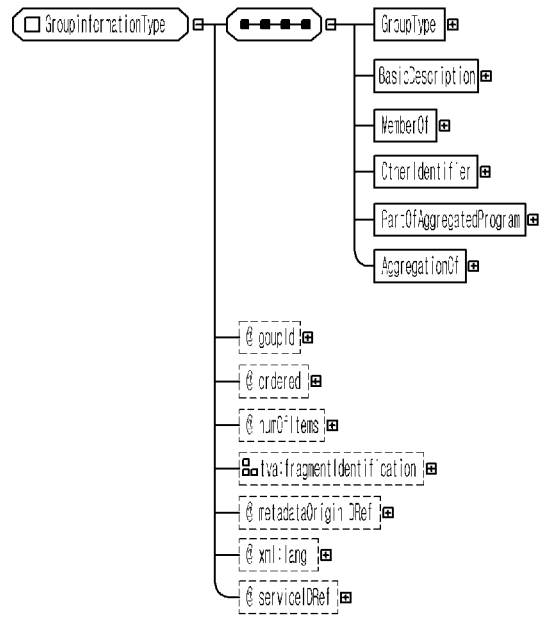

FIG.46

```
<complexType name="GroupInformationType">
  <sequence>
    <element name="GroupType" type="tva:BaseProgramGroupTypeType"/>
    <element name="BasicDescription" type="epg:BasicContentDescriptionType"/>
    <element name="MemberOf" type="tva:BaseMemberOfType" minOccurs="0" maxOccurs="unbounded"/>
    <element name="OtherIdentifier" type="mpeg7:UniqueIDType" minOccurs="0" maxOccurs="unbounded"/>
    <element name="PartOfAggregatedGroup" type="tva:CRIDType" minOccurs="0"/>
    <element name="AggregationOf" type="tva:AggregationOfType" minOccurs="0"/>
  </sequence>
  <attribute name="groupId" type="tva:CRIDType" use="required"/>
  <attribute name="ordered" type="boolean" default="false"/>
  <attribute name="numOfItems" type="unsignedInt"/>
  <attributeGroup ref="tva:fragmentIdentification"/>
  <attribute name="metadataOriginIDRef" type="tva:TVAIDRefType"/>
  <attribute ref="xml:lang"/>
  <attribute name="serviceIDRef" type="tva:TVAIDRefsType"/>
</complexType>
```

| Name | R/O | Semantics |
|---|---|---|
| MemberOf | O | Pointer to a super group of which the group is a member. The value of the crid attribute in this MemberOf element *shall* match the GroupId of a SuperGroupInformation element. |

FIG.49

```
<complexType name="SuperGroupInformationType">
  <sequence>
    <element name="GroupType" type="epg:SuperGroupTypeType"/>
    <element name="BasicDescription" type="epg:BasicContentDescriptionType"/>
    <element name="MemberOf" type="tva:BaseMemberOfType" minOccurs="0" maxOccurs="unbounded"/>
    <element name="OtherIdentifier" type="mpeg7:UniqueIDType" minOccurs="0" maxOccurs="unbounded"/>
  </sequence>
  <attribute name="groupId" type="tva:CRIDType" use="required"/>
  <attribute name="level" use="required">
    <simpleType>
      <restriction base="unsignedByte">
        <minInclusive value="3"/>
        <maxInclusive value="10"/>
      </restriction>
    </simpleType>
  </attribute>
  <attribute name="ordered" type="boolean" default="false"/>
  <attribute name="numOfItems" type="unsignedInt"/>
  <attributeGroup ref="tva:fragmentIdentification"/>
  <attribute name="metadataOriginIDRef" type="tva:TVAIDRefType"/>
  <attribute ref="xml:lang"/>
  <attribute name="serviceIDRef" type="tva:TVAIDRefsType"/>
</complexType>
```

FIG.50

| Name | R/O | Semantics |
|---|---|---|
| SuperGroupInformationType | | Type definition for a collection of program groups, such as a family of related series (e.g., the family of "StarTrek series," or the family of "Law and Order" series). |
| MemberOf | O | Designation of SuperGroup(s) to which the SuperGroup represented by this SuperGroupInformation element belongs, if any. Each MemberOf element *shall* give the groupId of a SuperGroupInformation element that has a level at least one larger than the level of this SuperGroupInformation element. |
| level | R | The level attribute *shall* give the level of the SuperGroup represented by this SuperGroupInformation element in the Program/Group/SuperGroup hierarchy. Levels *may* be designated arbitrarily, subject to the restriction that each SuperGroup *shall* be at a level higher than any of its members (with Groups considered to be at level 2). |

FIG.51

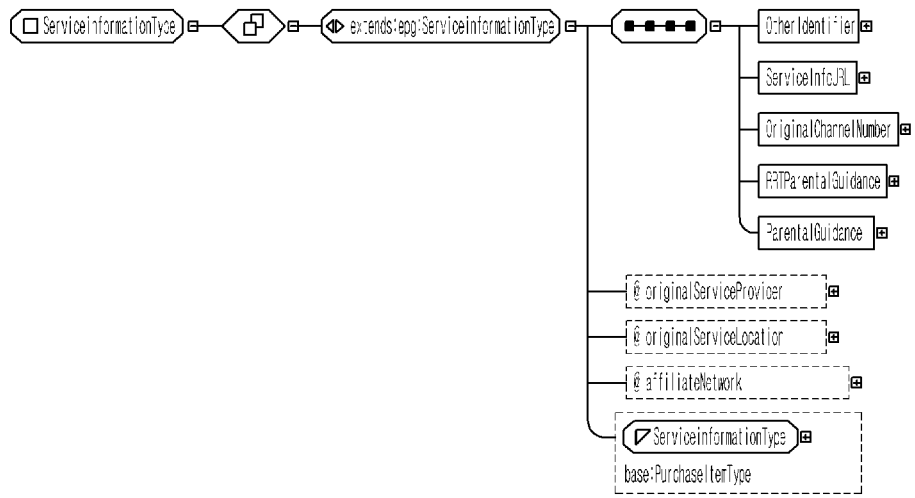

FIG.52

```
<complexType name="ServiceInformationType">
   <complexContent>
      <extension base="epg:ServiceInfoType">
         <sequence>
            <element name="OtherIdentifier" type="mpeg7:UniqueIDType" minOccurs="0"
               maxOccurs="unbounded"/>
            <element name="ServiceInfoURL" type="anyURI" minOccurs="0"/>
            <element name="OriginalChannelNumber" type="epg:ChannelNumberType" minOccurs="0"/>
            <element name="RRTParentalGuidance" type="epg:RRTParentalGuidanceType" minOccurs="0"
               maxOccurs="unbounded"/>
            <element name="ParentalGuidance" type="mpeg7:ParentalGuidanceType" minOccurs="0"
               maxOccurs="unbounded"/>
         </sequence>
         <attribute name="originalServiceProvider" type="string"/>
         <attribute name="originalServiceLocation" type="string"/>
         <attribute name="affiliateNetwork" type="string"/>
      </extension>
   </complexContent>
</complexType>
```

FIG.53

| Name | R/O | Semantics |
|---|---|---|
| ServiceInformationType | | Type definition for information about a service. The ServiceGenre sub-element of an element of ServiceInformationType type *shall* reference a Term in a suitable classification scheme, such as the TV-Anytime ContentCS |
| OtherIdentifier | O | Optional additional identifier for the service (other than the serviceId), which *may* be used to identify the service for access purposes |
| ServiceInfoURL | O | When present, the ServiceInfoURL element *shall* point to a web page giving additional information about the service |
| OriginalChannelNumber | O | Channel number of the original broadcast of this service. For example, if this is a rebroadcast of a channel from a terrestrial TV station, this would be the channel number as specified for it by that TV station. |
| RRTParentalGuidance | O | See semantic definition of this element in the BasicContentDescription element. |
| ParentalGuidance | O | See semantic definition of this element in the BasicContentDescription element. |
| OriginalServiceProvider | O | Name of the provider of the original broadcast of this service. For example, if this is a rebroadcast of a channel from a terrestrial TV station, this would be the call letters of that TV station. |
| originalServiceLocation | O | Location of the original broadcast of this service. For example, if this is a rebroadcast of a channel from a terrestrial TV station in , this would be "." |
| affiliateNetwork | O | Name of the network (e.g., ABC, PBS, etc.) with which the original broadcaster of this service is affiliated. |

FIG.54

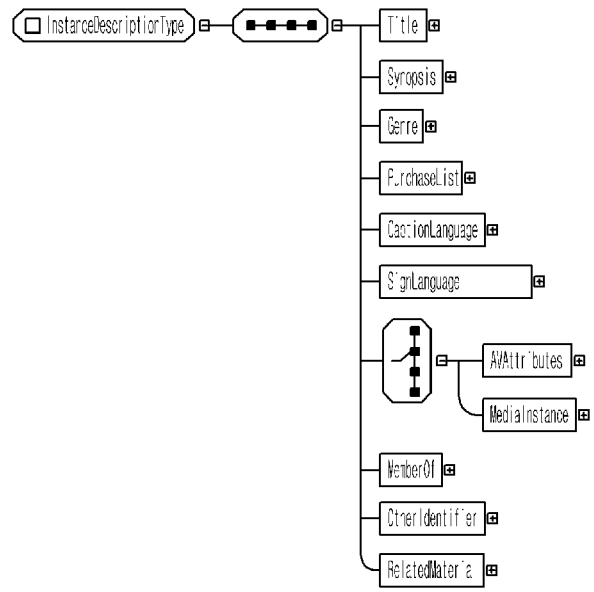

FIG.55

```
<complexType name="InstanceDescriptionType">
   <sequence>
      <element name="Title" type="mpeg7:TitleType" minOccurs="0" maxOccurs="unbounded"/>
      <element name="Synopsis" type="tva:SynopsisType" minOccurs="0" maxOccurs="unbounded"/>
      <element name="Genre" type="tva:GenreType" minOccurs="0" maxOccurs="unbounded"/>
      <element name="PurchaseList" type="epg:PurchaseListType" minOccurs="0"/>
      <element name="CaptionLanguage" type="tva:CaptionLanguageType" minOccurs="0"
            maxOccurs="unbounded"/>
      <element name="SignLanguage" type="tva:SignLanguageType" minOccurs="0" maxOccurs="unbounded"/>
      <choice minOccurs="0">
         <element name="AVAttributes" type="epg:AVAttributesType" minOccurs="0"/>
         <element name="MediaInstance" type="epg:AVAttributesType" maxOccurs="unbounded"/>
      </choice>
      <element name="MemberOf" type="tva:BaseMemberOfType" minOccurs="0" maxOccurs="unbounded"/>
      <element name="OtherIdentifier" type="mpeg7:UniqueIDType" minOccurs="0" maxOccurs="unbounded"/>
      <element name="RelatedMaterial" type="epg:RelatedMaterialType" minOccurs="0" maxOccurs="unbounded"/>
   </sequence>
</complexType>
```

FIG.56

| Name | R/O | Semantics |
|---|---|---|
| PurchaseList | O | List of purchase options for the product described by an element of this InstanceDescriptionType, including a unique identifier for each offering (each combination of product and purchase option). |
| MediaAttributes | O | Description of properties of a media instance (encoding) of the program instance described by an element of this InstanceDescriptionType. The MediaAttributes element is intended for use when the program instance has multiple media instances (encodings) for it. |

FIG.57

```
<choice>
    <element name="AVAttributes" type="epg:AVAttributesType" minOccurs="0"/>
    <element name="MediaInstance" maxOccurs="unbounded">
        <complexType>
            <complexContent>
                <extension base="epg:AVAttributesType">
                    <sequence>
                        <element name="MediaId" type="mpeg7:UniqueIDType"/>
                    </sequence>
                </extension>
            </complexContent>
        </complexType>
    </element>
</choice>
```

FIG.58

```
<element name="MediaInformationTable"
    type="MediaInformationTableType" minOccurs="0"/>

<complexType name="MediaInformationTableType">
    <sequence>
        <element name="MediaInformation" type="epg:MediaInformationType" minOccurs="0"
            maxOccurs="unbounded"/>
    </sequence>
    <attribute name="metadataOriginIDRef" type="tva:TVAIDRefType" use="optional"/>
    <attribute ref="xml:lang" use="optional"/>
</complexType>

<complexType name="MediaInformationType">
    <sequence>
        <element name="MediaProperties" type="epg:MediaPropertiesType" maxOccurs="unbounded"/>
    </sequence>
    <attribute name="contentID" type="mpeg7:UniqueIDType"/>
    <attributeGroup ref="tva:fragmentIdentification"/>
    <attribute name="metadataOriginIDRef" type="tva:TVAIDRefType" use="optional"/>
    <attribute ref="xml:lang" use="optional"/>
</complexType>

<complexType name="MediaPropertiesType">
    <complexContent>
        <extension base="AVAttributes">
            <sequence>
                <element name="MediaID" type="mpeg7:UniqueIDType"/>
            </sequence>
        </extension>
    </complexContent>
</complexType>
```

FIG.62

<key>       "purchaseTRType"
    <value>   "getList" or "purchase"

<key>       "contentId"
    <value>   A program identifier.

<key>       "instanceMetadataId"
    <value>   A instance metadata id in Program Location Table <key>       "purchaseOptionId"
    <value>   A purchase option item identifier <key>       "serviceId"
    <value>   Attribute "serviceID" used within ServiceInformation fragments

FIG.63

<key>       "PTType"
    <value>   "getInfo" or "purchase" or "getList"

<key>       "serviceId"
    <value>   <serviceId>, where <serviceId> is the serviceId attribute of a Service fragment which contains a PurchaseList element <key>       "programId"
    <value>   <programId>, where <programId> is the programId attribute of a Program fragment <key>       "instanceId"
    <value>   <instanceId>, where <instanceId> is the metadataInstanceId attribute of an Instance fragment. This key shall not appear unless a <programId> key appears in the query also.

<key>       "assetId"
    <value>   <assetId>, where <assetId> is the assetId attribute of a PurchaseItem or PurchaseIdRef element in a PurchaseList element

FIG.67

```
<element name="PurchasedItemList"
        type="epg:PurchasedItemListType"/>

<complexType name="PurchasedItemListType">
        <sequence>
            <element name="PurchasedItem" type="epg:PurchasedItemType"
                minOccurs="0" maxOccurs="unbounded"/>
        </sequence>
        <attributeGroup ref="tva:fragmentIdentification"/>
        <attribute ref="xml:lang" use="optional"/>
    </complexType>

<complexType name="PurchasedItemType">
        <sequence>
           <element name="ItemId" type="mpeg7:UniqueIDType"/>
           <element name="ItemType" type="epg:PurchasedItemTypeType"/>
           <element name="ItemTItle" type="mpeg7:TextualType"
                minOccurs="0" maxOccurs="unbounded"/>
           <element name="PurchaseTerms" type="epg:PurchaseItemType"/>
           </sequence>
    </complexType>

<simpleType name="PurchasedItemTypeType">
        <restriction base="string">
            <enumeration value="Program" />
            <enumeration value="Pay-per-View Program" />
            <enumeration value="On-Demand Program"/>
            <enumeration value="Push-Download Program"/>
            <enumeration value="Service"/>
        </restriction>
    </simpleType>
```

FIG.68

| Name | R/O | Semantics |
|---|---|---|
| PurchasedItemList | | List of purchased content items |
| PurchasedItemListType | | XML type for list of purchased content items |
| PurchasedItem | | Individual purchased content item |
| ItemId | R | Unique identifier of said purchased content item. The value of this ItemId element *shall* match the value of an OtherIdentifier element associated with the purchased content item. |
| ItemType | R | Type of said purchased content item |
| Program | | Program, indicating said content item is represented by a ProgramInformation element |
| Pay-per-View Program | | Pay-per-View program, indicating said content item is represented by a ScheduleEvent or BroadcastEvent element |
| On-Demand Program | | On-Demand program, indicating said content item is represented by an OnDemandProgram element |
| Push-Download Program | | Push-Download program, indicating said content item is represented by a PushDownloadProgram element |
| Service | | Service, which can denote either an OnDemand service or a PushDownload service, where an OnDemand service is represented by an OnDemandService element or is referenced in the serviceId attribute of one or more OnDemandProgram elements, and a PushDownload service is a service that is referenced in the serviceId attribute of one or more PushDownloadProgram elements. |
| ItemTitle | O | Descriptive title of said purchased content item. The ItemTitle should match a Title element that appears in the BasicDescription or InstanceDescription element associated with the Program, or, in the case of a service, a Name element in the ServiceInformation element representing the service. |
| PurchaseTerms | R | Terms of purchase of said content item. The PurchaseTerms element *shall* match the PurchaseItem that was identified by the AssetId used to make the purchase. |

FIG.69

<key>      "otherId"

<value>    <otherId>, where <otherId> is the string value of an OtherIdentifier element, and the OtherIdentifier element is associated with an OnDemandProgram, PushDownloadProgram, ScheduleEvent, BroadcastEvent, Program or Service. If no "idType" key is used in conjunction with this "otherId" key, it is assumed that the "organization" and "type" attribute values for the OtherIdentifier element are "ATIS" and "CreatorAssetId", respectively. If it is desired to specify an OtherIdentifier element with different "organization" and/or "type" attribute values, the "idType" key must needs to be used in conjuction with this "otherId" key.

<key>      "idType"

<value>    "{"<organization>"}""{"<type>"}", where the curly brackets in parentheses are literals, <organization> is the "organization" attribute value of an OtherIdentifier element, and <type> is the "type" attribute value of that OtherIdentifier element.

FIG.70

<key>      "makePurchase"

<value>    <offerId>, where <offerId> is the identifier of an offering, i.e., the value of the offerId attribute of a PurchaseItem element or PurchaseIdRef element in a PurchaseList element, or the value of the offerId attribute of a GroupPurchaseIdRef element in a ServiceInformation element.

<key>      "listPurchases"

<value>    none

<key>      "getE1URIList"

<value>    <CreatorAssetId>, where the <CreatorAssetId> is the value of an OtherIdentifier element in the InstanceDescription element of the OnDemandProgram element representing the CoD item of interest, where the value of the "type" attribute of the OtherIdentifier element is "CreatorAssetId" and the value of the "organization" attribute of the OtherIdentifier element is "ATIS".

FIG. 71

| Status Code | Status |
|---|---|
| 000 | Success |
| 003 | Purchase item unknown (e.g., <offerId> unknown or invalid for "makePurchase" request) |
| 009 | Charging error (e.g., credit limit exceeded, or account blocked) |
| 018 | Unspecified error |
| 021 | Information invalid (e.g., invalid <CreatorAssetId> for "getE1URIList" request) |

FIG. 72

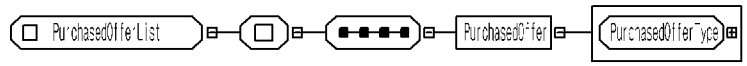

FIG. 73

```
<element name="PurchasedOfferList">
  <complexType>
    <sequence>
      <element name="PurchasedOffer" type="epg:PurchasedOfferType"
         minOccurs="0" maxOccurs="unbounded"/>
    </sequence>
  </complexType>
</element>
```

FIG. 74

| Name | R/O | Semantics |
|---|---|---|
| PurchasedOfferList | | List of purchased offerings |
| PurchasedOffer | O | Individual purchased offering |

FIG.75

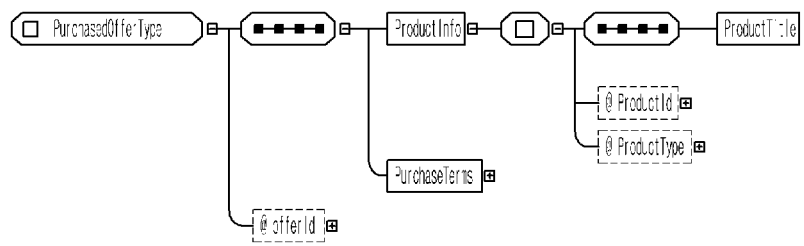

FIG.76

```
<complexType name="PurchasedOfferType">
   <sequence>
      <element name="ProductInfo" maxOccurs="unbounded">
         <complexType>
            <sequence>
               <element name="ProductTitle" type="mpeg7:TextualType" minOccurs="0" maxOccurs="unbounded"/>
            </sequence>
            <attribute name="productId" type="epggt:assetIdType" use="required"/>
            <attribute  name="productType" type="epg:productTypeType"/>
         </complexType>
      </element>
      <element name="PurchaseTerms" type="epg:PurchaseItemType"/>
   </sequence>
   <attribute name="offerId" type="epggt:assetIdType"/>
</complexType>
```

FIG.77

| Name | R/O | Semantics |
|---|---|---|
| PurchasedOfferype | | XML type for information about a purchased offering. |
| ProductInfo | R | Information about a product that is part of the offering. |
| ProductTitle | O | Descriptive title of said product. A ProductTitle element *should* match a Title element that appears in the BasicDescription or InstanceDescription element associated with the ProgramInformation, GroupInformation, SuperGroupInformation or ProgramLocation element, or, in the case of a service, a Name element in the ServiceInformation element, or, in the case of a group of services, a Title element in the Purchase element of the offering. |
| productId | R | Unique identifier of said product. This productId attribute *shall* match the string value of an OtherIdentifier element associated with the product, where the value of the type attribute of the OtherIdentifier element is equal to "CreatorAssetId" and the value of the organization attribute of the OtherIdentifier element is equal to "ATIS". |
| productType | R | Type of said product (program, group, program instance, service, etc.) |
| PurchaseTerms | R | Terms of purchase of the offering. The PurchaseTerms element *shall* match the PurchaseItem that was identified by the offerId used to make the purchase of this offering. |
| offerId | R | Unique identifier of the offering. |

FIG.78

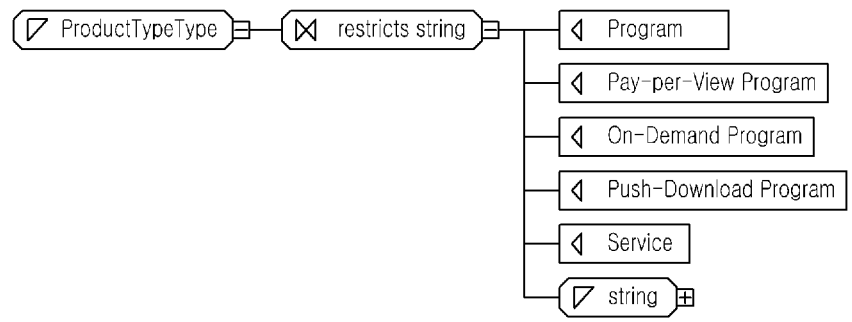

FIG.79

```
<simpleType name="ProductTypeType">
    <restriction base="string">
        <enumeration value="Program" />
        <enumeration value="Pay-per-View Program" />
        <enumeration value="On-Demand Program"/>
        <enumeration value="Push-Download Program"/>
        <enumeration value="Service"/>
    </restriction>
</simpleType>
```

FIG.80

| Name | R/O | Semantics |
|---|---|---|
| ProductTypeType | | XML type definition for type of purchased product |
| Program | | Program, indicating said product is represented by a ProgramInformation element |
| Pay-per-View Program | | Pay-per-View program, indicating said product is represented by a ScheduleEvent or BroadcastEvent element |
| On-Demand Program | | On-Demand program, indicating said product is represented by an OnDemandProgram element |
| Push-Download Program | | Push-Download program, indicating said product is represented by a PushDownloadProgram element |
| Service | | Service, which can denote either an OnDemand service or a PushDownload service, where an OnDemand service is represented by an OnDemandService element or is referenced in the serviceId attribute of one or more OnDemandProgram elements, and a PushDownload service is a service that is referenced in the serviceId attribute of one or more PushDownloadProgram elements. |

FIG.81

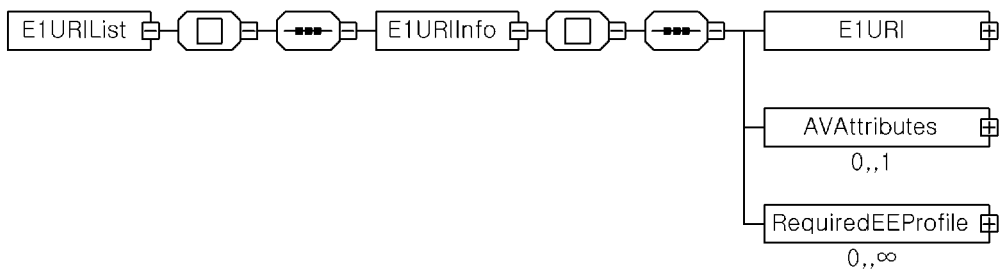

FIG.82

```
<element name="E1URIList">
  <complexType>
    <sequence>
      <element name="E1URIInfo" minOccurs="0" maxOccurs="unbounded">
        <complexType>
          <sequence>
            <element name="E1URI" type="anyURI"/>
            <element name="AVAttributes" type="epg:AVAttributesType" minOccurs="0"/>
            <element name="RequiredEEProfile" type="itfee:ISSProfileLevelType" minOccurs="0"
                     maxOccurs="unbounded"/>
          </sequence>
        </complexType>
      </element>
    </sequence>
  </complexType>
</element>
```

FIG.83

| Name | R/O | Semantics |
|---|---|---|
| E1URIList |  | Element containing information about a list of encodings for a Content on Demand program |
| E1URIInfo | O | Information about an encoding for a Content on Demand program |
| E1URI | R | The E1 URI for an encoding |
| AVAttributes | O | Audio-visual attributes of the encoding represented by the E1URI element |
| RequiredEEProfile | O | Secure execution environment profile required in order to access the encoding represented by this E1URI element. If more than one RequiredEEProfile element is present, then the device needs to satisfy at least one of them in order to access the content. |

FIG.87

```
<complexType name="PurchaseOptionType">
  <sequence>
    <element name="Title" type="mpeg7:TextualType" maxOccurs="unbounded"/>
    <element name="Description" type="mpeg7:TextualType" minOccurs="0" maxOccurs="unbounded"/>
    <element name="Price" type="tva:PriceType" maxOccurs="unbounded"/>
    <element name="Purchase" type="epg:PurchaseType" minOccurs="0" maxOccurs="unbounded"/>
    <element name="ProgramInstance" minOccurs="0" maxOccurs="unbounded">
      <complexType>
        <sequence>
          <element name="Program" type="tva:CRIDRefType"/>
          <element name="Instance" type="epg:InstanceMetadataIdRefType" minOccurs="0"/>
        </sequence>
      </complexType>
    </element>
    <element name="DescriptionImage" minOccurs="0">
      <complexType>
        <complexContent>
          <extension base="mps:ResourceLocatorType">
            <attribute name="HorizontalSize" type="unsignedShort"/>
            <attribute name="VerticalSize" type="unsignedShort"/>
          </extension>
        </complexContent>
      </complexType>
    </element>
    <element name="AVAttributes" type="tva:AVAttributesType" minOccurs="0"/>
  </sequence>
  <attribute name="PurchaseOptionID" type="tva:TVAIDType" use="required"/>
  <attribute name="start" type="dateTime" use="optional"/>
  <attribute name="end" type="dateTime" use="optional"/>
  <attributeGroup ref="tva:fragmentIdentification"/>
  <attribute name="metadataOriginIDRef" type="tva:TVAIDRefType" use="optional"/>
</complexType>
```

```
<complexType name="PurchaseOptionTableType">
   <sequence>
     <element name="PurchaseOption" type="epg:PurchaseOptionType" minOccurs="0" maxOccurs="unbounded"/>
   </sequence>
   <attribute name="metadataOriginIDRef" type="tva:TVAIDRefType" use="optional"/>
   <attribute ref="xml:lang" use="optional"/>
</complexType>
```

```
<complexType name="PurchaseErrorInformationType">
  <sequence>
    <element name="ErrorDescription" type="mpeg7:TextualType" minOccurs="0" maxOccurs="unbounded"/>
    <element name="ErrorDescriptionURL" type="anyURI" minOccurs="0" maxOccurs="unbounded"/>
  </sequence>
</complexType>
```

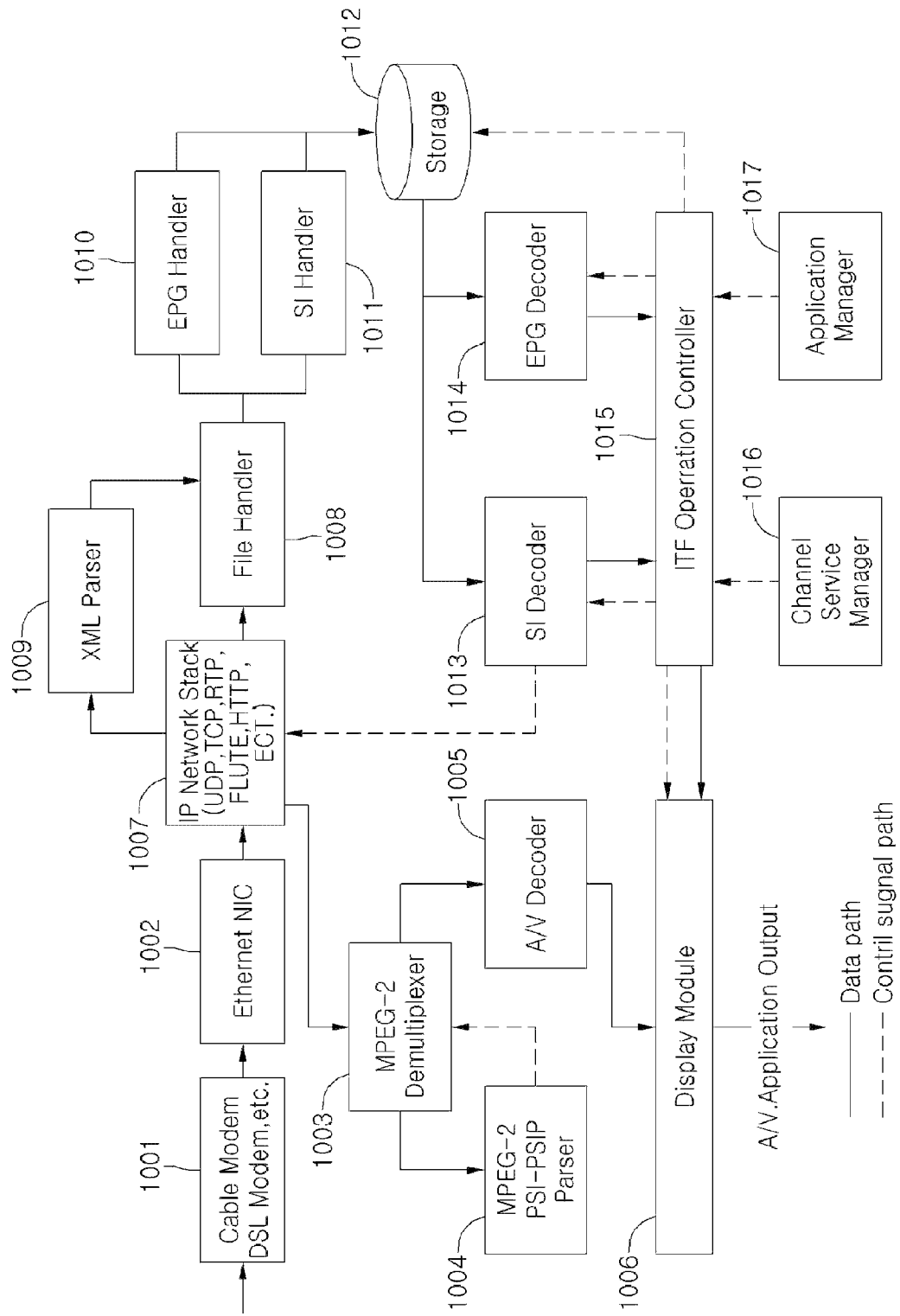

PURCHASE TRANSACTION METHOD FOR IPTV PRODUCT AND IPTV RECEIVER THEREOF

CROSS-REFERENCE TO RELATED APPLICATIONS

The present application claims priority under 35 U.S.C. 119 and 35 U.S.C. 365 to U.S. provisional Application Nos. 61/324,753 (filed on Apr. 16, 2010), 61/326,216 (filed on Apr. 20, 2010), 61/422,662 (filed on Dec. 14, 2010) and 61/435,796 (filed on Jan. 25, 2010), which are hereby incorporated by reference in its entirety.

BACKGROUND

The present disclosure relates to a digital broadcast system, and more particularly, to a method which purchases products with an Internet Protocol Television (IPTV), like Pay-Per-View (PPV) or Content-on-Demand (CoD) program.

A related art broadcast receiver receives content created by a broadcasting company over a radio-wave transfer medium such as terrestrial broadcast, cable broadcast or satellite broadcast. However, as a digital-based digital broadcast technology is developed from the existing analog broadcast and is practically used, various kinds of content services such as real-time broadcast, CoD, game and news may be provided to users over an Internet network, in addition to the existing radio-wave medium and cable medium.

Digital broadcast receivers for receiving a content service over an Internet network, for example, IPTVs receive all kinds of information services, video content and broadcast, and provide the received service to users over the Internet network. The Internet network may be realized in various kinds of networks such as optical cable network, coaxial cable network, Fiber To The Home (FTTH), phone network, and wireless network based on an Internet Protocol (IP).

SUMMARY

Embodiments provide a method which can efficiently search and acquire a content purchase service provided based on an IP.

Embodiments also provide a method which purchases information regarding content as metadata of an extensible structure according to a business model, with flexibility.

Embodiments also provide a metadata transfer method and a purchase transaction method based on the same, which enable efficient purchase of content.

In one embodiment, a method for IPTV service discovery, includes: requesting to make a purchase for a offering by using a identifier of the offering, wherein the offering is a combination of one or more products to be purchased and purchase terms for the products; and obtaining a response returned from the request to indicate success or failure of the requested purchase.

In another embodiment, an IPTV receiver including: a network interface configured to receive EPG metadata containing purchase price and terms of an offering and the identifier of the offering, wherein the offering is a combination of one or more IPTV products and purchase terms for the products; and a service control manager configured to request a purchase for a offering by using a identifier of the offering to be purchased, wherein the network interface receives a response returned from the request to indicate success or failure of the requested purchase.

The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8 and 9 are diagrams showing a data structure of program information.

FIGS. 10 and 11 are diagrams showing a data structure of basic content description.

FIGS. 13 and 14 are diagrams illustrating a configuration of purchase item information according to a first embodiment.

FIGS. 15 to 17 are diagrams illustrating an embodiment of a configuration of purchase list information.

FIGS. 18 to 20 are diagrams illustrating an embodiment of a configuration of purchase list reference information.

FIGS. 21 to 23 are diagrams illustrating a configuration of purchase list information according to a second embodiment.

FIGS. 24 to 26 are diagrams illustrating a configuration of purchase item information according to a second embodiment.

FIGS. 27 to 29 are diagrams illustrating an embodiment of a configuration of copy control information.

FIGS. 30 to 32 are diagrams illustrating an embodiment of a configuration of copy privileges information.

FIGS. 33 to 35 are diagrams illustrating an embodiment of a configuration of trick mode restriction information.

FIGS. 36 to 38 are diagrams illustrating an embodiment of a configuration of additional purchase information including the information of FIGS. 27 to 35.

FIGS. 39 to 41 are diagrams illustrating an embodiment of a configuration of a purchase information table.

FIGS. 42 to 44 are diagrams illustrating a configuration of program information according to a first embodiment.

FIGS. 45 to 47 are diagrams illustrating a configuration of group information according to a first embodiment.

FIGS. 48 to 50 are diagrams illustrating a configuration of super group information according to a first embodiment.

FIGS. 51 to 53 are diagrams illustrating a configuration of service information according to a first embodiment.

FIGS. 54 to 56 are diagrams illustrating a configuration of instance description included in program location information according to a first embodiment.

FIG. 57 is a diagram illustrating another embodiment of an element which is defined for describing properties of multiple encodings for a program.

FIG. 58 is a diagram illustrating another embodiment of an element which is defined for describing properties of multiple encodings for a program.

FIG. 62 is a diagram illustrating a first embodiment of query keys defined for purchase transaction.

FIG. 63 is a diagram illustrating a second embodiment of query keys defined for purchase transaction.

FIGS. 64 to 68 are diagrams illustrating a configuration of purchased item information according to a first embodiment.

FIG. 69 is a diagram illustrating an embodiment of query keys which are used for requesting specific fragments.

FIG. 70 is a diagram illustrating a third embodiment of query keys which are defined for purchase transaction.

FIG. 71 is a diagram illustrating an embodiment of status codes which are defined for a purchase-related request.

FIGS. 72 to 80 are diagrams illustrating a configuration of purchased item information according to a second embodiment.

FIGS. 81 to 83 are diagrams illustrating an embodiment of a configuration of E1 URIs list information regarding a CoD program.

FIGS. 85 to 92 are diagrams illustrating another embodiment of a method of representing purchase option.

FIG. 94 is a diagram showing a network device according to another embodiment.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way.

For instance, such a terminology as a network device is used in this disclosure. And, this terminology can correspond to one of an IPTV (Internet Protocol TeleVision), an ITF (IPTV Terminal Function), a digital television, a mobile device and the like.

Figure 1:
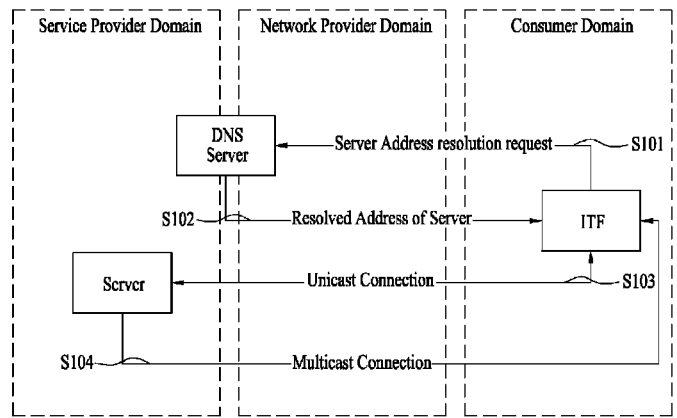
FIG. 1 is a schematic view illustrating a configuration for an Internet Protocol Television (IPTV) service.

FIG. 1 is a diagram for an IPTV service according to one embodiment of the present invention.

First of all, a service address on IP is determined as URL type for example and an ITF makes a request for an IP address and the like to a DNS server and then receives the requested IP address and the like. The ITF accesses a server by multicast or unicast.

Referring to FIG. 1, an ITF makes a server address resolution request (in operation S101). The ITF receives a resolved address of server from a DNS server (in operation S102). The ITF is connected to a server by a unicast (in operation S103) or a multicast (in operation S104).

Figure 2:
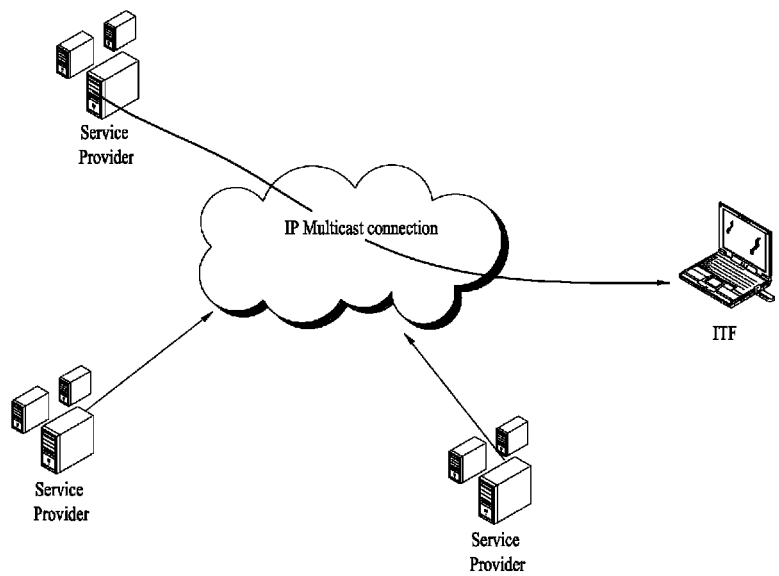
FIG. 2 is a view for explaining a multicast IPTV service.

FIG. 2 is a diagram for a multicast method according to one embodiment of the present invention.

Referring to FIG. 2, although a plurality of ITFs join a single multicast stream, 1-to-many connections are achieved instead of 1-to-1 access to the server per ITF.

Figure 3:
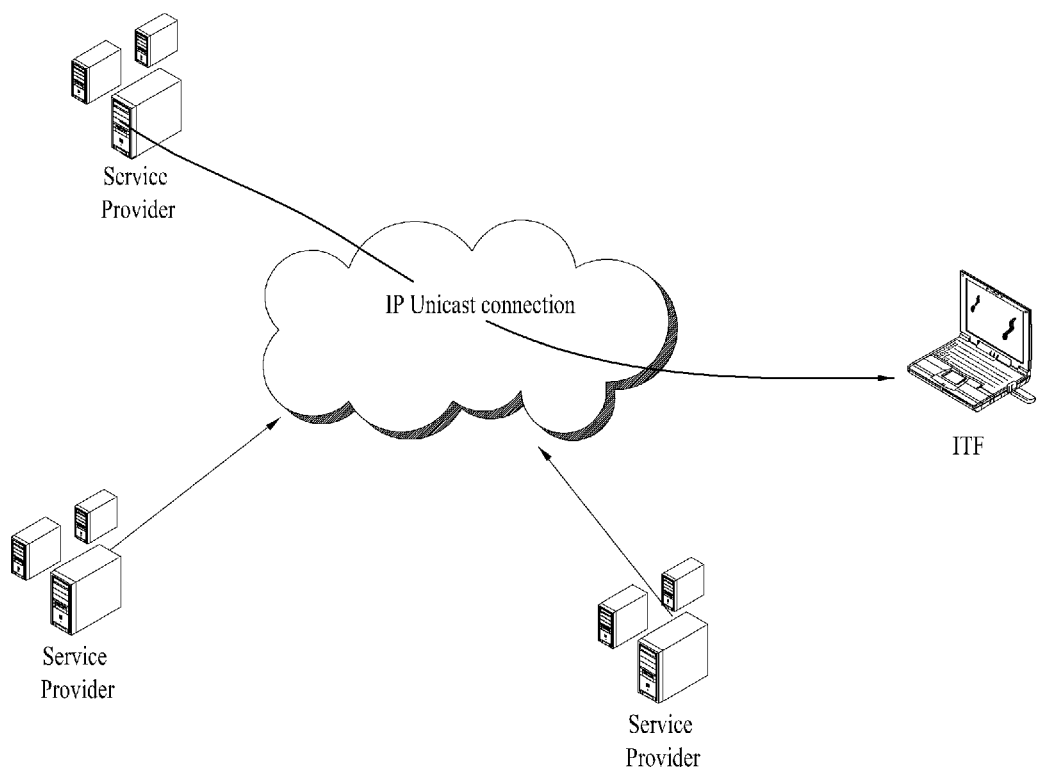
FIG. 3 is a view for explaining a unicast IPTV service.

FIG. 3 is a diagram for a unicast method according to one embodiment of the present invention.

Referring to FIG. 3, 1-to-1 connection is established between an ITF and a server to transceive data in-between.

Figure 4:
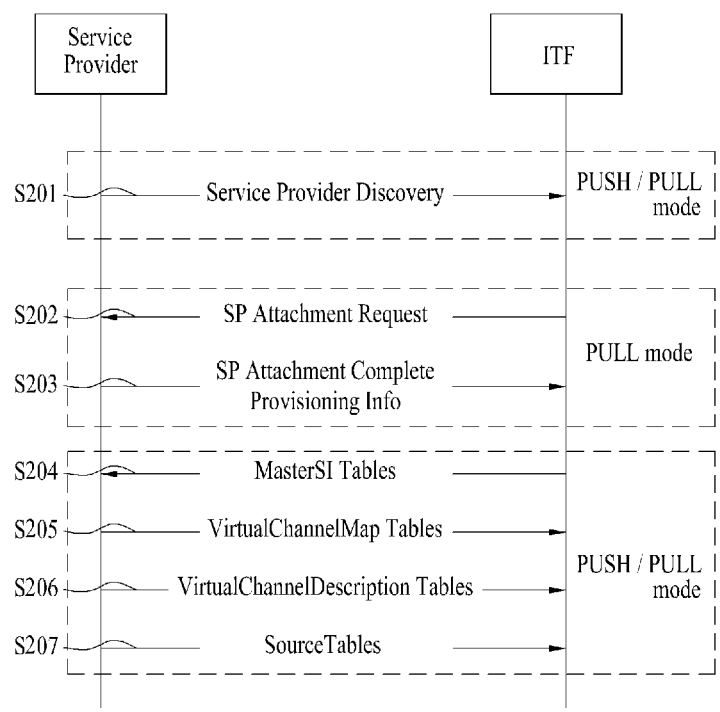
FIG. 4 is a diagram showing a process of searching for an IPTV service according to an embodiment of the present invention.

FIG. 4 is a diagram of a process for searching an IPTV service according to one embodiment of the present invention.

A service provider performs a service provider discovery (in operation S201). An ITF performs a SP attachment request (in operation S202). The ITF receives provisioning information after SP attachment complete (in operation S203). Furthermore, the ITF receives master SI tables from the service provider (in operation S204), receives virtual channel map tables from the service provider (in operation S205), receives virtual channel description tables from the service provider (in operation S206), and receives source tables from the service provider (in operation S207).

This is explained in detail as follows.

First of all, the service provider discovery can mean a process for service providers providing services related to IPTV to discover a server that provides information on services provided by the service providers. A method for discovering an address list for obtaining information (e.g., SP discovery information) on an SD (service discovery) server includes one of the three kinds of methods for example. First of all, it is able to use an address preset in the ITF or an address manually set by a user. Secondly, it is able to use a DHCP based SP discovery method (e.g., DHCP option). Thirdly, it is able to use a DNS SRV-based SP discovery method (e.g., DNS SRV mechanism).

Moreover, the ITF accesses a server at the address obtained by one of the above three kinds of methods and then receives a service provider discovery record containing information necessary for the per-SP service discovery. Subsequently, the ITF performs a service searching step using the received service provider discovery record. Theses steps are available for one of a push mode and a pull mode.

The ITF accesses an SP attachment server designated as an SP attachment locator of the SP discovery record and then performs an ITF registration procedure (or a service attachment procedure). In this case, information delivered to the server from the ITF can have a format of an ITF registration input type record. Alternatively, it is able to perform the service attachment procedure using information of a query term type of HTTP GET method.

Moreover, the ITF accesses an authentication service server of SP, which is designated as an SP authentication locator, performs a separate authentication procedure, and is then able to perform a service authentication procedure.

Meanwhile, after the service attachment procedure has been successfully completed, data transmitted to the ITF by the server can have a format of a provisioning information table.

In the service attachment procedure, the ITF transmits the data to the server in a manner that its ID and location information are contained in the data. Subsequently, the service attachment server is able to specify a service the ITF has subscribed based on the received ID and location information. Moreover, address information, from which the ITF can obtain service information, is provided as a provisioning information table. This address information corresponds to access information of a master SI table. In case of using this method, it is facilitated to provide a subscriber-specific service.

The service information includes access information on a virtual channel map, a master SI table record for managing a version, a virtual channel map table for providing a service list of a package type, and a virtual channel description table including detailed information of each channel, a source table including access information for accessing a service actually, and the like.

Figure 5:
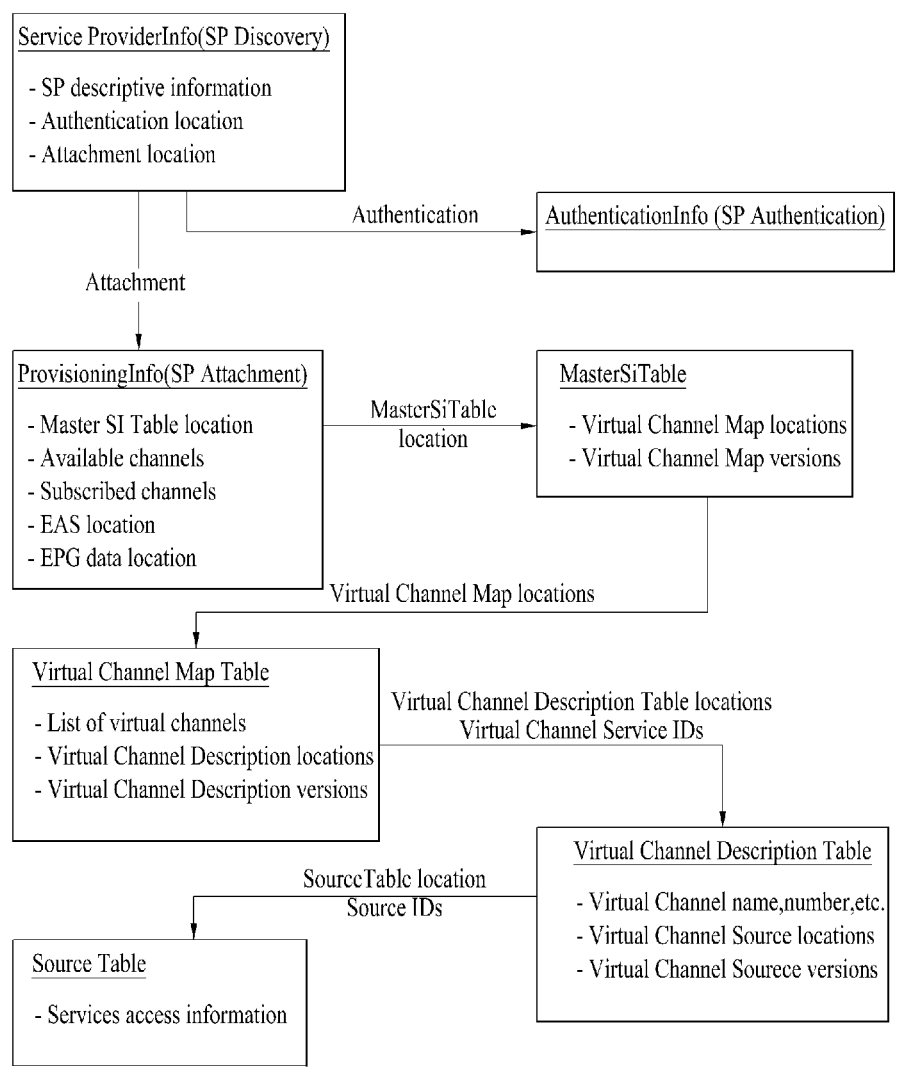
FIG. 5 is a diagram showing the process shown in FIG. 4 in more detail.

FIG. 5 is a detailed diagram of FIG. 4. Inter-data relations within SI are described with reference to FIG. 5 as follows.

Referring to FIG. 5, a master SI table includes location information for receiving each virtual channel map and version information of each virtual channel map. Each virtual channel map is uniquely identified via a virtual channel map identifier and the virtual channel map version indicates version information of the virtual channel map. In case that one of all tables connected in direction of arrow starting with the master SI table is changed, versions of all higher tables (up to master SI table) are incremented together with version increment of the corresponding table. Thus, by monitoring the master SI table, it is advantageous in that the change in the whole SI table can be directly checked.

For instance, in case that a change occurs in the source table, a version of the source table is incremented and a version of the virtual channel description table for referring to the source table is changed as well. Therefore, the change of the lower table causes a change of a higher table, whereby the version of the master SI table is eventually changed.

A single master SI table can exist per service provider. In case that a configuration of a service differs per region or subscriber (or subscriber group), the service provider designs a plurality of master SI tables to provide a customized service per unit. In case of this design, a customized service fit for a region of a subscriber, subscription information and the like can be efficiently provided via the master SI table.

The virtual channel map table can have at last one virtual channel and includes location information for obtaining channel detail information instead of having the channel detail information contained in the virtual channel map. The virtual channel description of the virtual channel map indicates a location of a virtual channel description table containing the channel detail information.

The virtual channel description table contains detail information of virtual channel. And, it is able to access the virtual channel description table using the virtual channel location in the virtual channel map table.

Meanwhile, a method of delivering the virtual channel description table can use one of the following four kinds of methods.

First of all, using a single global multicast stream, a virtual channel description table of all channels provided by the service provider is transmitted. According to this design, as mentioned in the foregoing description, the virtual channel map table needs not to indicate the address of the detail information per virtual channel but an address of the global multicast stream is just included in the provisioning information table.

Secondly, there is a method of providing a single multicast stream per region. This second method provides channel detail information using a separate multicast stream per region, while the aforesaid first method provides channel detail information using a single stream nationwide. In this case, since a region to which the ITF belongs can be specified via the service attachment procedure, it is possible to specify an address of a unique multicast stream per region via PROVISIONING information table.

Thirdly, there is a method of designating a virtual channel description location to a virtual channel map table. If it is able to receive detail information of channel belonging to one channel map at the same address entirely or in part, the detail information is just designated to a virtual channel map table once rather than designated per virtual channel description location. Yet, in case that there exists a channel necessary to obtain detail information at a different address, relevant information is designated to the virtual channel description location again.

Fourthly, referring to FIG. 5, there s a method of designating a location of detail information per channel using a virtual channel description location. A virtual channel service ID of a virtual channel description table is a unique identifier for discriminating a service corresponding to the virtual channel description. Using the virtual channel service ID, it is able to discover a virtual channel description table. In case that a plurality of virtual channel description tables are received by multicast, a multicast stream is joined and a virtual channel description table corresponding to the same virtual channel service ID is then discovered. In case that unicast scheme is applied, a parameter of the virtual channel service ID is transmitted to a server and a specific virtual channel description table is then received only.

The source table provides access information (e.g., IP address, port, AV codec, transport protocol, etc.) necessary for accessing a service actually per service.

The above described master SI table, virtual channel map table, virtual channel description table and source table are delivered via 4 logically separated flows and are available for push mode and pull mode both. Meanwhile, the master SI table monitors can be transmitted by multicast for version management and a version change is monitored by receiving a multicast stream.

Moreover, the above described service provider information includes a service provider ID, a version, an SP logo, an SP name, an SP description, an SP attachment locator, an SP authentication locator and the like for example.

The service provider ID uniquely identifies a service provider and is able to use a registered domain name.

The version indicates a version of a record of the service provider information.

The SP logo specifies a location of a logo image of a service provider and is selectively usable.

The SP name indicates a name of a service provider and can have one name per language.

The SP description is a detailed textual description of a service provider and can be provided per language.

The SP attachment locator specifies an address of a service attachment server of a service provider. Meanwhile, a SERVICE attachment procedure necessary for initiating a service of a corresponding service provider is performed via the server.

The SP authentication locator specifies an address of a server to access in case of using a selectively usable authentication procedure.

Figure 6:
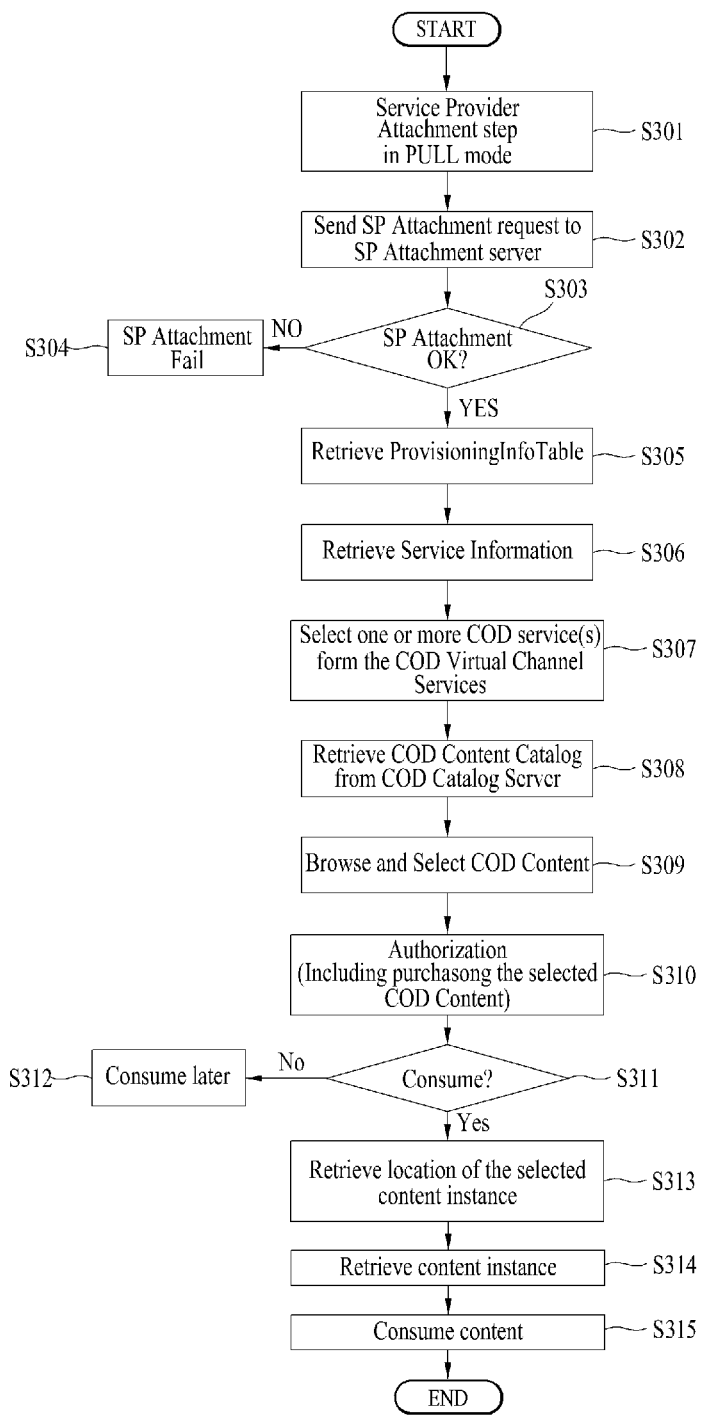
FIG. 6 is a diagram showing a procedure of processing metadata at a thick client.

FIG. 6 is a diagram showing a procedure of processing metadata at a thick client according to an embodiment of the present invention. The flow of FIG. 6 is the flow of processing a COD service at the thick client.

The network device performs a service provider attachment step in pull mode (in operation S301). The network device sends SP attachment request to SP attachment server (in operation S302). The network device determines whether SP attachment is OK or not (in operation S303). If no, the network device recognizes that the SP attachment fails (in operation S304). If yes, the network device retrieves provisioning information table (in operation S305). The network device retrieves service information (in operation S306). The network device selects one or more COD services from the COD virtual channel services (in operation S307).

The network device retrieves COD content catalog from COD catalog server (in operation S308). The network device browses and selects COD content (in operation S309). The network device performs an authorization including purchasing the selected COD content (in operation S310).

Moreover, the network device determines whether the content will be consumed (in operation S311). If no, the network device will consume the content later (in operation S312). If yes, the network device retrieves location of the selected content instance (in operation S313). The network device retrieves content instance (in operation S314). The network device consumes the content (in operation S315).

Figure 7:
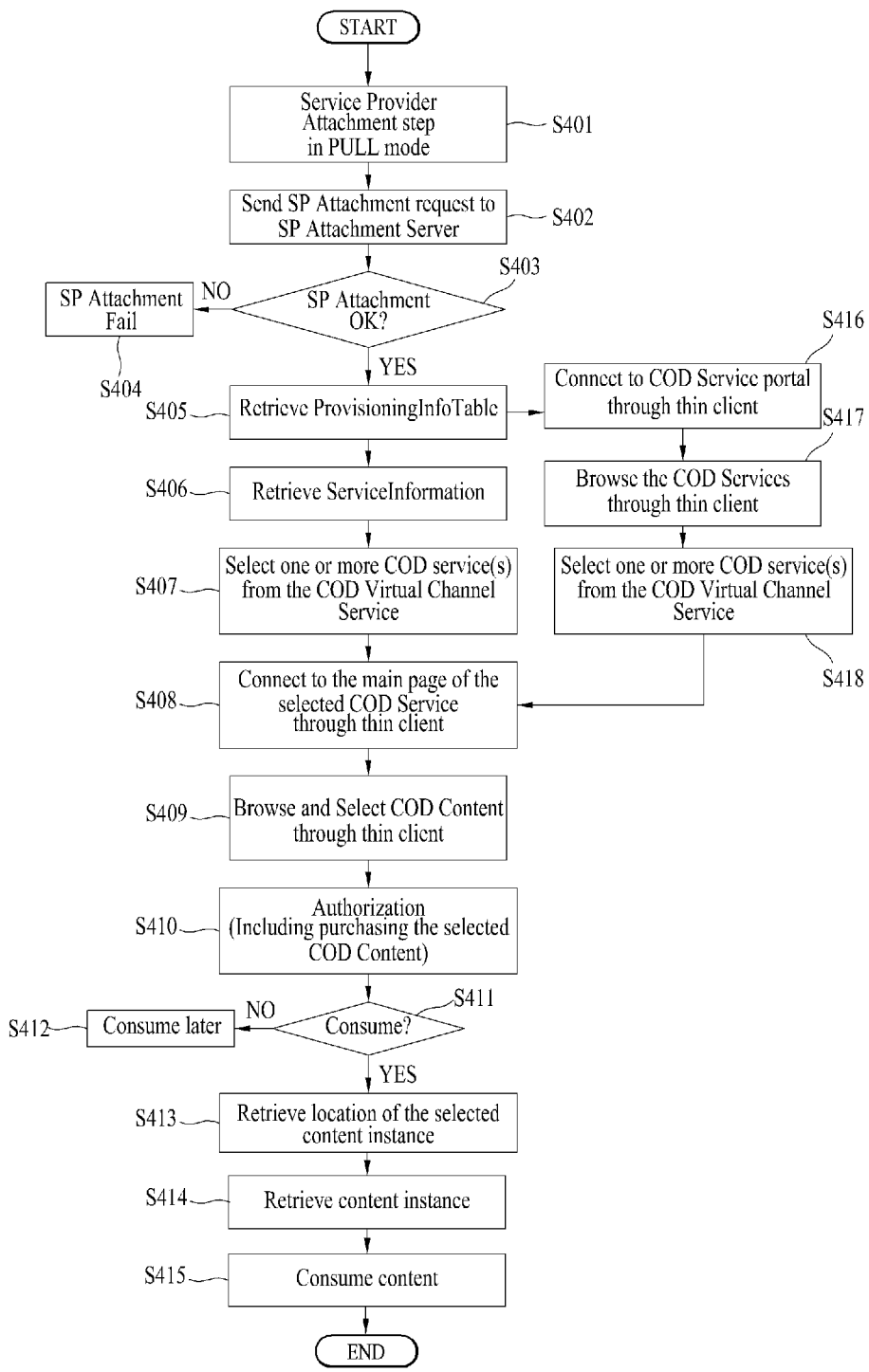
FIG. 7 is a diagram showing a procedure of processing metadata at a thin client.

FIG. 7 is a diagram showing a procedure of processing metadata at a thin client according to an embodiment of the present invention. The flow of FIG. 7 is the flow of processing a COD service at the thin client.

The network device performs a service provider attachment step in pull mode (in operation S401). The network device sends SP attachment request to SP attachment server (in operation S402). The network device determines whether SP attachment is OK or not (in operation S403). If no, the network device recognizes that the SP attachment fails (in operation S404). If yes, the network device retrieves provisioning information table (in operation S405). The network device retrieves service information (in operation S406). The network device selects one or more COD services from the COD virtual channel services (in operation S407).

The network device connects to the main page of the selected COD service through the thin client (in operation S408). The network device browses and selects COD content through the thin client (in operation S409). The network device performs an authorization including purchasing the selected COD content (in operation S410).

Moreover, the network device determines whether the content will be consumed (in operation S411). If no, the network device will consume the content later (in operation S412). If yes, the network device retrieves location of the selected content instance (in operation S413). The network device retrieves content instance (in operation S414). The network device consumes the content (in operation S415).

Furthermore, the network device connects to COD service portal through the thin client after S405 step (in operation S416). The network device browses the COD services through thin client (in operation S417). The network device selects one or more COD services from the COD virtual channel services (in operation S418).

FIG. 6 shows the operation of the thick client for receiving and processing metadata.

FIG. 7 shows the operation of the thin client which is accessed and used through a client function such as a web browser, when a portion of metadata is left at a server side.

The thick client receives service information and then processes SI metadata. When a COD virtual channel service is selected from the processed metadata, the use of a COD service is started. Further, in order to acquire a COD content list and detailed information included in the COD service, the address of a COD catalog server is acquired. The COD catalog server is accessed so as to acquire content catalog information. Using the content catalog information, content to be consumed is selected by a browsing, navigation and searching process and a consumption rights are acquired by an authorization process. The authorization process includes a purchasing, usage terms, payment, and settlement process. After the consumption rights are acquired, the location information of the instance of the content to be actually consumed is acquired, the content instance is accessed based on the location information, and the content is consumed.

In the case of the thin client, there are two methods in accessing to a COD service portal.

In a first method, a service is used by accessing a COD service main portal page which can access all COD services specified by a provisioning information table.

In a second method, a service is used by selecting a COD service based on received SI information and directly accessing the portal page of the COD service in order to use the selected COD service.

In both the first and second methods, after the service is selected, content is selected by a content catalog browsing, navigation and searching process using the thin client, the right to the content is acquired, and the content is consumed.

In the above description, the method of browsing the COD content catalog includes the following three methods. However, the present invention is not limited thereto and the term "browsing" includes at least one of navigation and searching and may indicate a series of processes of finding desired content using the content catalog.

First, the thin client browses the COD content catalog by exchanging an HTML-based web page between the server and the terminal. That is, since the metadata of the content is present at the server side, the thin client receives the web page including UI and data and performs browsing.

Second, a medium-level client stores a small amount of content metadata in the client using various delivery mechanisms and locally performs browsing using the content metadata. If additional metadata is necessary, the additional metadata is received from the server.

Third, a high-level client receives and stores the overall COD content catalog and performs local browsing.

The metadata delivery mechanism necessary for the above-described browsing method will now be described.

In addition, purchasing is performed through the authorization process, and, thereafter, information about the purchased content is stored in profile information of the user. The user may directly consume the content immediately after upon purchasing or consume the content using another device later. By managing purchasing list information through the profile of the user, a device used upon purchasing and a device used upon consuming can be separated.

When the purchased content is consumed, it is necessary to acquire the access information of the consumable instance of the actual content based on a globally unique content ID which is the unique identifier of the purchased content. Accordingly, in the method proposed by one embodiment of the present invention, the actual content instance is determined through the above-described source table.

The use of the metadata browsing method is not limited to the COD service and is applicable to metadata of an IPTV service which will be variously introduced in the future as well as a Linear TV service.

The content metadata delivery mechanism proposed by the present invention is a content metadata delivery mechanism using two layers as follows. The two layers are exemplary and three or more layers may be used.

According to one embodiment of the present invention, a base-layer metadata delivery channel and a second-layer metadata delivery channel are separately defined.

The base-layer metadata delivery channel indicates a channel for delivering metadata composed of minimum information necessary for selecting content. The existing metadata has sufficient flexibility to deliver metadata information for all items to be considered. If the number of pieces of content is significantly increased by allowing such flexibility, the size of the metadata information for the entire list may be increased to a degree at which the terminal cannot receive and process the metadata information. For fast content browsing, such flexibility is partially applied, and only requisite minimum metadata is defined and rapidly delivered to the terminal so as to perform browsing.

A stream (channel) which minimizes the amount of information to a degree, at which the metadata information of all content can be rapidly delivered to the terminal even when the number of pieces of content is significantly large, and delivers the information is defined as a base-layer metadata delivery channel. This method advantageously allows the minimized metadata information to be processed even in a terminal which cannot process a large amount of metadata, such as a terminal with a restricted storage space or a restricted function.

Since the size of the base layer is minimized, the terminal receives, stores and uses the metadata information through a multicast stream, etc. The metadata may be delivered using another method such as a unicast method.

A second-layer metadata delivery channel indicates a channel for delivering additional metadata other than the metadata delivered by the base layer. Since the base layer includes only the basic metadata items, additional metadata may be necessary for facilitating the content selection of the user. The channel for delivering the additional metadata delivers the metadata through a separate second-layer metadata delivery channel.

The second-layer metadata may be delivered using one of the following three schemes.

First, an HTTP or SOAP Query scheme is used. By requesting the additional metadata for the content selected through the base-layer metadata from the server using the HTTP or SOAP Query scheme, the additional metadata can be received.

Second, a unicast scheme is used. By requesting the overall second-layer metadata from the server, the second-layer metadata is received using the unicast scheme, and local browsing/search/navigation is performed.

Third, a multicast scheme is used. If the overall second-layer metadata is transmitted using the multicast scheme, the terminal receives the metadata by joining to the multicast stream and performs local browsing/search/navigation.

If the metadata is provided using separate channels, the service provider provides the metadata with various flexibilities and efficiencies as follows.

First, the metadata corresponding to the base layer may be delivered to and stored in the terminal so as to enable local browsing. When local browsing is performed in a state in which the content metadata is stored in the terminal, it is possible to reduce server load and network usage, as compared with the case where the metadata is stored in the server, and, whenever the metadata is necessary, the terminal requests the metadata from the server and receives and processes the metadata. Since the speed at which the user request is processed is increased, fast service provision is possible.

Even when the metadata is stored in the server and the terminal interactively requests the metadata, the base-layer metadata may be used. The use of the metadata browsing method is not limited to the COD service and is applicable to metadata of an IPTV service which will be variously introduced in the future as well as a Linear TV service.

Figure 8:
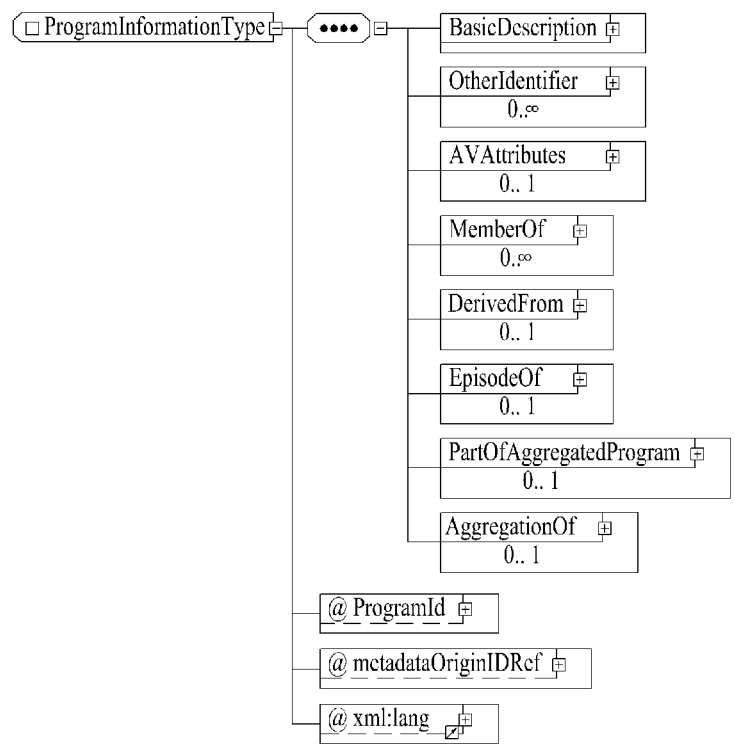

FIGS. 8 and 9 are diagrams showing an example of program information according to an embodiment of the present invention.

Figure 10:
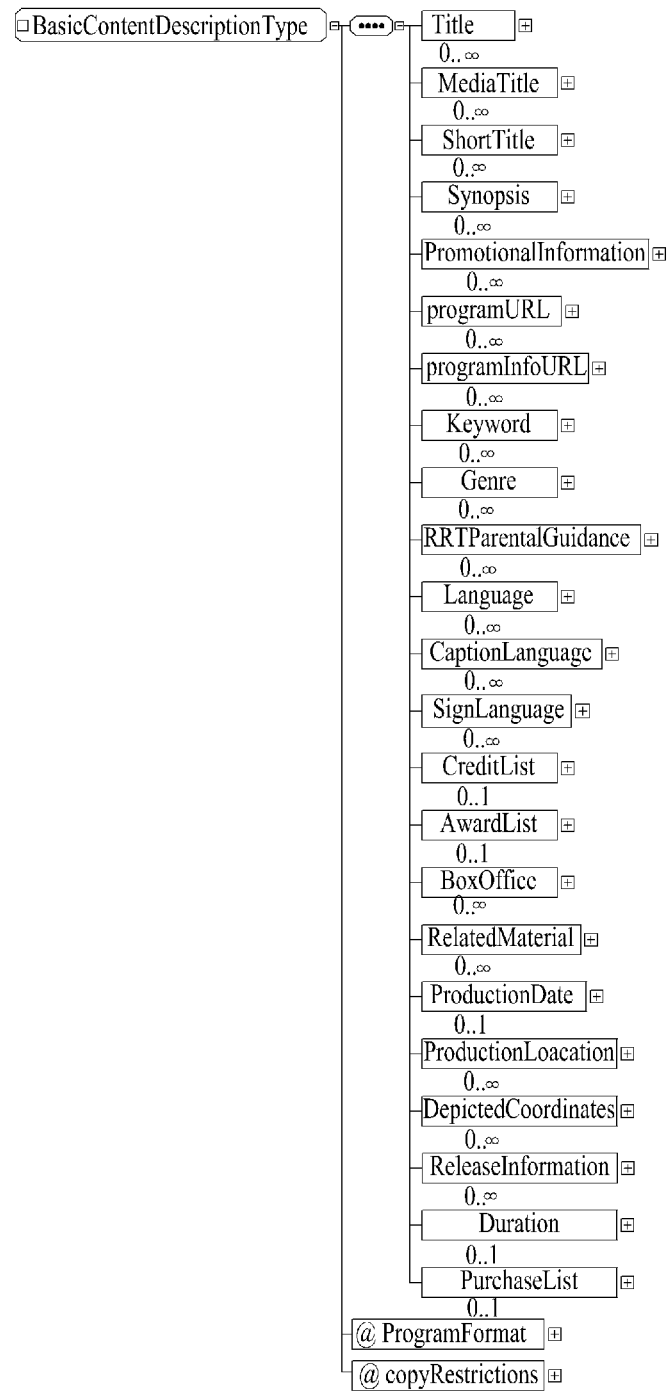

FIGS. 10 and 11 are diagrams showing an example of basic description according to an embodiment of the present invention.

Since the currently defined metadata format is too vast, it is difficult to efficiently provide a large amount of data for COD content. Even in a terminal having a restricted function, it is difficult to support the standard of a large amount of metadata.

In order to solve such a problem, in the present invention, metadata is configured and delivered using a third layer (or an n-layer (n being greater than 3)). In this case, by changing the level of detail of the metadata stepwise, different amounts of metadata can be provided although information about the same amount of content is provided. With respect to a small amount of metadata, brief information about a large amount of content is rapidly provided using list reception, inquiry, etc. and, when the user wants to view the detailed information, a large amount of information about a small amount of content is provided.

In order to provide information with different levels of detail, the following information configuration using three steps may be considered.

First, list information is provided. Only minimum information regarding each piece of content is provided for the purpose of list provision such that information about a large amount of content is efficiently transmitted.

Second, lightweight EPG information is provided. The configuration of the information is minimized such that terminals with restricted screen size, storage space and CPU processing capability, such as a mobile phone, can sufficiently process the information, but the information is configured to be suitably used for selecting the content. The amount of this information is greater than that of the list information, but is less than that of full EPG information.

Third, full EPG information is provided. This information includes the most detailed information including all types of metadata.

In the step of providing the full EPG information, all metadata elements defined in the EPG metadata can be used without restriction. In the remaining two steps, the information may be configured according to the following restriction.

The XML (eXtensible Markup Language) schema of an element including program (content) information is shown in FIGS. 8 and 9.

At this time, content metadata for the list information may be used with a restriction that only the following attributes and low-level elements are used.

ProgramID is an identifier for uniquely identifying a program (content) described by program information.

BasicDescription is included, but is restricted to include only the following description portion.

FIGS. 10 and 11 show the XML schema of BasicDescription Type. BasicContentDescriptionType provides basic information regarding a program (content) or a group composed of a set of programs and a super group composed of a set of groups.

The metadata for the list information may include the following fields. Such a restriction is applicable to the program, the group and the super group.

ShortTitle indicates the title of the program, in which a maximum of 80 English letters is supported.

Genre indicates the genre of the program.

RRTParentalGuidance indicates a rating value according to a parental guidance system.

Language is a description of supported spoken languages.

CaptionLanguage is a description of supported caption languages.

If the list information is minimized, the above restriction may be used. With respect to definition of metadata items having details of the list step, fewer or more embodiments may be possible.

Hereinafter, the other embodiments will be described.

The content metadata having the details of the lightweight EPG may be used with a restriction that only the following attributes and low-level elements are used.

ProgramID is an identifier for uniquely identifying a program (content) described by program information.

AVAttribute may include a low-level element and describes media attribute information of the audio/video of the program (e.g., codec, size, etc.)

BasicDescription is included, but is restricted to include only the following description portion.

Metadata having the details of the lightweight EPG information may include the following matters.

ShortTitle indicates the title of the program, in which a maximum of 80 English letters is supported.

ProgramInfoURL is a URL capable of acquiring additional program information.

Genre indicates the genre of the program.

RRTParentalGuidance indicates a rating value according to a parental guidance system.

Language is a description of supported spoken languages.

CaptionLanguage is a description of supported caption languages.

SignLanguage is a description of supported sign languages.

The synopsis is a textual description. In the lightweight EPG, a length attribute value is restricted to "short" so as to be restricted to a maximum of 90 English letters. This length is only exemplary and other values may be used.

CreditList indicates information about credited persons of the program and includes a maximum of five roles (main roles, production, scenario, etc.) and a maximum of three names per role. Since the lightweight EPG may not provide a separate table for persons in consideration of size, it is preferable that only the names of persons necessary for explaining a work are directly described.

If the information is configured using the three steps, all the delivery layers may be configured using three steps so as to respectively deliver information configurations, or two-step information configuration may be selected and delivered using two steps. The above 2-layer configuration is divided into the lightweight EPG and the full EPG.

Hereinafter, a method that represents purchase information using the above-described CoD service will be described in detail.

Before description of the method of representing purchase information, purchase-related terminologies used in the specification may be defined as follows.

First, an IPTV Product represents one or more programs that a user may purchase or join in, a program instance, or the collection of a service.

A Linear TV Service provides a continuous video stream from a service provider to a terminal, and represents a television service where a user may not control a time order in which content is transferred. The Linear TV Service may be generally configured with a plurality of continued program instances.

Moreover, a Media Instance is another term for program encoding.

Offering represents a usage term for accessing one or more programs, a program instance or the collection of a service. The usage term is not necessary, but includes payment.

A Program represents a work including video, audio, a character and/or graphic components that are played together, but the representation of the work is not limited thereto.

Moreover, Program Encoding represents the representation of a program. Different encodings may have different resolutions, encoding algorithms, or encryption algorithms.

A Program Instance represents specifically scheduled showing for the representation of a program, for example, a program or a specific instance of a program that is provided through a content on demand or push download service.

In the case of "content on demand" offering, the program instance may have a plurality of relevant encodings that have different resolutions or encryption attributes.

A Push Download service represents a service where programs are internally received and stored by a plurality of consumer devices, and whenever the consumer selects a program, the program is broadcasted in a file type for the program to be played from an internal storage medium. Also, the Push Download Service may be referred to as a Push CoD Service or a Download Based Content Distribution Service.

According to an embodiment, purchase information for purchasing a PPV or CoD program, for example, information regarding a purchase price and purchase terms may be included in PurchaseItem elements.

Moreover, the PurchaseItem elements may include may include a price element providing a purchase price (which is as a plurality of currencies when possible), a Purchase element providing an XML model for purchase terms (for example, a time period, the number of plays, etc.), a description element providing textual description for the purchase terms, a PricingServerURL element providing a location of a pricing server having more detailed information regarding the purchase terms, and start/end attributes providing a time period where corresponding purchase information is valid.

Each PPV or CoD program is relevant to a PurchaseList element, which may include a list of the PurchaseItem element providing prices and terms suitable for purchasing a corresponding program.

Figure 12:
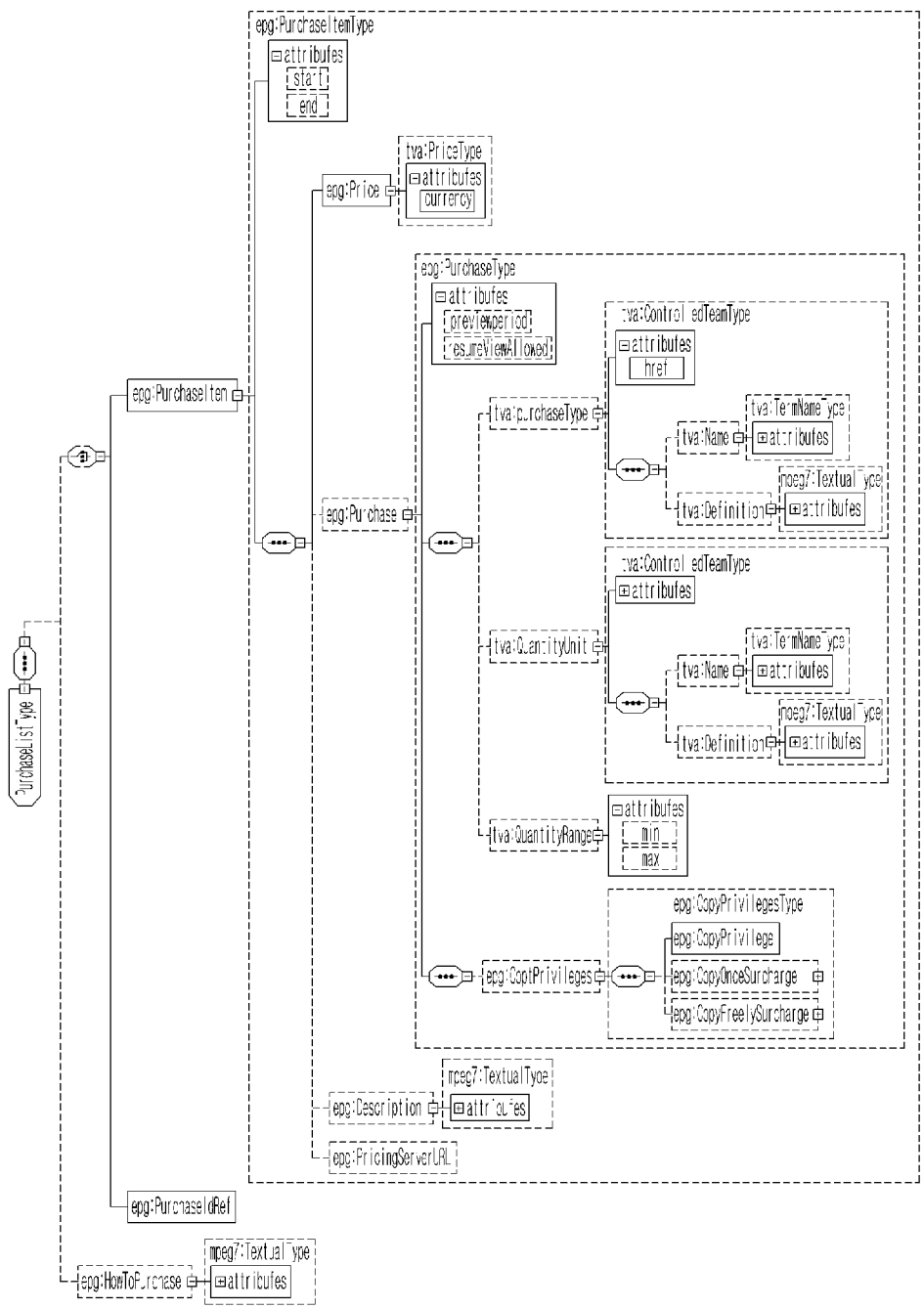
FIG. 12 is a diagram illustrating a configuration of purchase list information according to a first embodiment.

FIG. 12 is a diagram illustrating a configuration of purchase list information according to a first embodiment, and defines the type of a PurchaseList element including the purchase list information in an XML schema.

The purchase list is a list for purchase items, and the purchase list information may include description on purchase terms of an IPTV product associated with the purchase list.

Referring to FIG. 12, the PurchaseList element may include PurchaseItem element providing information regarding purchasable items, a PurchaseIdRef element that provides information regarding separately signaled purchasable items in a reference type with a purchase information table, and a HowToPurchase element providing textual description on a purchase method.

The PurchaseList element having a configuration that is as described above with reference to FIG. 12 may be included in ServiceInformation elements, a BasicContentDescription element for ProgramInformation, GroupInformation and SuperGroupInformation elements, or an InstanceDescription element for ProgramLocation elements (for example, ScheduledEvent, BroadcastEvent, OnDemandProgram or PushDownloadProgram element), thereby being provided.

That is, the PurchaseList element representing the purchase list information may exist in a lower location of Instance metadata, Service or Program information and represent purchase information regarding a corresponding program or instance, or may represent purchase information regarding a program or an instance in a purchase information table on the basis of the PurchaseIdRef element.

In this case, since content provided for purchase is not a program itself but is a specific instance such as a scheduled event, an on demand program or a push download program, the PurchaseList element may not exist in the above-described BasicDescription elements.

Moreover, since a corresponding program or instance is not included in the PurchaseList element, purchase information regarding content where instances based on purchase models having various versions or prices exist may not efficiently be represented.

According an embodiment, a purchase identifier for identifying a purchasable product (for example, a specific service, a specific program or a specific program instance) is defined, and thus various purchase models may be supported. Herewith, by clearly representing a relationship between an IPTV product applying purchase information and an EPG metadata associated with purchase information, the purchase information can be efficiently processed.

Hereinafter, embodiments of a method that gives a purchase identifier for identifying content being the purchasable IPTV product will be described in detail.

In an embodiment of the method of giving the purchase identifier, a content identifier may be given to one content, and an instance identifier may be given to each of actually purchasable instances for corresponding content.

For example, a Content Reference IDentifier (CRID) as a content identifier may be given to a movie "Spider Man" being purchasable content. An Instance Metadata Id (IMI) as an instance identifier may be given for each of the High Definition (HD) version and Standard Definition (SD) version of the movie "Spider Man".

In this case, metadata for specific purchasable content is not duplicated for each instance, but only one metadata exists for corresponding content. Additional metadata is provided for each instance, and thus metadata for content and instances can be efficiently configured.

To uniquely identify actually purchasable content by using the above-described purchase identifier, a content identifier (for example, CRID) given to the content and an optionally desired instance identifier (for example, IMI) may be combined.

As another embodiment of the method of giving the purchase identifier, a unique identifier may be given for each Content Instance.

For example, a CRID being a separately unique content identifier may be given for each of the HD version and SD version of the movie "Spider Man".

In this case, the purchase identifier represents an instance of specific content, and thus an operation that searches actually purchasable instances can be more simplified when purchasing content.

Hereinafter, a method that represents purchase information with the above-described purchase identifier will be described in detail.

Figure 13:
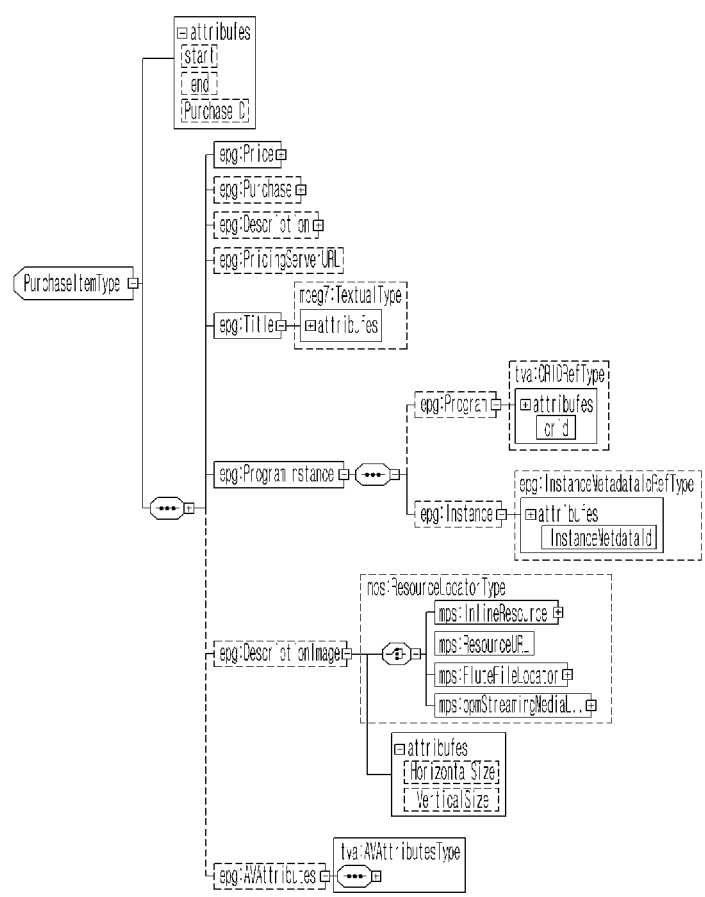

FIGS. 13 and 14 are diagrams illustrating a configuration of purchase item information according to a first embodiment, and define the type of a PurchaseItem element including the purchase item information in an XML schema.

Referring to FIGS. 13 and 14, the PurchaseList element may designate purchase information (for example, a purchase prices and term) regarding an offer.

The Price element represents the price of a corresponding offer, for which the price element may have a plurality of instances for different currencies.

Moreover, the Purchase element represents additional purchase terms for a corresponding offer. The description element represents free textual description for a corresponding offer.

The PricingServerURL element represents a pointer for a server that may receive additional information regarding a corresponding offer.

A Title element included in the PurchaseItem element represents a name of purchase information (for example, a purchase price and term) that is represented by the corresponding PurchaseItem element.

That is, the Title element is a text name representing pertinent purchase information, and may be used as a title representing pertinent purchase information when providing information of a purchasable item to a user through a user interface. The Title element may be useful when information of purchasable items is displayed in a list type or displayed on a small-size screen.

The title element may have multiple instances for different languages.

Moreover, a Program Instance element included in the PurchaseItem element designates a purchasable program instance on the basis of corresponding purchase information. Only one Program Instance element may be defined as existing, or one or more ProgramInstance elements may be defined as existing.

The PurchaseItem element may include a DescriptionImage element. The DescriptionImage element may provide location information (for example, a locator) of an image including description for a purchase price and term that are represented by the PurchaseItem element.

That is, by displaying a bitmap image designated by the locator that is provided by the DescriptionImage element on a screen, the IPTV receiver may display detailed information of the purchase information on the screen, in which case the IPTV receiver may add description and a corresponding bitmap image to easily provide support even for an added purchase model without extension of metadata.

The DescriptionImage element may exist as one or more, even in the PurchaseItem element.

An AVAttribute element included in the PurchaseItem element may designate an Audion/Video (A/V) attribute of a purchasable program instance on the basis of corresponding purchase information.

Moreover, a start attribute of the PurchaseItem element represents a start date and time for a valid period of a corresponding offer, and an end attribute of the PurchaseItem element represents an end date and time for a valid period of a corresponding offer.

According to an embodiment, the PurchaseItem element may further include a PurchaseID attribute other than the start/end attributes. The PurchaseID attribute may uniquely identify purchase information designated by a corresponding PurchaseItem element.

In this case, a purchase identifier designated by the PurchaseID attribute may identify a purchase term for a specific program instance designated by the PurchaseItem element, for which a program instance having a purchase term identified by the purchase identifier may exist in the PurchaseItem element. But, it is possible that the purchase term is implicitly designated according to the location of the PurchaseItem element.

The above-described purchase identifier may uniquely identify purchase terms for a plurality of program instances. A plurality of program instances to which the same purchase term is applied may be designated with the ProgramInstance element.

In this case, purchase information designated by the PurchaseItem element may be transferred with a purchase information table, and provided in a scheme referencing purchase information included in the purchase information table.

Moreover, the purchase identifier may be designated to identify a purchase term for a content group sharing a specific attribute.

In this case, a plurality of contents having a specific attribute such as an AV format, a release date or a genre are grouped as one according to various business requirements or purposes, and thereafter a purchase term applied to a corresponding group may be identified by the purchase identifier.

Information of a corresponding content group and purchase information are bundled and provided for identifying a purchase term for a content group sharing the specific attribute, but respective contents included in a corresponding content group may not directly designated.

That is, the ProgramInstance element for contents included in a corresponding content group does not exist. Corresponding purchase information may be transferred with the purchase information table, and provided in a scheme referencing purchase information included in the purchase information table.

Moreover, the purchase identifier may not designate specific content but identify only purchase information, in which case the purchase information may be transferred to identify only a specific purchase term with the purchase information table and provided in a scheme referencing purchase information included in the purchase information table.

According to another embodiment, the above-described purchase identifier may be used for identifying purchase information, and moreover, for recording information of content purchased by a user in a user profile and then acquiring use authority information necessary for consumption of the purchased content.

Hereinafter, methods of identifying information (i.e., a purchase history) of content that a user has purchased with the purchase identifier will be described in detail.

In a first method, the purchase history may be identified with a content identifier, an Instance identifier, and a purchase identifier.

For example, the first method may optionally combine the content identifier and the Instance identifier for identifying a specific instance of specific content, and may identify a corresponding purchase history by additionally using the purchase identifier for identifying detailed purchase information (for example, purchase term, etc.) regarding a corresponding instance.

The above-described purchase history identification method may be used for various methods where the purchase identifier is designated for identifying purchase information. Among usage terms that have been applied for a specific content instance according to various price policies, a usage term a user has purchased and acquired may be accurately represented.

In a second method, the purchase history may be identified using only a purchase identifier.

The second method is a method that may be used when the purchase identifier is designated to uniquely identify purchase information regarding a specific content instance. The second method may designate a purchase item or a purchase history only with the purchase identifier, but is required to give a unique identifier by combination of all purchasable items.

When a user searches desired content with an EPG metadata and completes purchase, as described above, purchase history information that may be identified with a purchase identifier may be stored in a user profile, and consumption (for example, viewing) for the purchased content may be performed on the basis of a purchase history list stored in the user profile.

For example, a device of a user that desires to consume pre-purchased content may check which content the user has already purchased and instance thereof (for example, a content instance that is deployed in a specific format such as an HD version or an SD version), and with what authority the user may perform consumption for the purchased content instance, on the basis of information associated with a purchase history stored in the user profile.

The consumption authority may represent whether the number of views or a viewing-enabled period is limited like a usage term, and be acquired with the above-described purchase identifier.

Therefore, the IPTV receiver determines whether a content consumption request of a user is appropriate, on the basis of information regarding a content instance based on the purchase history and a consumption authority thereof, and thereafter, only when the content consumption request is appropriate, the consumption of the requested content may be performed.

The above-described purchase information may be transmitted in a multicast scheme and used in a state where the purchase information is stored in the IPTV receiver. Alternatively, the purchase information may be received and used in a unicast scheme at a time when an actual purchase transaction is performed.

Moreover, the purchase information may be provided in a lite layer or higher among the layer-based transmission schemes that have been described above with reference to FIGS. 8 to 11, and thus, transmission efficiency of the EPG metadata can be enhanced.

Hereinafter, as an embodiment of a method that identifies a specific purchasable item by using only the purchase identifier among the purchase item identification methods, a method of identifying offering that indicates one or more programs, a program instance or collection of a service, and usage terms thereof, with an offer ID, will be described in detail.

According to an embodiment, an XML schema for defining the type of EPG metadata may extend the definition of ServiceInformationType, for adding OtherIdentifier elements for ProgramInformation, GroupInformation, SuperGroupInformation and ProgramLocation elements.

The OtherIdentifier element, as another use, may be used as a CreatorAssetId identifier (which is defined in the ATIS IPTV content on demand standard).

The MXL type of the OtherIdentifier element may be "mpeg7:UniqueIDType", and may be defined by extending the XML string type for adding attributes of names that are called a type, an organization, an authority and a text.

Moreover, the definition may declare a default value of a type attribute as URI, and declare the encoding attribute as a text.

When the OtherIdentifier element is used as the CreatorAssetId identifier, the attributes may be defined as follows.

1. The value of the type attribute of the OtherIdentifier element shall be "CreatorAssetId".
2. The value of the organization attribute of the OtherIdentifier element shall be "ATIS".
3. The value of the encoding attribute of the OtherIdentifier element shall be "text".
4. The base string value of the OtherIdentifier element shall conform to the syntax and semantics of a "CreatorAssetId" as defined in the ATIS Conten On Demand standard.

As described above, to simplify the using of the OtherIdentifier element as the CreatorAssetId, a default value for the organization attribute of the OtherIdentifier element may be designated as ATIS when another value is not specifically provided.

When the OtherIdentifier element is used as the CreatorAssetId, the type attribute is required to be defined as the CreatorAssetId because the type attribute differs from a default value that has been defined in MPEG-7.

However, the encoding attribute is not required to be defined because the default value is a text.

In order to uniquely identify the offering (which is the combination of the product to be purchased and the purchase terms), the XML schema may add a new offerId attribute (which is the attribute of the XML type gt:assetIDType) to the items of the PurchaseList elements.

XML schema definition for "gt:assetIDType" may be represented in ATIS global types specification.

Moreover, the values of the offerId attributes represent the CreatorAssetId, for which they may be based on the syntax and semantics of the CreatorAssetId defined in the ATIS content on demand standard.

The offerId may be used for identifying the above-described purchase history, and correspond to a method that identifies a specific purchase history by using only a purchase identifier, among the purchase history identification methods.

FIGS. 15 to 17 are diagrams illustrating an embodiment of a configuration of purchase list information, and define the type of PurchaseListItem element for representing an in-line PurchaseItem element of a purchase list, in the XML schema.

Referring to FIGS. 15 to 17, the offerId attribute is an example of a purchase identifier for identifying a purchase-enabled item, and may identify offering that indicates the combination of one or more purchase-enabled items and purchase terms thereof.

That is, the offerId attribute included in the PurchaseListItem element may be a purchase identifier (i.e., a globally unique identifier) for uniquely identifying the entire combination of a product to which the PurchaseList is added and a purchase term based on the PurchaseListItem element.

The PurchaseItemType included in the PurchaseListItem element may be defined, as described above with reference to FIGS. 13 and 14. In this case, however, as a purchase identifier for uniquely identifying a purchase-enabled product and a purchase term thereof, the PurchaseID attribute of FIGS. 13 and 14 may be replaced with the above-described offerId attribute.

FIGS. 18 to 20 are diagrams illustrating an embodiment of a configuration of purchase list reference information, and define the type of PurchaseListRef element for representing the PurchaseIdRef element of the purchase list, in the XML schema.

Referring to FIGS. 18 to 20, the PurchaseListRef element references PurchaseInformation in the purchase information table, for providing purchase information.

As described above with reference to FIGS. 15 to 17, the offerId attribute may identify offering that indicates the combination of one or more purchase-enabled items and purchase terms thereof.

That is, the offerId attribute included in the PurchaseListItem element may be a purchase identifier (i.e., a globally unique identifier) for uniquely identifying the entire combination of a product to which the PurchaseList is added and a purchase term that is referenced by the PurchaseListItem element.

FIGS. 21 to 23 are diagrams illustrating a configuration of purchase list information according to a second embodiment, and define the type of PurchaseList element including the purchase list information, in the XML schema.

Purchase items in the purchase list may be described inside the PurchaseList element, or identified by referencing the purchase items of the purchase information table.

Moreover, each item of the purchase list may be associated with the offerId attribute being a purchase identifier that represents the combination of purchase-enabled products and purchase terms thereof. The offerId attribute may be based on the syntax and semantics of the CreatorAssetId that has been defined in the ATIS CoD standard.

Referring to FIGS. 21 to 23, the PurchaseItem element included in the PurchaseList element represents a purchase term for one offer, and the PurchaseIdRef element represents the PurchaseInformation of the purchase information table that provides the purchase term for one offer.

For example, a value designated in the PurchaseIdRef element may be matched with the purchaseId attribute of the PurchaseInformation in the purchase information table.

A HowToPurchase element may provide textual description for a method that performs purchase such as a call-enabled telephone number.

FIGS. 24 to 26 are diagrams illustrating a configuration of purchase item information according to a second embodiment, and define the type of PurchaseItem element included in the PurchaseList element, in the XML schema. In description on the PurchaseItemType of FIGS. 24 to 26, detailed description that is repetitive of FIGS. 13 and 14 will not be provided.

Referring to FIGS. 24 to 26, a name element is similar to the title element that has been described above with reference to FIGS. 13 and 14, and represents names of purchase prices and terms that are represented by the PurchaseItem element, for which the name element may have multiple instances for different languages.

Moreover, a DescriptionImage element provides a locator for an image including description of purchase prices and terms that are represented by a corresponding PurchaseItem element.

A DRMDeclaration element included in the PurchaseItem element represents digital right information related to a corresponding offer.

Hereinafter, an embodiment of a configuration of a purchase element included in the PurchaseItem element will be described in detail with reference to FIGS. 27 to 38.

The purchase element is a sub-element for providing the following selective addition purchase terms, and may be included in the PurchaseItem element.

Copy privileges ("Copy never", "Copy once", "Copy freely"), and optionally surcharge prices for "Copy once" and "Copy freely" if they are not allowed by the base purchase.

Trick mode restrictions

Free preview period (length of time program can be viewed before payment will be incurred).

A flag indicating whether viewer will be able to suspend viewing of the program and resume viewing of it later without additional charge.

FIGS. 27 to 29 are diagrams illustrating an embodiment of a configuration of copy control information included in the PurchaseItem element, and define the type of CopyControlInformation element including the copy control information, in the XML schema.

Referring to FIGS. 27 to 29, the CopyControlInformation element is for designating a copy control level, and CopyNever represents that copy is not allowed. CopyOnce represents that only one-time copy is allowed, and CopyFreely represents that copy is allowed without limit.

FIGS. 30 to 32 are diagrams illustrating an embodiment of a configuration of copy privileges information included in the PurchaseItem element, and define the type of CopyPrivileges element including the copy privileges information, in the XML schema.

Referring to FIGS. 30 to 32, the CopyPrivileges element designates copy privileges included in a base price, and may selectively designate prices for additional authorities.

The CopyPrivileges element included in the CopyPrivileges element represents the copy privileges included in the base price of an offer, and a CopyOnceSurcharge element represents a fee which may be paid for allowing one-time copy that is not included in the base price.

Moreover, the CopyOnceSurcharge element represents a fee which may be paid for allowing free copy that is not included in the base price.

FIGS. 33 to 35 are diagrams illustrating an embodiment of a configuration of trick mode restriction information included in the PurchaseItem element, and define the type of TrickModeRestriction element including the trick mode restriction information, in the XML schema.

Referring to FIGS. 33 to 35, the TrickModeRestriction element may designate the kinds of disallowed trick modes as a value of pause, fastforward (FF) or rewind (RW).

FIGS. 36 to 38 define the type of purchase element including information of the above-described additional purchase terms, in the XML schema.

Referring to FIGS. 36 to 38, the purchase element is for designating a purchase model for a PPV or CoD offer. As described above, the purchase element may include the CopyPrivileges element representing the copy privileges that are included in the offer, and the TrickModeRestriction element representing the kinds of disallowed trick modes.

Moreover, a previewPeriod attribute included in the purchase element designates a preview period that is allowed by the offer, for example, may represent the sum of times where a program may be played without expense.

A resumeViewAllowed attribute is a flag representing whether a consumer may stop play without paying additional fee and then again start play, in a corresponding offer.

Figures 41, 42:
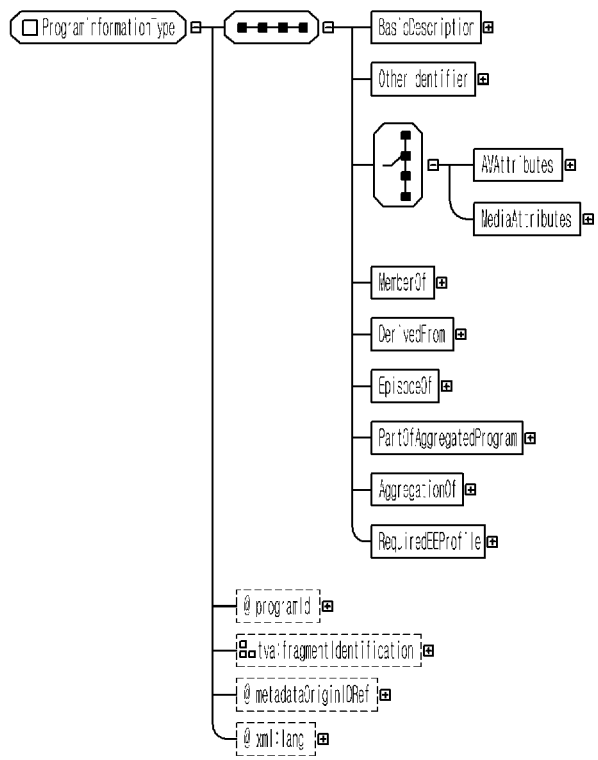

FIGS. 39 to 41 are diagrams illustrating an embodiment of a configuration of a purchase information table, and define the type of PurchaseInformation element included in the purchase information table, in the XML schema.

Referring to FIGS. 39 to 41, each PurchaseInformation element of the purchase information table is extension of the PurchaseItem element, and may be defined by adding fragment identification information.

For example, the PurchaseInformation element may include the PurchaseItem element that has been described above with reference to FIGS. 24 to 26. The PurchaseInformation element may include a PurchaseId attribute and be transmitted as fragments.

The PurchaseId attribute is for identifying the PurchaseInformation element, and uniquely identifies a corresponding PurchaseInformation element among all the PurchaseInformation elements of the purchase information table.

As described above, the PurchaseInformation element of the purchase information table may be referenced from the PurchaseList by using the PurchaseIdRef element included in the PurchaseList.

Hereinafter, embodiments of a method where the PurchaseList element including purchase information is transmitted will be described in detail with reference to FIGS. 42 to 56.

FIGS. 42 to 44 are diagrams illustrating a configuration of program information according to a first embodiment, and define the type of ProgramInformation element including the program information, in the XML schema. In a configuration of the ProgramInformation element of FIGS. 42 to 44, detailed description that is repetitive of FIGS. 8 and 9 will not be provided.

Referring to FIGS. 42 to 44, the ProgramInformation element includes the BasicDescription element that has been described above with reference to FIGS. 10 and 11. A PurchaseList element including purchase information may be included in the BasicDescription element for the ProgramInformation element and transmitted.

The ProgramInformation element may include an AVAttributes element and a MediaAttributes element, and provide choice for the AVAttributes element or the MediaAttributes element.

The AVAttributes element may be used when a corresponding program has only one media instance (encoding) associated with it, in which case only one instance for the AVAttributes element may be represented.

The MediaAttributes element is for describing attributes for the media instance (encoding) of a program that is described by a corresponding BasicContentDescriptionType element, and is used when the program has multiple media instances (encodings).

That is, when a program has multiple media instances (for example, a plurality of different encoding resolutions or formats) associated with it, attributes of the multiple media instances may be described with the MediaAttributes element, for which multiple occurrences for the MediaAttributes element may be allowed.

Figures 47, 48:
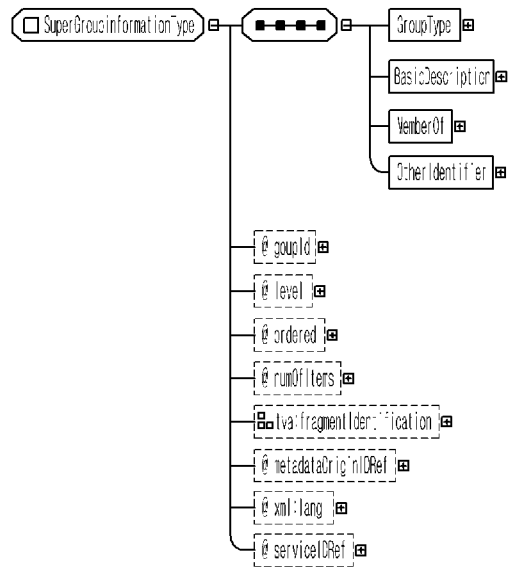

FIGS. 45 to 47 are diagrams illustrating a configuration of group information according to a first embodiment, and define the type of GroupInformation element including the group information, in the XML schema.

Referring to FIGS. 45 to 47, the GroupInformation element may include the BasicDescription element that has been described above with reference to FIGS. 10 and 11. A PurchaseList element including purchase information may be included in the BasicDescription element for the GroupInformation element and transmitted.

A MemberOf element included in the ProgramInformation element may provide a pointer for a super group where a corresponding group is included as a member, and a crid attribute value of a corresponding MemberOf element may be matched with a GroupId of a SuperGroupInformation element.

FIGS. 48 to 50 are diagrams illustrating a configuration of super group information according to a first embodiment, and define the type of SuperGroupInformation element including the super group information, in the XML schema.

Referring to FIGS. 48 to 50, the SuperGroupInformation element may represent the collection of program groups such as a family of relevant series (for example, a family of Star-Treck series or "Law and Order" series).

Moreover, the SuperGroupInformation element may include the BasicDescription element that has been described above with reference to FIGS. 10 and 11. A PurchaseList element including purchase information may be included in the BasicDescription element for the SuperGroupInformation element and transmitted.

A MemberOf element may designate SuperGroup(s) including SuperGroup that is represented by a corresponding SuperGroupInformation element. Each MemberOf element may provide a GroupId of a SuperGroupInformation element having a level higher than that of a corresponding SuperGroupInformation element.

The level attribute may provide a level of SuperGroup that is represented by a corresponding SuperGroupInformation element in Program/Group/SuperGroup hierarchy.

FIGS. 51 to 53 are diagrams illustrating a configuration of service information according to a first embodiment, and define the type of ServiceInformation element including the service information, in the XML schema.

A PurchaseItem element including purchase information may be included in the ServiceInformation element of FIGS. 51 to 53 and transmitted. For example, the PurchaseItem element may exist inside an element that is defined as ServiceInfoType.

The PurchaseList element may be included in an InstanceDescription element for ProgramLocation elements such as ScheduleEvent, BroadcastEvent, OnDemandProgram or PushDownLoadProgram, and transmitted.

FIGS. 54 to 56 are diagrams illustrating a configuration of instance description included in program location information according to a first embodiment, and define the type of InstanceDescription element including the instance description, in the XML schema.

Referring to FIGS. 54 to 56, the InstanceDescription element may be provided as a base of description for program showing such as one of a scheduled event and on-demand offering. The InstanceDescription element may include a PurchaseList element representing a list of purchase terms for a product that is described by the InstanceDescription element.

A PurchaseList element included in the InstanceDescription element, as described above, may include a unique identifier for each offering (i.e., the combination of a product and a purchase term).

Moreover, the InstanceDescription element may include an AVAttributes element and a MediaAttributes element, and provide choice for the AVAttributes element or the MediaAttributes element.

The MediaAttributes element is for describing attributes for the media instance (encoding) of a program instance that is described by a corresponding InstanceDescriptionType element, and is used when the program instance has multiple media instances (encodings).

That is, when ProgramLocation such as Video-on-Demand offering has multiple media instances (for example, a plurality of different encoding resolutions or formats) associated with it, attributes of the multiple media instances may be described with the MediaAttributes element, for which multiple occurrences for the MediaAttributes element may be allowed.

In an IPTV CoD service according to an embodiment, a user may purchase a specific program, and the purchased program may be viewed even with a device the program has purchased and devices other than it.

Moreover, the program may be used as multiple encodings, for example, multiple media instances based on different resolutions or encoding methods, according to characteristics of different devices.

Therefore, when a user desires to view a purchased program with a specific device, determining which media instance of a corresponding program is appropriate for the device may be required.

For example, when a device intending to view a purchased program requests a corresponding program with an identifier of a program, a server of an IPTV service provider domain may check user profile information regarding the characteristics of the device, check internal metadata about media instances available for the requested program, and select a media instance most appropriate for a corresponding device.

In another method, when information regarding media instances available for respective programs is provided to a device intending to view a purchased program, the device may select the most appropriate media instance on the basis of the provided information and then request the selected media instance with its own identifier.

To select a media instance appropriate for a specific device, as described above, it is required to provide metadata about multiple encodings for representing information of selection-enabled encodings of a specific program.

According to an embodiment, information regarding multiple encodings available for a specific program or program instance may be provided with the MediaAttributes element that has been described above with reference to FIGS. 42 to 44 and 54 to 56.

FIG. 57 illustrates another embodiment of an element which is defined for describing the above-described properties of multiple encodings for a program.

Referring to FIG. 57, by replacing the AVAttributes element of a ProgramInformationType fragment, which has been described above with reference to FIGS. 8 and 9, with one of the AVAttributes element that is limited to one occurrence and the MediaInstance element that allows multiple occurrences, properties of multiple encodings for one content item may be described.

The method that has been described above with reference to FIG. 57 does not increase occurrence that is allowed for the AVAttributes element, and thus may provide a current schema and forwards and backwards compatibility.

FIG. 58 illustrates another embodiment of an element which is defined for describing the properties of multiple encodings for a program.

Referring to FIG. 58, by creating a media information table including a set of MediaInformation elements, properties of multiple encodings for one content item may be described.

Each MediaInformation element of FIG. 58 may include one ContentID and a list of media descriptions. Each of the media descriptions may include one MediaID and AVAttributes element.

Therefore, when an arbitrary device desires to know multiple media encodings for a content item having specific ContentID, the device may find a MediaProperties element matched with the ContentID from the media information table, and acquire descriptions for all media encodings that corresponds to corresponding ContentID by using each MediaID.

Hereinafter, a method according to an embodiment that receives, displays and processes purchase information to perform purchase transaction will be described in detail with reference to FIGS. 59 to 84.

Figure 59:
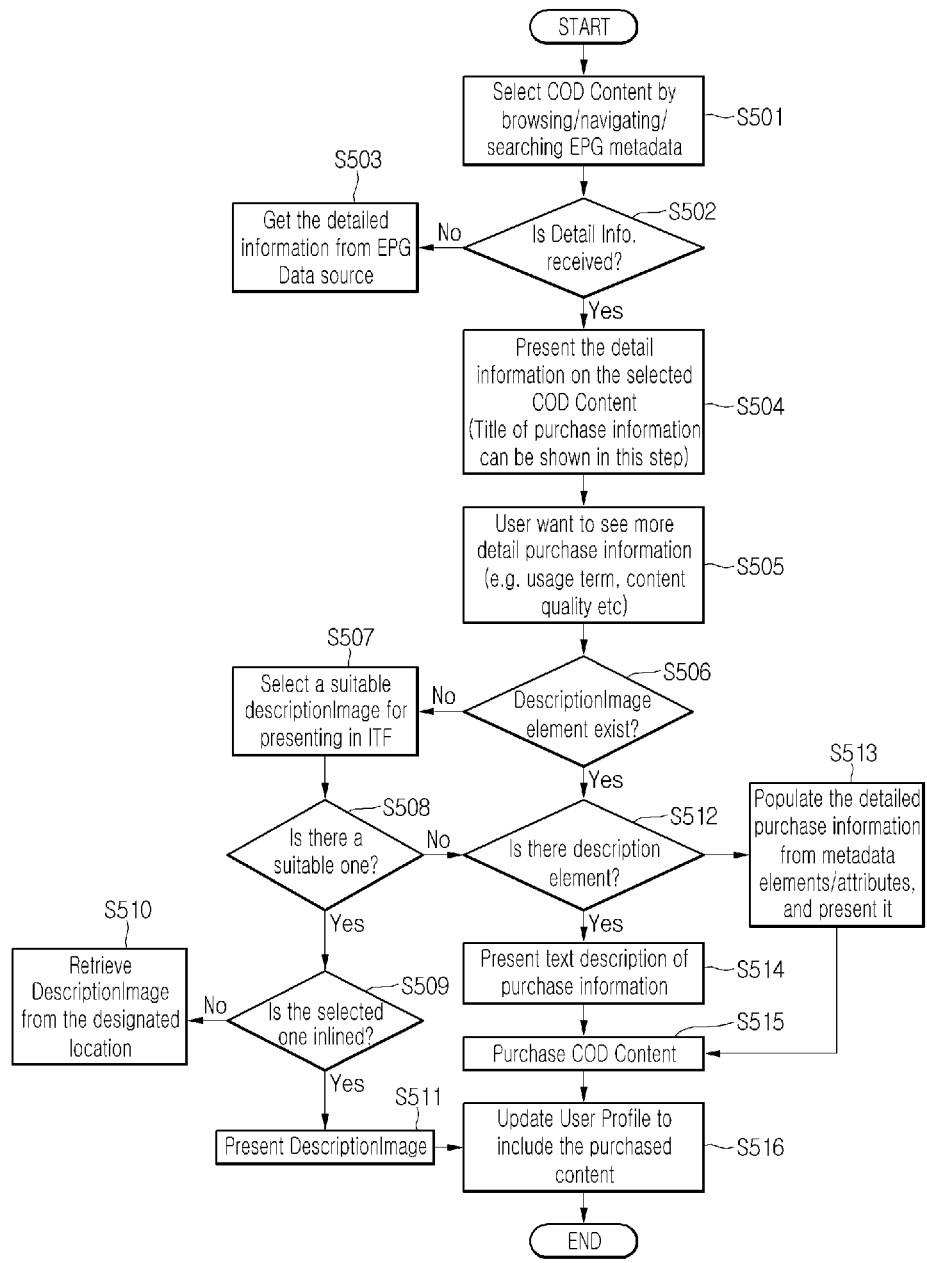
FIG. 59 is a flowchart illustrating a method where an IPTV receiver displays purchase information, according to an embodiment.

FIG. 59 is a flowchart illustrating a method where an IPTV receiver displays purchase information, according to an embodiment. Purchase information used in the purchase information display method of FIG. 59 may have the configuration that has been described above with reference to FIGS. 12 to 58, and thus its detailed description will not be provided.

Referring to FIG. 59, the IPTV receiver selects CoD content through an operation of browsing, navigating or searching EPG metadata in operation S501, and checks whether detailed information regarding the selected CoD content is received in operation S502.

When the detailed information is not received, the IPTV receiver acquires detailed information regarding the selected CoD content from an EPG data source in operation S503.

When the detailed information has already been received, the IPTV receiver displays the detailed information regarding the selected CoD content in operation S504.

For example, when the detailed information is included in the EPG metadata and is received by the IPTV receiver together with program information, the IPTV receiver may display the detailed information regarding the selected CoD content to provide the detailed information to a user, by using the received EPG metadata.

Moreover, when the detailed information regarding the selected CoD content is not received, the IPTV receiver may receive the detailed information regarding the selected CoD content from an EPG data source, in the multicast scheme or the unicast scheme that has been described above with reference to FIGS. 2 and 3.

The detailed information displayed in operation S504 may be a title of purchase information regarding the selected CoD content. The title of the purchase information may be provided using the title element of the PurchaseItemType that has been described above with reference to FIGS. 13 and 14 or the name element of the PurchaseItemType that has been described above with reference to FIGS. 24 to 26.

The displayed title is short title information and may represent basic content of purchase information regarding the selected CoD content. For example, when a title such as "Spider Man HD-7 viewing authority" is given for the purchase information regarding the selected CoD content, a user may easily recognize purchase information indicating that an HD version of content "Spider Man" may be viewed for seven days.

Moreover, when a user has various types of selection authorities for purchasing the selected CoD content, the detailed information displayed in operation S504 may be displayed multiple titles for the purchase information in a list type, and the multiple titles may provide base purchase information regarding multiple purchase models capable of purchase, respectively.

Detailed information such as the title of the purchase information is displayed in operation S504, and then, the user of the IPTV receiver may desire to check the more detailed information regarding the selected CoD content in operation S505.

For example, the user may select the detailed information displayed in operation S504, for example, one of titles for one or more purchase information, and check a usage term for the selected purchase information and a detailed purchase term such as content quality.

In a first method for providing the purchase term, the purchase term may be displayed in a metadata type and transferred to the IPTV receiver.

The first method is a method of defining a schema (for example, an XML schema) that allows the purchase term to be expressed in a metadata type. The IPTV receiver may display the described purchase term to the user based on the defined schema, thereby representing detailed purchase information.

For example, the PurchaseItem element that has been described above with reference to FIGS. 13 to 40 defines the price element, the purchase element, the PricingServerURL element, DRMDeclaration element, the start attribute and the end attribute, thereby enabling the definition of detailed purchase information such as purchase prices and terms for an offer.

In this case, when a new type of purchase term is subsequently added by a purchase-related business model, the extension of the defined schema may be required, and the software update of the IPTV receiver may be required for applying the extended schema.

In a second method for providing the purchase term, the purchase term may be described in a text description type and transferred to the IPTV receiver.

The second method is a method that does not describe the purchase term in a metadata type but expresses the purchase term in a plain text type or rich text type of description. The second method may display the purchase term described in the text description type as-is to provide the purchase term to the user.

For example, free text description such as purchase terms for a corresponding offer may be performed with the description element of the defined PurchaseItemType that has been described above with reference to FIGS. 13 to 40.

As described above, by providing the purchase information in a text type, various types of purchase terms may be easily expressed, and a new type of purchase term may be expressed in a text type without separate extension.

In a third method for providing the purchase term, the purchase term may be expressed in bitmap image type and transferred to the IPTV receiver.

The third method is a method that expresses a webpage representing purchase terms in a bitmap type. The IPTV receiver may display the purchase term described in the text description type as-is to provide the purchase term to the user.

For example, an image including description for the purchase prices and terms of a corresponding offer may be transferred to the IPTV receiver by using the DescriptionImage element of the defined PurchaseItemType that has been described above with reference to FIGS. 13 to 40.

By expressing the purchase terms with various graphic factors using the transferred bitmap image, the third method enables easy understanding of the user compared to a case where detailed purchase information such as purchase terms is expressed only in a text type.

The purchase term may be expressed as multiple bitmap images according to screen resolutions, and therefore, the IPTV receiver may select an image appropriate for its own resolution to display the selected image without a separate middleware or browser.

For this, the DescriptionImage element includes information regarding the resolution of a bitmap image as an attribute, and the IPTV receiver may select an image appropriate for its own resolution from among multiple bitmap images to display the selected image by using the attribute associated with the resolution.

Moreover, the DescriptionImage element may include an in-line bitmap image representing the purchase price and term in a type where ResourceLocator is extended, or designate a locator (for example, a location in a server) for the bitmap image.

The IPTV receiver checks whether the DescriptionImage element exists in the EPG metadata in operation S506. When the DescriptionImage element exists in the EPG metadata, the IPTV receiver selects a description image appropriate for display in operation S506.

Subsequently, when a description image appropriate for the IPTV receiver exists in operation S508, the IPTV receiver checks whether the description image is included in the DescriptionImage element (in-lined) in operation S509.

When the description image is not in-lined, the IPTV receiver receives the description image from a locator that is designated in the DescriptionImage element in operation S510, and thereafter displays the received description image in operation S511.

When the description image is in-lined, the IPTV receiver immediately receives the description image included in the DescriptionImage element in operation S511.

For example, the IPTV receiver may display a bitmap image that is in-lined in the DescriptionImage element. Alternatively, the IPTV receiver may access a server to receive and display the bitmap image by using a locator that is designated in the DescriptionImage element, and thus provide detailed purchase information such as purchase terms to the user.

When the DescriptionImage element does not exist, the IPTV receiver checks whether the description element exists in operation S512.

When the description element does not exist, the IPTV receiver acquires detailed purchase information from metadata elements or attributes, and displays the acquired information in operation S513.

This is a case where the detailed purchase information such as the purchase terms is not expressed in a type such as text description or a bitmap image but described and transferred in a metadata type. The IPTV receiver may acquire the detailed purchase information from the EPG metadata that has been received according to a predetermined schema.

When the description element exists, the IPTV receiver displays text description included in the description element to provide the detailed purchase information to the user in operation S514.

When the user checks the detailed purchase information such as the displayed purchase term and requests purchase, the IPTV receiver performs purchase processing for corresponding CoD content in operation S515, and thereafter updates a user profile so as to include the purchased content in operation S516.

According to an embodiment, purchase information (for example, purchase information that is the combination of an identifier for the content and a purchase identifier) for the purchase content may be applied to the user profile, and thus, information regarding the purchase history of the user may be stored and maintained.

Subsequently, when the purchased content is actually consumed, the IPTV receiver may check the purchase information stored in the user profile to determine whether the user has an authority appropriate for corresponding content, and check which instance of multiple purchasable media instances for the content is appropriate for play in a corresponding device.

In the purchase information display method that has been described above with reference to FIG. 59, the IPTV receiver may receive and process both purchase-related information and metadata having information of content with the EPG metadata.

For example, a list of PurchaseItem elements that provide purchase information such as purchase prices and terms for an offer is provided by a PurchaseList element. The PurchaseList element may be included in a ServiceInformation element, a BasicContentDescription element such as ProgramInformation, or an InstanceDescription element of a ProgramLocation element, thereby being provided. Therefore, the PurchaseList element may be received with an EPG metadata, together with program information and purchase information.

Metadata provided from a 3-rd party EPG provider may not include purchase information of a recent version, and thus, the purchase information may be received immediately before a time when the user of the IPTV receiver desires purchase and provided to the user in the recent version.

Moreover, the purchase information may be frequently changed according to the intention of a service provider even at an environment where the 3-rd party EPG provider does not exist, and thus, the purchase information may be separated from content metadata where change is not frequently performed relatively compared to it and provided to the IPTV receiver in a recent version.

Figure 60:
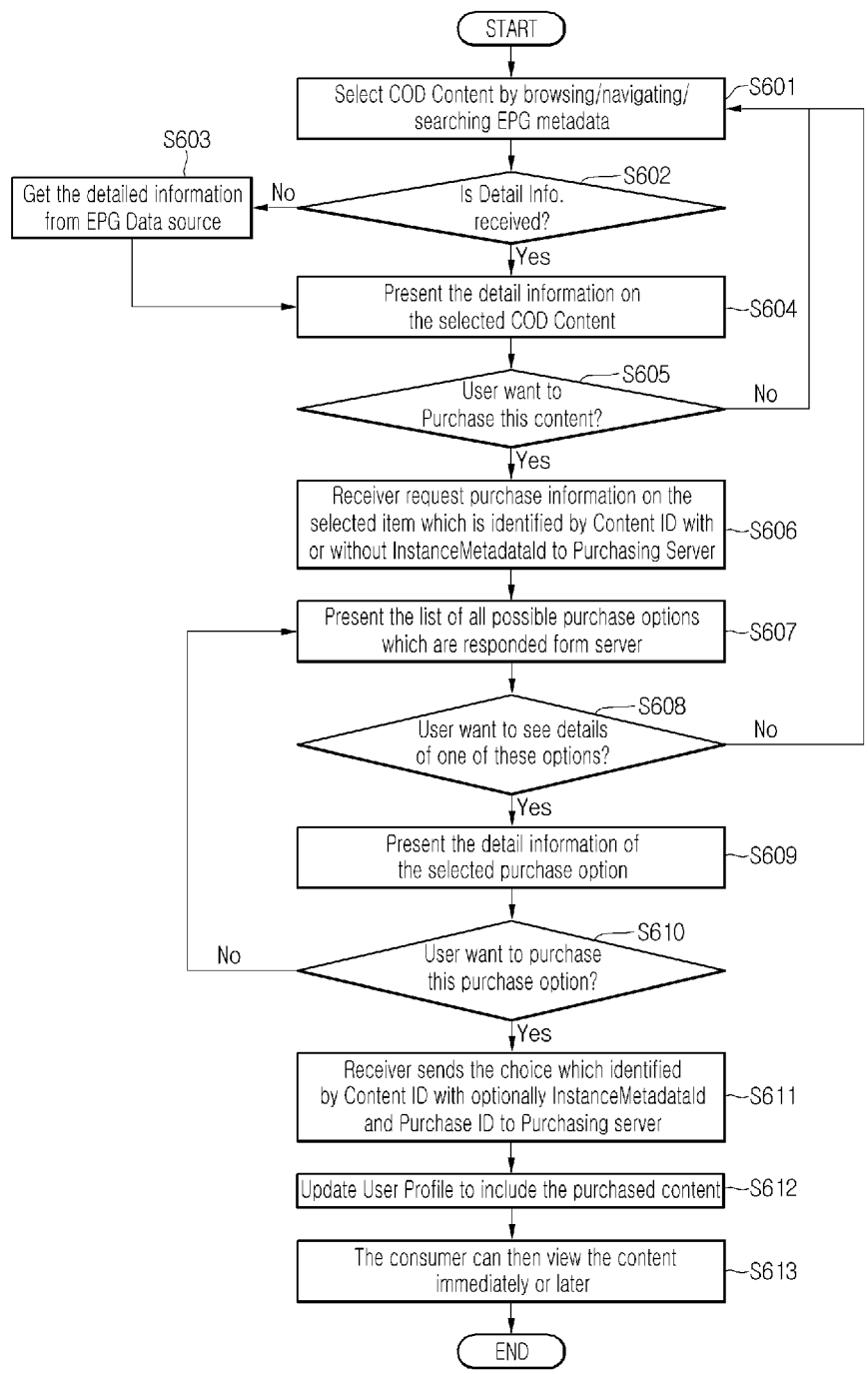
FIG. 60 is a flowchart illustrating a first embodiment of a method where an IPTV receiver performs purchase transaction.

FIG. 60 is a flowchart illustrating a first embodiment of a method where an IPTV receiver performs purchase transaction. In the method of FIG. 60, description that is repetitive of FIG. 59 will not be provided.

Referring to FIG. 60, the IPTV receiver selects CoD content through an operation of browsing, navigating or searching EPG metadata in operation S601, and checks whether detailed information regarding the selected CoD content is received in operation S502.

When the detailed information is not received, the IPTV receiver acquires detailed information regarding the selected CoD content from an EPG data source in operation S603.

Subsequently, the IPTV receiver displays the detailed information regarding the selected CoD content in operation S604. A user of the IPTV receiver checks the displayed detailed information and determines purchase of the CoD content in operation S605.

For example, a user may determine to purchase corresponding CoD content on the basis of the displayed detailed information, or more specifically, the user may determine to purchase a specific version (for example, one of an HE version and SD version of corresponding content) of corresponding content.

The IPTV receiver requests purchase information regarding an item, which the user has determined to purchase, to a purchase server in operation S606, and displays a list of purchase options selectable by the user for the item on the basis of purchase information that is responded from the server in operation S607.

For example, the IPTV receiver may provide a content ID for identifying the content and an instance ID for identifying a specific version to the purchase server, and thus request a list of purchase options for a specific version of content that the user has determined to purchase.

The instance ID may be InstanceMetadataId that is an identifier for program location instances (for example, schedule events or on demand programs) of corresponding content.

When the user determines purchase of corresponding content without selecting a specific version, the IPTV receiver may provide a content ID for identifying the content to the purchase server, and thus request a list of purchase options of content that the user has determined to purchase.

The purchase options may be for only a program or event, but have different resolutions or usage terms. Alternatively, the purchase options may be used for multiple packages including a corresponding program or event.

The user may designate a number of days or showings of purchasable item for the displayed purchase option list.

Subsequently, when the user requests details regarding one of the displayed purchase options in operation S608, the IPTV receiver displays details of the selected purchase option in operation S609.

A method that displays the details of the selected purchase option in operation S609 may be similar to the method that has been described above with reference to FIG. 59, and will be described below in detail with reference to FIG. 61.

When the user checks the details displayed in operation S609 and selects a purchase option for actually purchasing to determine purchase in operation S610, the IPTV receiver transmits information regarding the selected purchase option to the purchase server to request purchase for a corresponding item in operation S611.

For example, when the purchase option determined by the user is for specific content, the IPTV receiver may provide a content ID for identifying pertinent content and a purchase identifier for identifying purchase information associated with the selected purchase option to the purchase server, and thus request purchase for the selected purchase option.

When the purchase option selected by the user is for a specific version of content, the IPTV receiver may provide a content ID, InstanceMetadataId for identifying a corresponding version and a purchase identifier for identifying purchase information associated with the selected purchase option to the purchase server, and thus request purchase for the selected purchase option.

The purchase identifier is an identifier for uniquely identifying specific purchase information, for example, may be PurchaseID for uniquely identifying purchase information designated by the PurchaseItem element that has been described above with reference to FIGS. 13 and 14.

An option ID being an identifier may be given to each of the above-described purchase options, and may identify a specific purchase option as in the PurchaseID.

Moreover, the IPTV receiver may transmit only an option ID corresponding to the purchase option, which has been selected by the user in operation S610, to the purchase server to request purchase.

For this, the option ID is similar to the offer ID of FIGS. 15 to 23 in that the option ID may identify the selected purchase option and an item that the user desires to purchase actually, and identify the combination of a purchased product and a purchase option.

Subsequently, the IPTV receive may update a user profile so as to include the purchased content in operation S612, and the user may view the purchased content immediately or later in operation S613.

Figure 61:
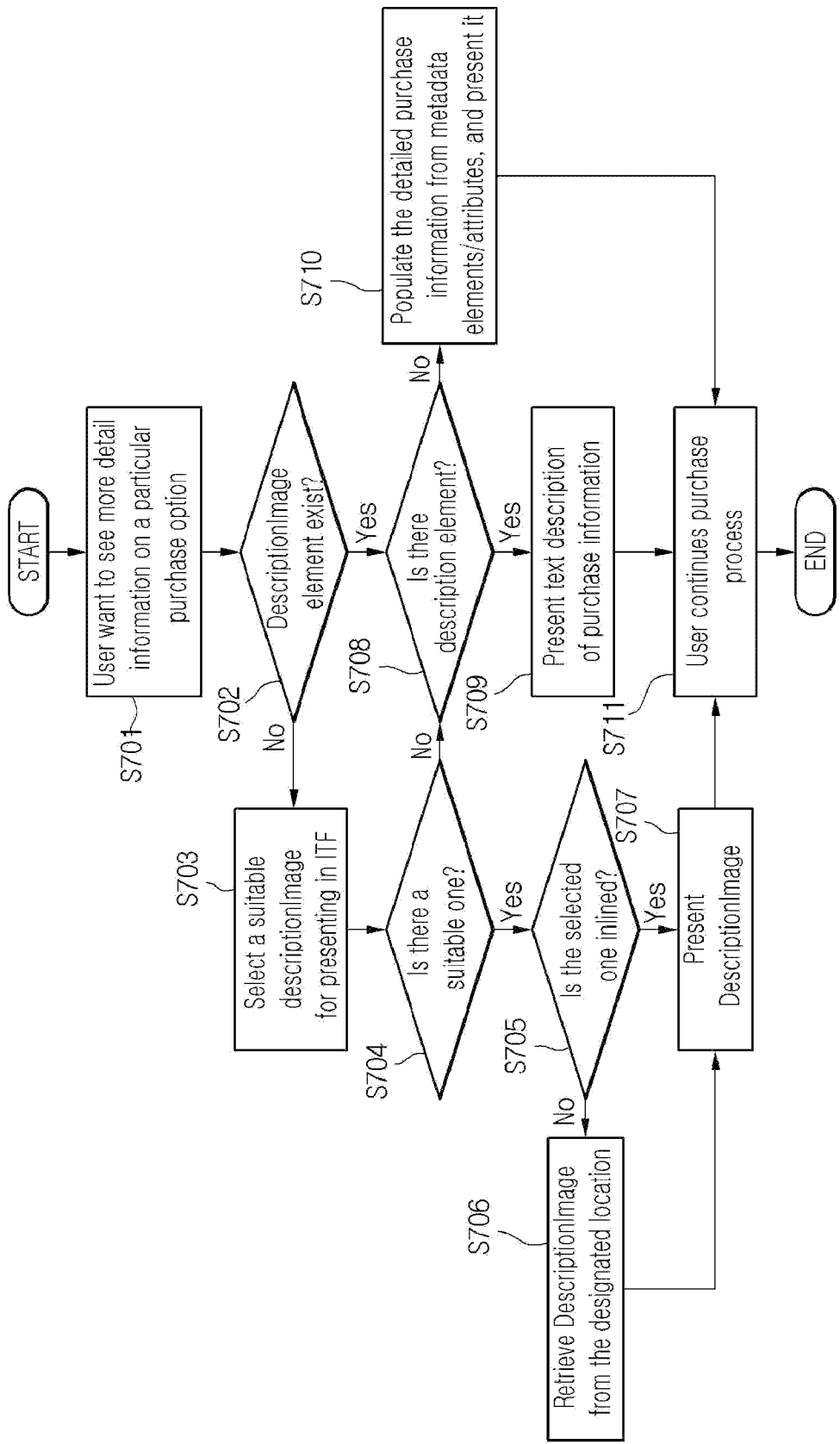
FIG. 61 is a flowchart illustrating a method where an IPTV receiver displays detailed information regarding a purchase option, according an embodiment.

FIG. 61 is a flowchart illustrating a method where an IPTV receiver displays detailed information regarding a purchase option, and illustrates operation S609 of FIG. 60.

Referring to FIG. 61, when the user of the IPTV receiver desires to check detailed information regarding a specific purchase option in operation S701, the IPTV receiver checks whether a DescriptionImage element representing detailed information regarding the purchase option exists in operation S702.

Subsequently, the IPTV receiver selects a description image appropriate for display from among description images for the purchase option provided with the DescriptionImage elements in operation S703. When the appropriate description image exists in operation S704, the IPTV receiver checks whether the selected description image is included in the DescriptionImage element (in-lined) in operation S706.

When the description image is not in-lined, the IPTV receiver receives the description image from a locator that is designated in the DescriptionImage element in operation S706.

The IPTV receiver displays the received description image with a locator that exists or is designated in the DescriptionImage element to provide detailed information regarding the purchase option as a bitmap image to the user in operation S707.

When the DescriptionImage element does not exist, the IPTV receiver checks whether the description element representing the detailed information regarding the purchase option exists in operation S708, and displays text description included in the description element to provide the detailed information regarding the purchase option to the user in a text type in operation S709.

When the description element does not exist, the IPTV receiver acquires detailed information regarding the purchase option from metadata elements or attributes, and displays the acquired information in operation S710.

Subsequently, the IPTV receiver continuously performs purchase-related process that has been described above with reference to FIG. 60 in operation S711.

To perform purchase transaction that has been described above with reference to FIGS. 59 to 61, it is required to define a query mechanism that is used for the IPTV receiver to request purchase for specific content or instance.

According to an embodiment, mechanism based on HTTP request-response or Simple Object Access Protocol (SOAP) may be used as a protocol for purchase transaction, but the present invention is not limited thereto. Various protocols based on a message including information described below may be used.

For example, when performing purchase transaction with the HTTP request-response, the HTTP request for the purchase transaction may use POST method of HTTP/1.1.

In this case, parameters included in the HTTP request may be configured with a key-value pair, and transferred to HTML form data according to convention using the POST method. The parameters may be included in a message-body region of a HTTP/1.1 "Request" message and transferred to a server.

Moreover, multiple key-value pairs may be included in one HTTP request, in which case the key-value pairs may be distinguished with "&".

In response the HTTP request for the purchase transaction, the server may transmit an XML document including information of a purchase option or a purchase processing result to the IPTV receiver.

FIG. 62 illustrates a first embodiment of query keys defined for purchase transaction.

Referring to FIG. 62, purchaseTRType is a key for requesting a list of purchase options or requesting purchase for a specific purchase option, and may have one value of "getList" and "purchase".

When a value of the purchaseTRType key is the "getList", the IPTV receiver may request a list of purchase options for a program or event identified by a content identifier (alternatively, together with an identifier for a content instance).

For example, as in operation S606 of FIG. 60, the IPTV receiver may transfer a content ID for identifying corresponding content to the server with a message having the purchaseTRType key and the "getList" value, for requesting a purchase option list of content that the user has determined to purchase to the server.

When intending to request a purchase option list for a specific instance of the content that the user has determined to purchase to the server, the IPTV receiver may transfer the content ID and InstanceMetadataId for identifying a corresponding content instance to the server with the message having the purchaseTRType key and the getList value.

When a value of the purchaseTRType key is the "purchase", the IPTV receiver may request purchase for a purchase option identified by a content identifier (alternatively, together with an identifier for a content instance).

For example, as in operation S611 of FIG. 60, the IPTV receiver may transfer a content ID for identifying corresponding content and a purchase identifier for identifying purchase information associated with the selected purchase option to the server with a message having the purchaseTRType key and the "purchase" value, for requesting purchase for the purchase option selected by the user to the server.

More specifically, when the purchase option that the user has determined to purchase is for specific content, the IPTV receiver may transfer a content ID and a purchase ID to the server together with the request message.

The IPTV receiver may transfer a content ID, InstanceMetadataId and a purchase ID to the server together with the request message, and thus request a purchase option of a specific content instance identified by the identifiers.

Moreover, the "contentID" of FIG. 62 is a key for designating content that is affected by purchase transaction, and may have an identifier for the content, for example, a program identifier as its value.

For example, in requesting of the above-described purchase option list, when the InstanceMetadataId does not exist in the request message, the IPTV receiver may request purchase options for all instances of content designated by the "contentID" to the server.

When the InstanceMetadataId exists in the request message, the IPTV receiver may request purchase options for a specific instance designated by the InstanceMetadataId among instances of content designated by the "contentID".

When a content identifier designated by the "contentID" is given for each content instance, a specific content instance may uniquely identify only with the content identifier without the InstanceMetadataId.

A content instance designated with the above-described identifiers may be an on demand program, but it is not limited thereto. For example, the content instance may be content that is provided in a PPV type as in the broadcast event, in which case a purchase target is an event that is broadcasted at a specific time over a predetermined channel.

The InstanceMetadataId of FIG. 62 is a key for designating a specific instance of content identified by a value of the "contentID" key, and may have an identifier for the content instance, for example, have an instance metadata id of a program location table as its value.

The instance metadata id is an identifier for identifying an instance under a scope of a content identifier, and may uniquely identify a specific content instance through the combination of the instance metadata id and the content identifier.

"purchaseOptionId" is a key for identifying a specific purchase option that is used in purchase transaction, and may have a purchase option item identifier as its value.

For example, as in the option ID that has been described above with reference to FIG. 60, the purchase option item identifier is an identifier for uniquely identifying a specific purchase option.

Therefore, by combining a content ID being a value of a "contentId" key and an option ID being a value of a "purchaseOptionId" key, a specific purchase option selected for specific content may be identified.

By combining the content ID being the value of the "contentId" key, an instance ID being a value of the "InstanceMetadataId" key and the option ID being the value of the "purchaseOptionId" key, a specific purchase option for specific content instance may be identified.

Moreover, when the content ID designated in the "contented" is given for each content instance, a specific purchase option for a specific content instance may be identified by combining the content ID being the value of the "contentId" key and the option ID being the value of the "purchaseOptionId" key.

In this case, the option ID being the value of the "purchaseOptionId" key is similar to the purchaseID of FIGS. 13 and 14 in that the option ID uniquely identifies a specific purchase option.

As another embodiment, in order to enable the request of actual purchase only with the "purchaseOptionId" key, the option ID being the value of the "purchaseOptionId" key may be given to identify a specific purchase option for a specific content instance.

In this case, the option ID is similar to the offerID of FIGS. 15 to 23 in that the option ID identifies the combination of a purchased product and a purchase option.

"serviceId" is a key for designating a service that is affected by corresponding purchase transaction, and may have an identifier for the service, for example, have "serviceID" used in ServiceInformation fragments as its value.

For example, the "serviceId" key may be used for identifying a specific service channel purchased by the purchase transaction when purchasing a viewing authority for a specific service channel instead of the purchase of a content unit.

More specifically, the IPTV receiver may request a list of purchase options for a service channel that is matched with a service Id value designated by the "serviceId" key, or request purchase for a corresponding service channel.

In response to the purchase option list request of the IPTV receiver that is as described above, the server may include an XML document of PurchaseListType representing pertinent purchase options in HTTP response and return the XML document to the IPTV receiver.

In response to the purchase request of the IPTV receiver, moreover, the HTTP response returned from the server may include only 200 ok messages when purchase is succeeded. When purchase is failed, the HTTP response may include an error code and an error message specific for a response body.

According to an embodiment, purchase-related requests for performing purchase transaction may be designated in the following three types.

Requesting information about purchase options for specific content

Making a purchase

Requesting a list of items that the user has purchased and that are available for consumption (i.e., that have not yet expired or been fully consumed)

In the types of products purchasable by the purchase transaction, there are Services (represented by Service fragments), Programs (represented by Program fragments), and Instances of programs (represented by OnDemandProgram fragments, PushDownloadProgram fragments and BroadcastEvent fragments).

Moreover, a third type in the purchase-related requests is for that the IPTV receiver acquires a purchase history list for content items purchased by a user of a corresponding device, displays the purchase history list according to the user's request, and thus allows the user to select one of the lists for viewing.

Purchase-related requests that will be described below may be performed based on the following assumptions, but the present invention is not limited thereto. Under a context different from this, each mechanism may operate similarly.

(1) When a user logs on to an IPTV service with a device, an authentication is performed to reliably identify the user's Subscriber ID and the device's Device ID. The device is given a token which it presents to Application servers to prove that it has been authenticated, and to inform the Application servers of the Subscriber ID and Device ID. The descriptions of queries in this disclosure do not include these IDs among the parameters to be passed in, but they are always presented in addition to the parameters described.

(2) Each content item has a unique identifier, ContentId. In the description below these are referred to as serviceId for services, programId for programs (where a program represents the underlying content), and instanceId for specific instances of a program (such as a TV program shown on a specific channel at a specific time, or a specific offering of a video-on-demand program).

(3) If a content item has multiple encodings, each encoding has a unique identifier, MediaId. In this case, the MediaId may have a same role as a ProductID to be described below referring to FIGS. 75 to 77.

(4) Each combination of a specific content item and a specific set of conditions for purchasing that content item (price, number of views and/or time period allowed, copy privileges, etc.) has a unique identifier, PurchaseContractId. In the description below, this is referred to as an AssetId.

(5) When a user wants to purchase a content item, the device provides the PurchaseContractId (AssetId) to identify the item to be purchased and the purchase conditions.

(6) When a user wants to view a content item that has only one encoding, the device uses the ContentId (serviceId, programId or instanceId) to identify the media file to be viewed.

(7) When a user wants to view a content item that has multiple encodings, the device uses a MediaId to identify the specific media file to be viewed (selecting an appropriate media file, based on the device capabilities, etc.). In this case, the MediaId may performs a same function as the ProductID to be described below referring to FIGS. 75 to 77. And, the ProductID can be obtained by using the OtherIdentifier of the InstanceDesciption or a PurchasedItem to be described below referring to FIGS. 64 to 68.

Hereinafter, purchase-related requests according to an embodiment will be described in detail with reference to FIGS. 63 to 68.

FIG. 63 illustrates a second embodiment of query keys defined for purchase transaction. The query keys of FIG. 63 are defined for performing the purchase-related requests according to an embodiment, based on a query scheme.

Referring to FIG. 63, "PTType" is a key for designating three types of purchase-related requests, and may have one value of "getinfo", "purchase", and "getList".

"PTType:getInfo" request is to request information regarding purchase options, and the IPTV receiver may use "serviceId", "ProgramId" and "InstanceId" keys of FIG. 63 for requesting a list of purchase options for a specific item (for example, Program, OnDemandProgram, PushDownloadProgram, BroadcastEvent or Service) of content.

The "serviceId" key is for designating a service for requesting a purchase option list, and as an identifier for a corresponding service, the "serviceId" key may have a ServiceId attribute of a ServiceInformation fragment including a PurchaseList element as its value.

The IPTV receiver may request a list of all purchase options for a specific service to a server with a query including the "serviceId" key. When the ServiceInformation fragment includes the PurchaseList element, a response for the query may include the ServiceInformation fragment and all PurchaseInformation fragments that are referenced in the PurchaseList element.

When the ServiceInformation fragment does not include the PurchaseList element, any fragment may not be returned from the server in response to the query.

The "ProgramId" key is for designating a program for requesting a purchase option list, and as an identifier for a corresponding program, the "ProgramId" key may have a ProgramId attribute of a ProgramInformation fragment as its value.

The IPTV receiver may request a list of all purchase options for a specific program to the server with a query including the "ProgramId" key.

For example, when the ProgramInformation fragment or instance fragments (for example, ScheduledEvent, BroadcastEvent, or OnDemandProgram) referencing the ProgramInformation fragment includes the PurchaseList element, a response for the query may include the ProgramInformation fragment, all Instance fragments including the ProgramInformation fragment, and all PurchaseInformation fragments that are referenced in the PurchaseList elements.

Moreover, the ScheduledEvent elements may not become fragments, and thus, the response for the query may include ScheduledEvent elements that are converted into the BroadcastEvent elements.

When any one of Program Information fragment and Instance fragments referencing the ProgramInformation fragment does not include a PurchaseList element, any fragment may not be returned from the server in response to the query.

The "instanceId" key is for designating a specific program instance for requesting a purchase option list, and as an identifier for a corresponding program instance, the "instanceId" key may have an InstanceMetadataId attribute of an Instance fragment as its value.

When the "ProgramId" key is not included in a query, the "instanceId" key is not included in a corresponding query.

The IPTV receiver may request a list of purchase options for a specific instance of a specific program to the server by using a query including the "instanceId" key.

For example, when the ProgramInformation fragment or the Instance fragment includes the PurchaseList element, a response for the query may include the ProgramInformation fragment, the Instance fragment, and all PurchaseInformation fragments that are referenced in the PurchaseList element.

When any one of the ProgramInformation fragment and the Instance fragments does not include the PurchaseList element, any fragment may not be returned from the server in response to the query.

The above-described result of the query may be returned in the metadata type that has been described above with reference to FIGS. 8 to 58, and "type=sgdu" being an implied query term may be considered as a portion of the query.

"PTType:purchase" request is to request the purchase of a specific item (for example, Program, OnDemandProgram, PushDownloadProgram, BroadcastEvent or Service) of content, and the IPTV receiver may use an "assetId" key of FIG. 63 for requesting the purchase of the specific item.

The "assetId" key is for designating an item for requesting purchase, and as an identifier for a corresponding item, the "assetId" key may have an assetId attribute of PurchaseItem or PurchaseIdRef, which is in a PurchaseList element, as its value.

For example, the assetId attribute designated as the value of the "assetId" key may be the offerID that has been described above with reference to FIGS. 15 to 23.

The IPTV receiver may request purchase of content associated with a PurchaseList element including a corresponding assetId (for example, offerID).

In this case, the IPTV receiver may request purchase for a purchase option of PurchaseItem or PurchaseIdRef that is identified by the assetId, for which the value of the "assetId" key may match with the assetId of the PurchaseItem or PurchaseIdRef representing a corresponding purchase option.

"PTType:getlist" request is to request a purchase history list of all content items that have already been purchased by a user and may be consumed. The purchase history list may include items, where a use period is expired or which are not completely consumed, among content items where purchase has been completed.

For example, when a user purchases content for later consumption, an IPTV receiver that is currently being used by the user may not have information of the purchased content.

The above-described case may be a case where the IPTV receiver is a device different from a device that is used for purchasing the content, or the IPTV receiver no longer has a record about the purchased content due to an error or different ambient environments.

A query for requesting the purchase history list may not include other keys other than the above-defined "PTType" key.

A response for the "PTType:getlist" request may include one or more PurchasedItemList elements. The PurchasedItemList element may be based on the XML schema definition and the associated semantic definition that are as illustrated in FIGS. 64 to 68.

Figure 64:
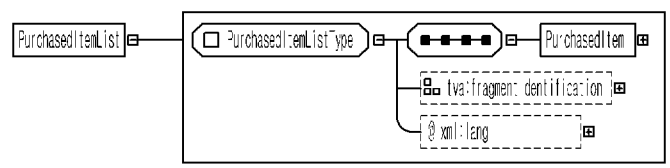

Referring to FIG. 64, the PurchasedItemList element may include all content items that have already been purchased by a user and may be consumed.

A list of purchased Linear TV services is not necessary for a user, but when necessary, by providing a new sing-on request to a Service Provider Attachment Server, a Linear TV service list where the user has been registered may be updated, and thus, the list of purchased Linear TV services may not be included in the PurchasedItemList element.

When a service provider provides a purchase option where purchase may be performed in service unit such as an OnDemand service or a Push Download service, the PurchasedItemList element may include the purchased service.

However, a response for the "PTType:getlist" request may not include Service Guide Delivery Descriptors.

Moreover, the PurchasedItemList elements that are illustrated in FIG. 64 are not actually fragments, but may be regarded as the fragments for packaging a response for the "PTType:getlist" query in Service Guide Delivery Unit. fragementType for such pseudo-fragments may be "0xB0".

Figure 65:
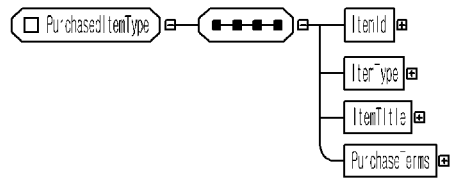

Referring to FIG. 65, a PurchasedItem element represents each purchased content item, and an item ID element of PurchasedItemType is an identifier for uniquely identifying the purchased content item.

A value of the itemID may match with a value of an OtherIdentifier element associated with the purchased content item.

Moreover, the itemType element of the PurchasedItemType designates the type of the purchased content item, and an ItemTitle element represents a descriptive title of the purchased content item.

Furthermore, a PurchaseTerms element represents a purchase option of the purchased content item, for which the PurchaseTerms element may match with PurchaseItem identified by the AssetId that has been used for purchase.

Figure 66:
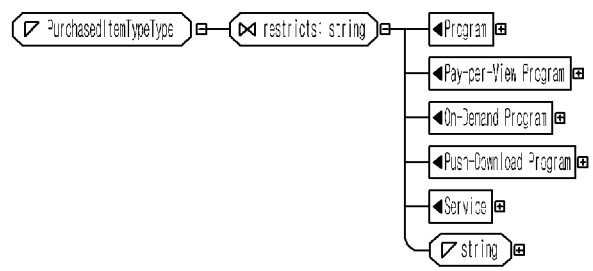

Referring to FIGS. 66 to 68, a value of the PurchasedItemType may be "Program", "Pay-Per-View Program", "On-Demand Program", "Push Download Program", or "Service".

The "Program" represents that a corresponding content item is a program expressed by a ProgramInformation element. The "Pay-Per-View Program" represents that the content item is a Pay-Per-View Program expressed by ScheduledEvent or BroadcastEvent.

Moreover, the "On-Demand Program" represents that the content item is an On-Demand Program expressed by an OnDemandProgram element, and the "Push Download Program" represents that the content item is a Push Download Program expressed by a PushDownloadProgram element.

The "Service" represents that the content item is a service which may mean one of an OnDemand service or a Push-Download service.

FIG. 69 illustrates an embodiment of query keys that are used for requesting specific fragments, and illustrates query keys that are additionally used for supporting a query based on the above-defined identifiers.

The query keys of FIG. 69 may be used for designating the fragments that are requested in requests for specific Service Guide fragments. For example, the Service Guide fragments may be defined in OMA BOAST service guide specification.

Referring to FIG. 69, "otherId" is a key for requesting a specific fragment, and may have a <otherId> value.

The <otherId> being a value of the "otherId" is a string value of an OtherIdentifier element, which is associated with OnDemandProgram, PushDownloadProgram, ScheduledEvent, BroadcastEvent, Program, or Service.

Moreover, an "idType" key of FIG. 69 may have <organization> being an organization attribute value of an OtherIdentifier element and <type> being a type attribute value of the OtherIdentifier element as a value.

When the "idType" key is not used together with the "otherId" key, it may be assumed that the organization and type attribute values for the OtherIdentifier element are "ATIS" and "CreatorAssetId", respectively.

Therefore, when intending to designate OtherIdentifier elements having the different values and the different organization and/or type attribute values, the "idType" key and the "otherId" key are required to be used together.

With the above-described query key, an EPG client (for example, an IPTV receiver) may request a fragment including a product that is identified by the OtherIdentifier element, which may be determined by the <otherId> value and the assumed or designated organization and type attribute values.

When the product is ScheduledEvent, a corresponding product may be converted into a BroadcastEvent fragment for transfer.

The above-described "otherId" query may be particularly useful for a context of a CoD application based on ATIS CoD specifications when an IPTV receiver desires to acquire PurchasedItem included in a PurchasedItemList element that is returned by a "listPurchases" query.

The "listPurchases" query will be described below in detail with reference to FIG. 70.

In this case, the desired organization and type attribute values may be "ATIS" and "CreatorAssetId", respectively.

According to another embodiment, purchase-related requests for performing purchase transaction may be designated in the following three types.

Request to make a purchase

Request for a list of all offerings which the user has purchased and which are available for consumption (i.e., for which the rights have not yet expired or been fully used up)

Request for the E1 URI(s) for a CoD program (as defined in the ATIS CoD standard)

In the types of products purchasable by the purchase transaction, there may be programs (represented by ProgramInformation elements), groups and supergroups (represented by GroupInformation and SuperGroupInformation elements), instances of programs (represented by ScheduleEvent elements, BroadcastEvent elements OnDemandProgram elements, and PushDownloadProgram elements,), services (represented by ServiceInformation elements), and groups of services (defined in PurchaseInformation elements in the PurchaseInformationTable that are referenced by GroupPurchaseIdRef elements in ServiceInformation elements).

The purchase-related requests may be based on the query specifications that are as described above with reference to FIG. 69.

FIG. 70 illustrates a third embodiment of query keys which are defined for purchase transaction, and the query keys are defined for performing purchase-related request according to another embodiment. Among query keys of FIG. 70, description on the same query keys as the query keys of FIGS. 62 to 69 will not be provided.

Referring to FIG. 70, a "makepurchase" key is included in a purchase request for requesting the purchase of a specific IPTV product.

As described above, <offerId> being a value of the "makepurchase" key is an identifier for offering, for example, may be an offerId attribute value of a PurchaseItem element or PurchaseIdRef element in a PurchaseList element, or an offerId attribute value of a GroupPurchaseIdRef element in a ServiceInformation element.

The offerId attribute, as described above with reference to FIGS. 15 to 26, may be a purchase identifier for identifying the combination of a product attached to PurchaseList and a purchase option of a corresponding PurchaseItem element or PurchaseIdRef element.

For example, when the <offerId> is an offerId attribute value of a PurchaseItem element or PurchaseIdRef element in a PurchaseList element, the "makepurchase" query may be a request for purchasing an IPTV product (program, group, etc.) associated with PurchaseList including a corresponding offerId attribute.

In this case, a purchase request may be a request based on a purchase option that is given by a PurchaseItem element or a PurchaseIdRef element that is identified by the <offerId>.

When the <offerId> is an offerId attribute value of a GroupPurchaseIdRef element in a ServiceInformation element, the query may be a request for purchasing a group of services that are defined in a PurchaseInformation item referenced by the GroupPurchaseIdRef element.

Only the above-described "makepurchase" key may be represented in a purchase request.

Moreover, a response for the query may include an SGRresponse element that represents whether the requested purchase is succeeded with a status attribute, but the SGRresponse element may not include SGDDs.

The status attribute in the SGRresponse element may have one of values of FIG. 71.

For example, Status Codes of FIG. 71 may be used as the status attribute of the SGRresponse element that is returned from a purchase-related request, for representing success or failure for the request.

The Status Codes may be a subset of elements that are defined in OMA BOAST service guide specification.

Furthermore, a "listPurchases" key of FIG. 70 is to request a list of all offerings that have already been purchased by a user and may be consumed, and may not have a value.

The offerings list may include items, where a use period is expired or which are not completely consumed, among offerings where purchase has been completed.

Moreover, the offering may include a program, a group, a supergroup, an on demand program, a push download program, a schedule event, a broadcast event, a service, or a group of services (other than linear TV services).

The request may be used for a case where a user purchases products for later consumption, and a device that is currently being used by the user does not have information of the purchased products.

The above-described case may be a case where a device that is currently being used by a user is a device different from a device that is used for purchasing the products, or the device no longer has a record about the purchased products due to an error or different ambient environments.

Only the above-described "listPurchases" key may be represented in a request for a list of the purchased offerings.

A response for a valid "listPurchases" request may be an SGResponse element including no SGDDs, and an XML PurchasedOfferList element based on the SG Response element.

Hereinafter, a configuration of the PurchasedOfferList element will be described with reference to FIGS. 72 to 80.

Referring to FIGS. 72 to 74, the PurchasedOfferList element may include all offerings that have been purchased by a user and may be consumed.

A list of purchased Linear TV services is not necessary for a user, but when necessary, as defined in an ATIS IPTV CDDC Metadata standard, by providing a new sing-on request to a Service Provider Attachment Server and receiving a new ProvisioningInfo element, a Linear TV service list where the user has been registered may be updated, and thus, offerings including the Linear TV services may not be included in the PurchasedOfferList element.

However, when a service provider provides a purchase option where purchase may be performed in service unit such as an OnDemand service or a PushDownload service, the PurchasedOfferList element may include the purchased services.

Moreover, a PurchasedOffer element included in the PurchasedOfferList element may represent the purchased offering.

Referring to FIGS. 75 to 77, the PurchasedOffer element may include information regarding one product (for example, a program, a program instance, or a service).

When a group of OnDemand or PushDownload service is purchased with an offer that is identified by GroupPurchaseIDRef, information regarding multiple products may be included in one PurchasedOffer element.

A ProductInfo element included in the PurchasedOffer element may represent information of a product that is a portion of pertinent offering, and a ProductTitle element may represent a descriptive title of the product.

Moreover, a productId attribute is an identifier for uniquely identifying the product, and a productType attribute may represent the type of the product (for example, a program, a program instance, a service, etc.). Also, the productId may have a format of the CreatorAssetiD, and uniquely identify a purchasable IPTV product. For consuming the purchased content after purchasing, a IPTV receiver can receive the content by requesting a server using the ProductID. So, the ProductID may have a same role as the MediaID described above.

A PurchaseTerms element represents a purchase option for the offering, for which the PurchaseTerms element may match with PurchaseItem identified by an offerId that is used to purchase the offering.

An offerId attribute is an identifier for uniquely identifying offering where information is included in the PurchasedOffer element.

A productType attribute included in the PurchaseOfferList element may have a type that is defined in the XML schema of FIGS. 78 to 80, and designate the type of a purchased product.—11

Referring to FIGS. 78 to 80, a value of ProductTypeType may be designated as "Program", "Pay-Per-View Program", "Push_Download Program", "On-Demand Program" or "Service".

The "Program" may indicate that a corresponding product is represented by a ProgramInformation element and the "Pay-Per-View Program" may indicate that the product is a Pay-Per-View Program represented by a ScheduleEvent or BroadcastEvent element.

The "On-Demand Program" may indicate that the product is On-Demand Program represented by a PushDownloadProgram element.

Moreover, the "Service" may indicate that the product may mean one of OnDemand service and PushDownload service.

The OnDemand service may be represented by an OnDemandService element or may be referenced by a serviceId attribute of one or more OnDemandProgram elements. The PushDownload service may be a service referenced by a serviced attribute of one or more PushDownloadProgram elements.

Moreover, a "getE1URIList" key shown in FIG. 70 may be used for a request for obtaining a list of E1 URIs representing media encodings of a specific CoD program.

<CreatorAssetId>, a value of the "getE1URIList" key is an OtherIdentifier element value in an InstanceDescription element of an OnDemandProgram element representing a corresponding CoD item.

In this case, a type attribute value of the OtherIdentifier element may be "CreatorAssetId" and an organization attribute value of the OtherIdentifier element may be "ATIS".

An IPTV receiver may request <value>, i.e., a list of E1 URIs representing media encodings for CoD program represented by <CreatorAssetId>, by using the "getE1URIList" query.

A response for a successful "getE1URIList" request may be a SGResponse element without SGDDs and the following E1 URIList element.

Moreover, the E1URIList element may follow XML schema definition and associated semantic definitions as shown in FIGS. 81 to 83.

Referring to FIGS. 81 to 83, an E1URIList element may include information about a list of encodings for CoD program and, for this, may include one or more E1URIInfo elements.

Furthermore, the E1URIInfo element may include information about one encoding for a corresponding CoD program and the E1URIInfo element may include an E1URI attribute representing E1URI for corresponding encoding.

For example, when the E1URIList element includes one E1URIInfo element, as defined in ATIS CoD standard, an E1URI sub-element of the E1URIInfo element may represent E1URI proper for the basis generating E3URI for an access to a corresponding content.

Moreover, when E1URIList element includes more than two E1URIInfo elements, as defined in ATIS CoD standard, an E1URI sub-element of each E1URIInfo element may represent E1URI proper for the basis generating E3URI for an access to encoding of a corresponding program.

Moreover, each E1URIInfo element may further include an AVAttributes attribute and a RequiredEEProfile attribute.

The AVAttributes attribute as a sub-element of the E1URIInfo element for providing attributes of encoding represented by the E1URI may represent Audio-visual attributes of encoding expressed by the E1URIInfo element.

Accordingly, a device (e.g., IPTV receiver) may select the most proper encoding and may access to a specific content by using E1URI about the encoding.

Moreover, the RequiredEEProfile attribute may represent a Secure execution environment profile requested for an access to encoding expressed by the E1URIInfo element.

Hereinafter, referring to FIG. 84, a method that an IPTV receiver performs purchase transaction by using a configuration of EPG metadata and purchase related requests will be described in more detail according to an embodiment.

Figure 84:
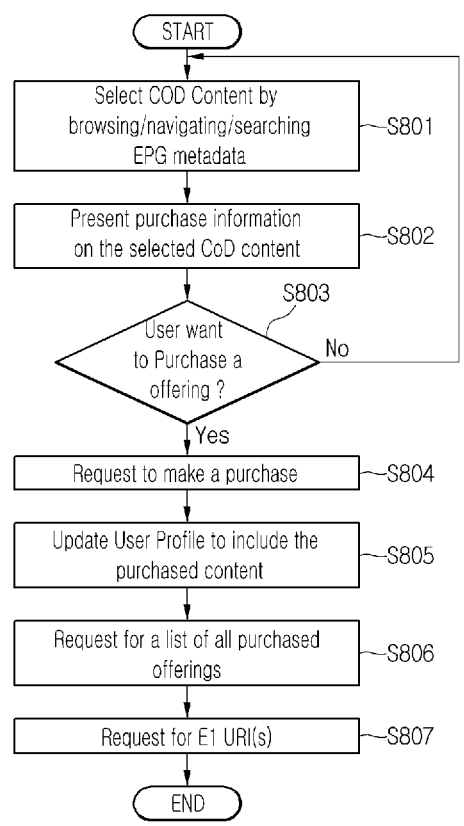
FIG. 84 is a flowchart illustrating a second embodiment of a method where an IPTV receiver performs purchase transaction.

Referring to FIG. 84, the IPTV receiver selects CoD content through browsing, navigating, or searching EPG metadata in operation S801 and displays purchase information about the selected CoD Content in operation S802.

As mentioned above, purchase information for purchasing a CoD program (e.g., information about purchase price and condition) may be delivered by using a PurchaseItem element in a PurchaseList element or a PurchaseIdRef element.

Additionally, the PurchaseList element may be included in a ServiceInformation element, a BasicContentDescription element such as ProgramInformation, or an InstanceDescription element of a ProgramLocation element and then is provided.

Accordingly, since purchase information about a CoD Content and information about corresponding content are together included EPG metadata and delivered, the IPTV receiver may directly acquire purchase information about the CoD Content selected from the received EPG metadata.

Moreover, the purchase information shown in operation S802 may include a list of a plurality of purchase available offerings and price and purchase condition about each offering.

As mentioned above, the offering may include program, group, supergroup, on demand program, push download program, schedule event, broadcast event, service, or group of services.

Since purchase related information obtained from the EPG metadata and then displayed may be configured as described with reference to FIGS. 12 to 58, its detailed description will be omitted.

Later, after a user of the IPTV receiver confirms the displayed purchase information and then determines the purchase about specific offering in operation S803, the IPTV receiver requests a purchase about the offering that the user decides to purchase in operation S804.

For example, a user may select one offering for purchasing among offerings with displayed purchase information in operation S802.

In operation S804, the IPTV receiver may request the purchase about offering that the user determines to purchase to a purchasing server by using an identifier, i.e., offerId, for offering.

As mentioned above, the offerId may identify offering that represents combinations of one or more purchase available items and purchase conditions thereof.

Moreover, since a method that the IPTV receiver requests a purchase about specific offering may be identical to the purchase related request method as described with reference to FIGS. 61 to 71, its detailed description will be omitted.

Once the requested purchase is completed, the IPTV receiver updates a user profile to include the purchased content in operation S805.

For example, the IPTV receiver may store purchase history information about the content that the user purchases in a user profile, for the future consumption.

Moreover, the IPTV receiver may store corresponding purchase history information in a user profile as identifying the purchased offering through the offerId. The stored purchases history information may include the elements described with reference to FIGS. 64 to 68 or FIGS. 72 to 80.

An IPTV product according to the purchased offering may be consumed (for example, watched) according to a request of a future user and the purchased product may be consumed by the IPTV receiver performing operations S801 to S805 or other IPTV receivers.

Accordingly, in order to consume the purchased offering, the IPTV receiver request a list of all offerings that a user purchased in operation S806.

A method that the IPTV receiver requests a list of the purchased offerings may be identical to the purchase history request method described with reference to FIGS. 62 to 80.

Next, the IPTV receiver requests E1URL about the purchased offering in operation S807.

For example, the IPTV receiver may acquire a list of E1URIs expressing media encodings of the purchased CoD program that a user wants to consume through a request for the E1URL. And, the E1URL for a product included in the offering may be obtained by using the ProductID (that has a same role as the MediaID).

A method that the IPTV receiver requests E1URL(s) in operation S807 may be identical to that described with reference to FIGS. 81 to 83.

According to another embodiment of the present invention, metadata representing information about content and metadata representing purchase related information (e.g., purchase price and purchase condition) may be separated from each other and then may be delivered.

In this case, the purchase condition may be expressed in a form of Purchasing Option and when one purchase condition includes a plurality of Program Instances, a group of Program Instances corresponding thereto may be purchased.

For example, according to the representation type of a purchase condition, a service provider may consider various purchase business strategies by selling a bundle of "Harry Potter" series by a group or bundle works of a specific actor or director.

FIGS. 85 to 92 illustrate an XML schema diagram and a schema of PuchaseOptionType for representing purchase conditions according to another embodiment of the present invention for a method of representing a purchase condition.

Figure 85:
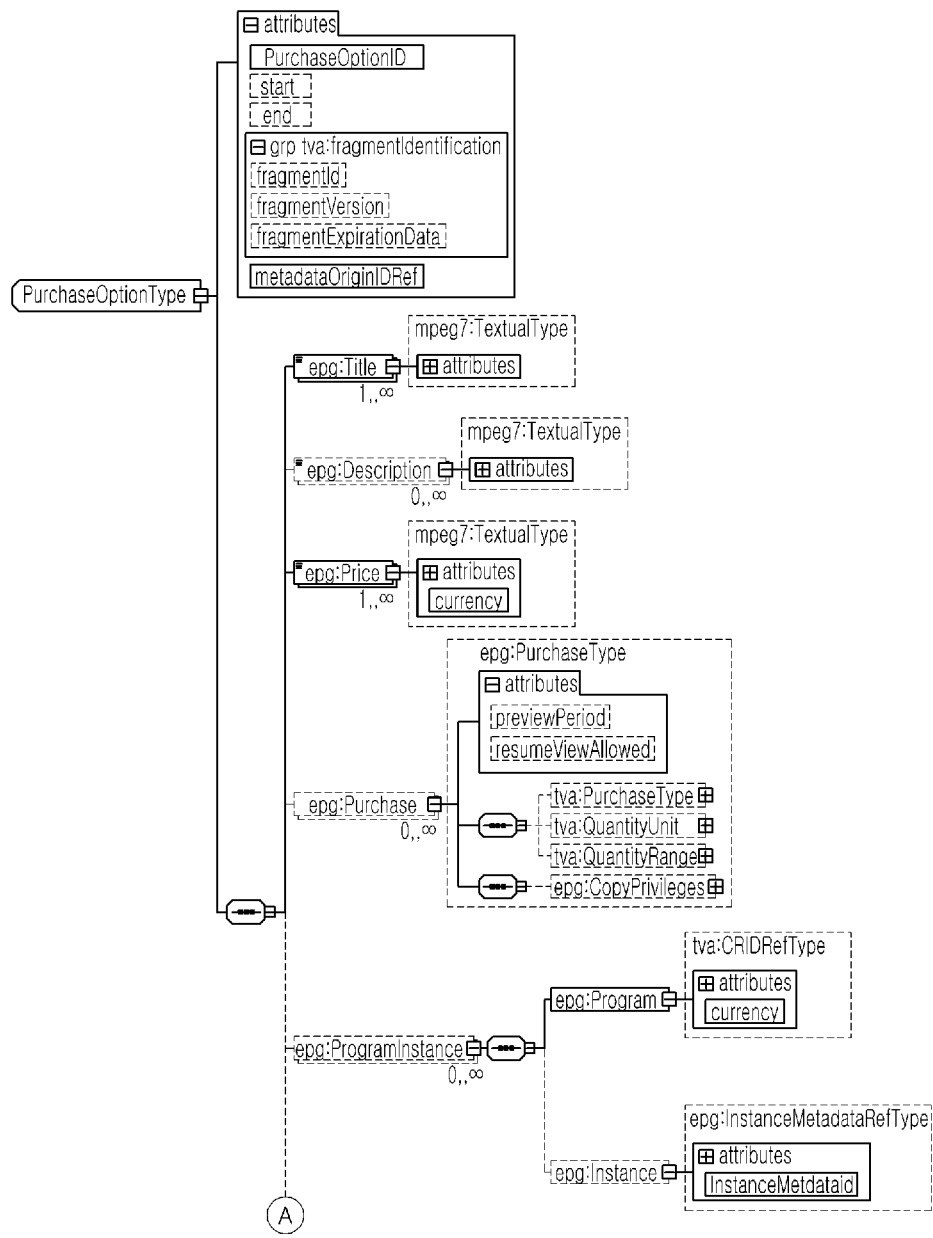

Referring to FIGS. 85 and 87, a PurchaseOptionID attribute of PuchaseOptionType is an identifier for uniquely identifying purchase condition information and a corresponding purchase condition may be identified by using an identifier (e.g., content id optionally with instance metadata id) that uniquely identifying a content instance.

Or, the purchase condition is exclusively and uniquely identifiable, and program instances purchased through the purchase condition may be designated one or more.

Moreover, a Title element may represent a short text title of the purchase condition information and may be provided as a test title representing the purchase condition information to a user as UI so that it may be used as a title of corresponding purchase information. The above Title may represent a plurality of purchase conditions in a list form or may be useful when an amount that displays purchase conditions is limited due to a small screen size.

A Description element is a text description about the purchase condition information and may include longer text information than the Title.

For example, the Description element may describe detailed purchase conditions such as usage term or authorization information in a free text form.

Additionally, a Price element is price information about a corresponding purchase condition and may designate a price for each currency according to the rate of exchange.

A PurchaseType element describes purchase type information about the purchase condition in a metadata form and thus may be represented in a pre-defined purchase type using XML schema. In this case, the IPTV receiver may parse corresponding metadata and then may display them to a user.

Moreover, a ProgramInstance element may designate purchase available content instants according to corresponding purchase condition information.

For example, the ProgramInstance element may designate a corresponding content instance based on a method of uniquely identifying one content instance according to an embodiment of the present invention. This may be one or more.

A DescriptionImage element is a bitmap image for a web page or an UI screen for displaying detail information about the purchase condition and in this case, information in metadata may not be displayed using UI realized in an IPTV receiver and a bitmap image that the DescriptionImage element designates may be displayed on a screen.

Accordingly, as extending a pricing model, without extending metadata, an extended pricing model may be supported using description about purchase conditions and the bitmap image.

Figure 86:
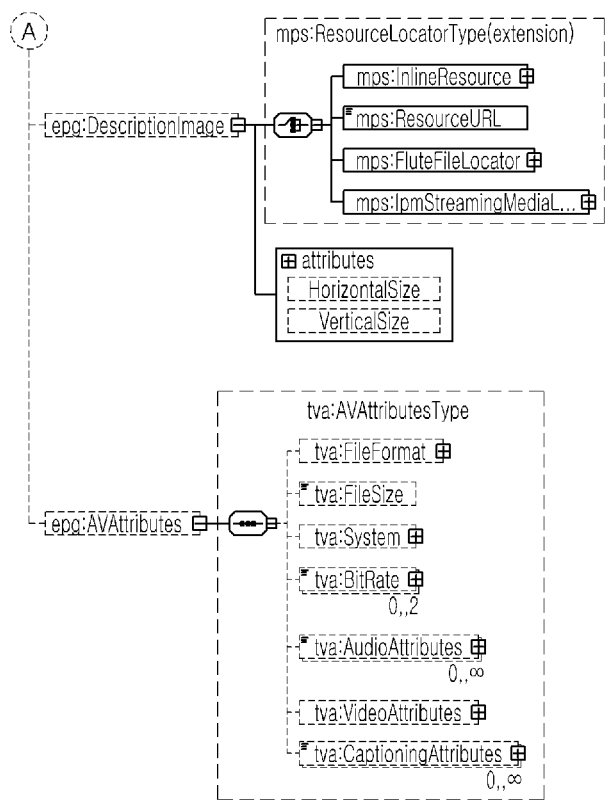

Moreover, 0 or 1 DescriptionImage element is included in FIGS. 85 and 86 as an example but more than 2 DescriptionImage elements may be included in PuchaseOptionType.

Additionally, an AVAttribute element may designate an AV attribute about a content instance that may be purchased with a corresponding purchase condition.

Figures 88, 89:
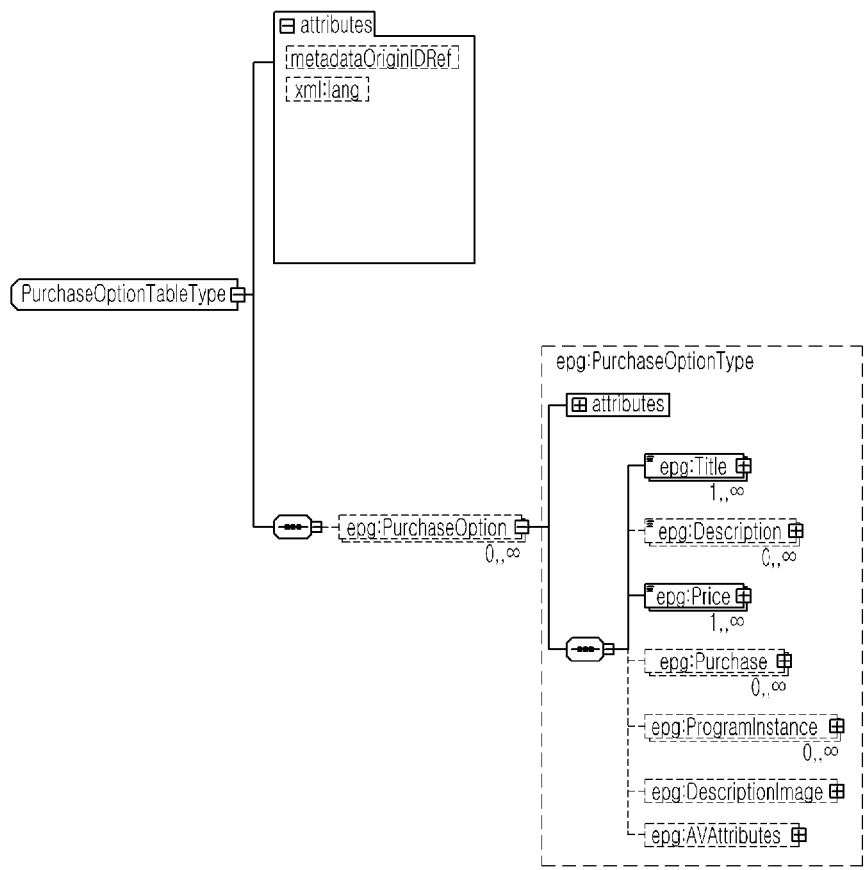

FIGS. 88 and 89 illustrate an XML schema and a diagram of PurchaseOptionTableType including the PurchaseOptionType.

Referring to FIGS. 88 and 89, a PurchaseOption element is included in PurchaseOptionTableType and then delivered and in order to uniquely identify a corresponding fragment, "0xA8" may be defined as a fragment type for a PurchaseOption Table.

Figure 90:
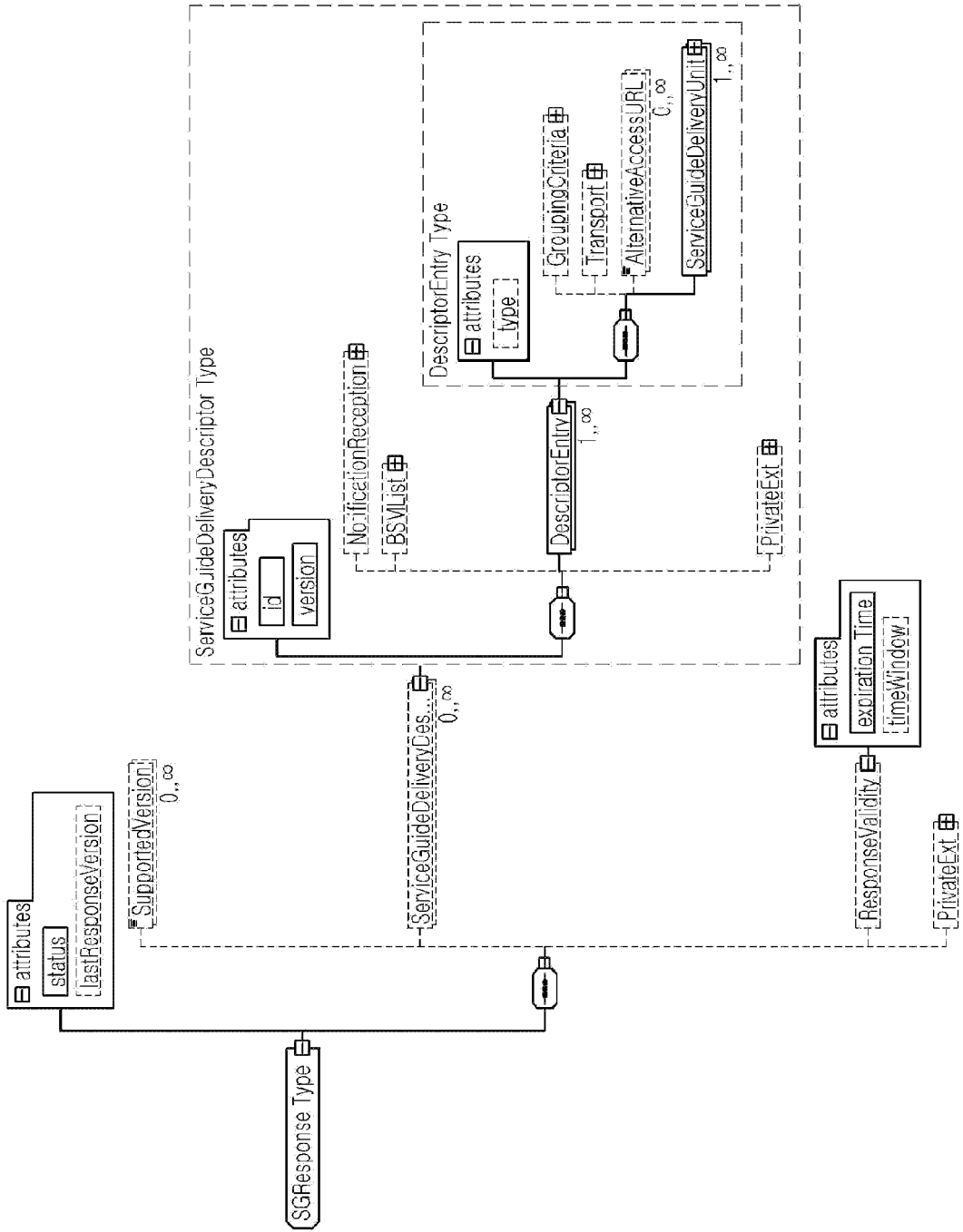

Moreover, as shown in FIG. 90, a PurchaseListType may be instantly included in a response for a request (Query) in HTTP transaction for purchase.

Or, being identical to a HTTP query method for EPG Metadata, a SGResponse element with a schema shown in FIG. 90 may be surely included in a response of a server about a query request. Also, EPG metadata fragments encapsulated in Service Guide Delivery Unit (SGDU) may be included in right after the SGResponse element.

In this case, a response of the purchase transaction may include SGDU that does not include Service Guide Delivery Descriptor lower than the SGResponse element and includes PurchaseOption Table fragment right after the SGResponse element, and then may be delivered.

A response about a purchase request according to the purchase transaction may include 200 ok message and a success value in a status attribute of SGResponse when purchase is successful, and if purchase is unsuccessful, may include an error code and a specific error message using a status attribute of SGResponse in a response body.

Moreover, since Error code is added with the extension of PrivateExt, the specific error message may be delivered.

Figures 91, 92:
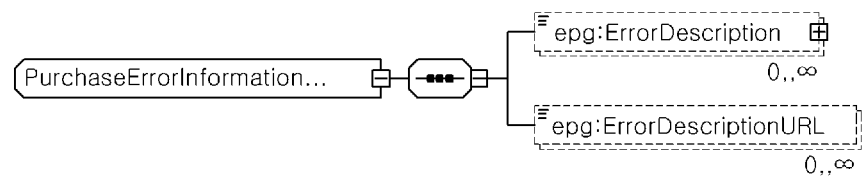

FIGS. 91 and 92 illustrate an XML schema structure of an element that extends PrivateExt and is added to describe in more detail an error message about eh purchase transaction.

Referring to FIGS. 91 and 92, an ErrorDescription element represents a specific error message of a text form and may include one test description for each language.

Additionally, an ErrorDescriptionURL element designates URL including the error message to allow a user to confirm a specific error message after visiting a corresponding URL if a user wants.

An IPTV receiver according to an embodiment of the present invention, as described with reference to FIGS. 1 to 92, may perform purchase transaction according to a request of a user after receiving metadata including purchase related information.

For this, the IPTV receiver may display the received purchase related information and may provide it to a user, may receive a selection of an IPTV product that a user wants to purchase, may request a purchase by using a purchase identifier (e.g., offerId) for identifying a corresponding purchase information about the purchase determined product, and then may store purchase history information about the purchased product in a user profile for future consumption.

In more detail, the IPTV receiver may receive EPG metadata of a structure described with reference to FIGS. 8 to 58 and may acquire purchase information such as purchase price and condition from the received EPG metadata.

Additionally, the IPTV receiver may separate metadata of a structure described with reference to FIGS. 85 to 92 from metadata about content and then may receive them to acquire information purchase conditions.

Moreover, a method that an IPTV receiver performs purchase related requests by using the received purchase information may use a purchase transaction mechanism described with reference to FIGS. 59 to 84.

Figure 93:
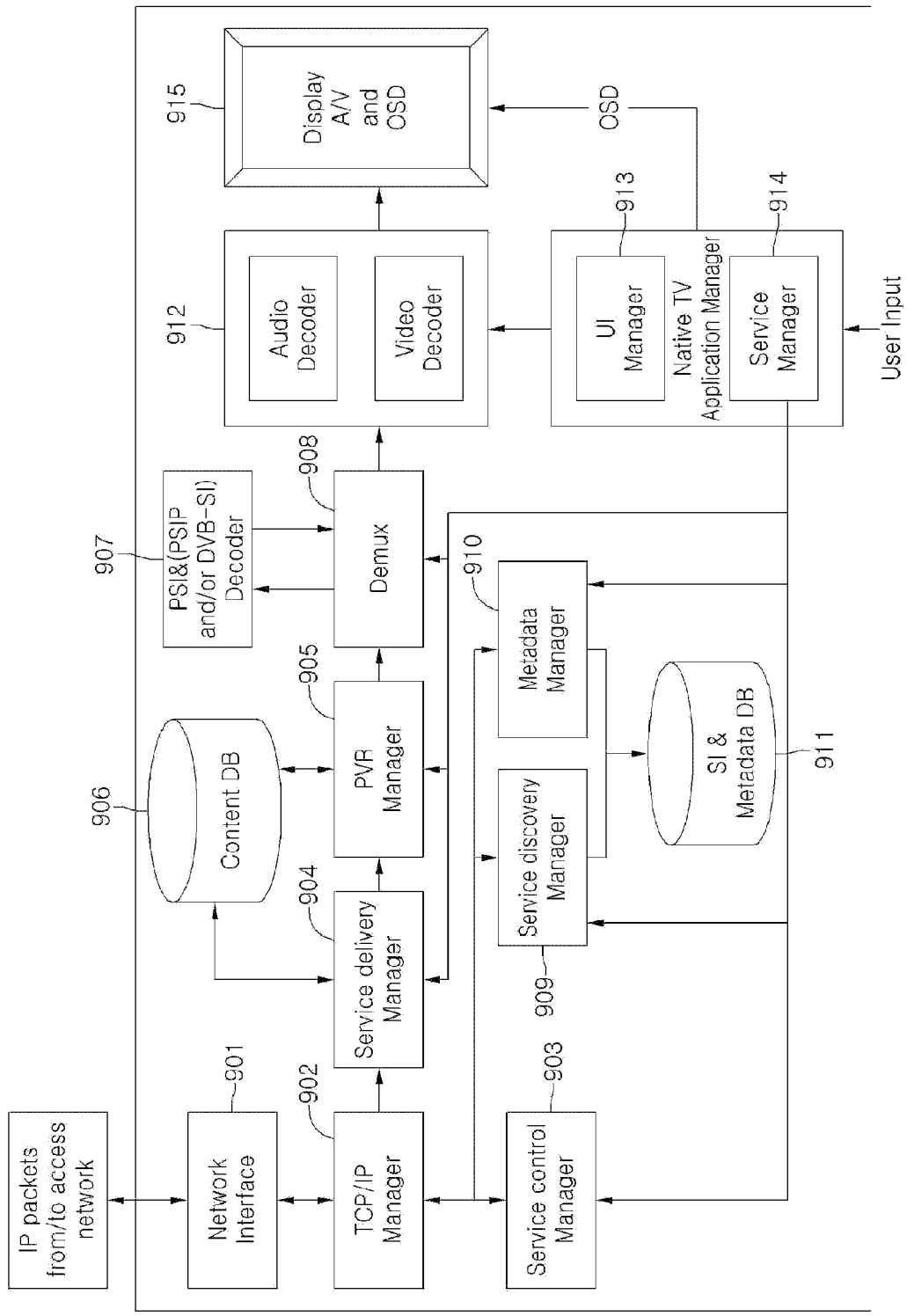
FIG. 93 is a diagram showing a network device according to an embodiment.

For example, a network interface 901 of the IPTV receiver shown in FIG. 93 may receive EPG metadata including purchase price and condition for purchase available offering and an identifier for identifying a corresponding offering.

Additionally, a Service Control Manager 903 of the IPTV receiver shown in FIG. 93 may request the purchase of a corresponding offering by using an identifier about offering that a user wants to purchase based on a purchase transaction method according to the above embodiment of the present invention and may receive a response returning from the purchase request.

Moreover, the returning response may represent whether the requested purchase is successful or unsuccessful.

Hereinafter, referring to FIGS. 93 and 94, a configuration of an IPTV receiver according to an embodiment of the present invention will be described in more detail.

FIG. 93 is a diagram showing a network device according to an embodiment of the present invention.

A Network Interface 901 performs reception/transmission of IPTV packets. The network interface 901 may correspond to physical & data link layers.

A TCP/IP Manager 902 is responsible for end-to-end (source to destination) packet delivery. The TCP/IP manager 902 classifies each packet into an appropriate protocol manager.

A Service Delivery Manager 904 is responsible for handling real-time streaming data and downloading content. The service delivery manager 904 is also responsible for retrieving content from the Content DB for later consumption. RTP/RTCP (Real-Time Transport Protocol/RTP Control Protocol) may be used with MPEG-2 TS. MPEG-2 packets are encapsulated in RTP. The service delivery manager 904 parses RTP packets and sends the parsed transport packets to a DEMUX. The service delivery manager 904 sends feedback regarding network reception quality using RTCP. MPEG-2 transport packets may be carried directly in UDP without RTP. For content downloading, HTTP or FLUTE protocol may be used as the delivery protocol.

A demultiplexer 908 performs de-multiplexing of audio, video and PSI tables from input transport packets. The demux 908 controls the de-multiplexing for PSI tables by the PSI Decoder. The demux 908 forms the sections of the PSI tables and sends them to the PSI Decoder. The demux 908 controls de-multiplexing of A/V transport packets.

A PSI & (PSIP and/or DVB-SI) Decoder 907 may correspond to a PSI (and PSIP/DVB-SI) Control Module. The PSI & (PSIP and/or DVB-SI) Decoder 907 sets PIDs for PSI tables and PSIP/DVB-SI tables to DEMUX. The PSI & (PSIP and/or DVB-SI) Decoder 907 decodes the private sections of PSI and (PSIP and/or DVB-SI) sent by the DEMUX. The decoding result is used to de-multiplex input transport packets. (e.g., set Audio and Video PID to DEMUX.)

An Audio and Video Decoder 912 decodes audio and video elementary stream packets.

An A/V and OSD Displayer 915 receives audio and video data from the A/V Decoder. The A/V and OSD Displayer 915 controls video and audio data and displays the video data on a screen and outputs the audio data through speakers. The A/V and OSD Displayer 915 controls OSD (On Screen Display) Graphic data.

A Native Application manager and UI (User Interface) Manager 913 operates the Graphical User Interface on the TV Screen, receives user keys input via remote control or front panel, and manages the states of the whole TV system.

A Service Manager 914 controls all the other managers related to the services like Service control manager, Service delivery manager, IG-OITF client, Service Discovery manager, and Metadata manager. The service manager 914 is responsible for serving IPTV services.

An SI & Metadata DB 911 is a database for Service Discovery information and Metadata related to the services.

An SD (Service Discovery) Manager 909 enables discovery of IPTV services over a bi-directional IP network. The SD manager 909 provides all the information for selecting services.

A Service Control Manager 903 is responsible for selecting and controlling services and managing sessions. The service control manager 903 selects live broadcasting services, using IGMP or RTSP protocol. The service control manager 903 selects VOD content, using RTSP protocol. If using IMS, SIP protocol is used to initiate and manage sessions through the IMS Gateway. RTSP protocol can be used to control the delivery of broadcast TV and audio as well as for on-demand delivery. RTSP protocol uses a persistent TCP connection and allows trick mode control during real-time media streaming.

A Content DB 906 is a database for content which may be delivered via a content download system or may be recorded from live media TV.

A PVR manager 905 is responsible for recording and playing live streaming content. The PVR manager 905 gathers all the necessary metadata of the recorded content and generates additional information to improve the user experience (e.g. thumbnail image, index etc.). Furthermore, a metadata menager 910 controls metadata on EPG.

FIG. 94 is a diagram showing a network device according to another embodiment of the present invention.

FIG. 94 is a functional block diagram of modules of the network (e.g., an IPTV Terminal Function (ITF)). In FIG. 94, an arrow denoted by a solid line denotes a data path and an arrow denoted by a dotted line denotes a control signal path.

A modem module 1001 including a cable modem, a DSL modem, etc. is an interface for connecting the ITF to an IP network at a physical level, which demodulates a signal transmitted through a physical medium and restores a digital signal.

An Ethernet NIC 1002 restores the signal received through the physical interface to IP data.

An IP Network Stack 1007 handles each layer according to the IP protocol stack.

An XML parser 1009 parses an XML document of the received IP data.

A File Handler 1008 handles data, which is transmitted in the form of a file, of the received IP data using FLUTE or the like.

An SI Handler 1011 handles a portion corresponding to IPTV SI data of the received data in the form of the file and stores it in a storage.

An EPG Handler 1010 handles a portion corresponding to IPTV EPG data of the received data in the form of the file and stores it in the storage.

A Storage 1012 stores data such as SI or EPG.

An SI Decoder 1013 retrieves SI data from the storage, analyzes the SI data, and restores necessary information, if channel map information is necessary.

An EPG Decoder 1014 retrieves EPG data from the storage, analyzes the EPG data, and restores necessary information, if EPG information is necessary.

An ITF Operation Controller 1015 is a main controller for controlling the operation of the ITF, such as channel change or EPG display.

A Channel Service Manager 1016 receives an input from the user and manages operations such as channel change.

An Application Manager 1017 receives an input from the user and manages an Application service such as EPG display.

An MPEG-2 Demultiplexer 1003 extracts an MPEG-2 Transport Stream from the received IP datagram and delivers it to a corresponding module according to PIDs.

An MPEG-2 PSI/PSIP Parser 1004 extracts and parses PSI/PSIP data including information providing access to a program element, such as PID information of each (NV, etc.) of the MPEG-2 Transport Stream in the received IP datagram.

An A/V Decoder 1005 decodes the received audio and video data and delivers the decoded data to a display module 1006.

The above-described method for processing EPG data according the exemplary embodiments of the present invention can be written as computer programs and can be implemented in general-use computers that execute the programs using a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to an embodiment, an identifier for identifying purchase information regarding an IPTV CoD service is provided, the identifier is included in an Electronic Program Guide (EPG) metadata, and thus a content purchase service provided based on an IP can be efficiently searched and acquired.

According to another embodiment, information regarding a purchasable program or encoding properties of an program instance is included in the EPG metadata, and thus an IPTV receiver selects content suitable to it to play the selected content.

According to another embodiment, provided is an efficient purchase transaction method that requests purchase with a purchase identifier for identifying a purchasable IPTV product and purchase terms thereof, and efficiently acquires purchase history information.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A purchase transaction method for purchasing an Internet Protocol Television (IPTV) product, the method comprising:

receiving an Electronic Program Guide (EPG) metadata including a program information table and a purchase information table, wherein the EPG metadata has a level which is determined based on an amount of the EPG metadata, wherein a type of the level comprises list level, lightweight level, and full level, wherein information on the list level has a list of contents for rapid information acquisition, wherein information on the lightweight level is configured according to a terminal, wherein the information on the list level and the information on the lightweight level have more restricted information than information on the full level, wherein the program information table includes a purchase list element including a purchase list reference element, wherein the purchase list reference element includes a first offering identifier, wherein the purchase information table includes a purchase information element, and wherein the purchase information element includes a flag indicating whether viewer will be able to suspend viewing of a program and resume viewing of the program later without additional charge;

transmitting, to a purchasing server, the first offering identifier to request to make a purchase for an offering, wherein the offering is a combination of one or more products to be purchased and purchase terms for the products, wherein the first offering identifier is a globally unique identifier that identifies a combination of the product to which the purchase list element is attached and purchase terms of the purchase information element referenced by the purchase list reference element; and receiving, from the purchasing server, a response returned from the request to indicate success or failure of the requested purchase.

2. The method of claim 1, wherein the purchase list element further includes a purchase list item element for specifying purchase price and terms, and wherein the purchase list item element contains a second offering identifier.

3. The method of claim 2, wherein the second offering identifier is a globally unique identifier that identifies a combination of the product to which the purchase list element is attached and purchase terms of the purchase list item element.

4. The method of claim 2, wherein the purchase list element is contained in at least one of service information, content description information for one or more programs, and instance description information for a program instance.

5. The method of claim 3, wherein purchase item information includes a name for the purchase price and terms, and a locator for an image containing a description of the purchase price and terms.

6. The method of claim 2, wherein the EPG metadata contains service information that includes group purchase id reference information referencing purchase information in the purchase information table, and wherein the group purchase id reference information contains the second identifier that includes a group of services.

7. The method of claim 1, wherein the step of receiving comprises:

receiving specific fragments by using first key information about the first offering identifier and second key information about organization and type attributes of the first key information.

8. The method of claim 1, wherein the EPG metadata contains program information that includes media attribute information representing properties of a media encoding of the program when the program has multiple media encodings.

9. The method of claim 1, wherein the EPG metadata contains instance description information that includes media attribute information representing properties of a media encoding of a program instance when the program instance has multiple media encodings.

10. The method of claim 1, further comprising:

requesting a list of all offerings which has been purchased.

11. The method of claim 10, wherein the list includes offerings that have not expired or been fully consumed.

12. The method of claim 10, wherein a response to a request for the list of the purchased offerings includes purchased offer list information, and wherein the purchased offer list information contains product information about a product that is part of the purchased offering, purchase terms information of the purchased offering, and a unique identifier of the offering.

13. The method of claim 12, wherein the product information includes a title, a unique identifier and a type of the product that is part of the purchased offering.

14. The method of claim 10, wherein the step of requesting a list of all offerings which has been purchased is performed by a different device from a device used to purchase the purchased offering.

15. The method of claim 1, further comprising:

requesting for a list of one or more URIs representing media encodings of a specified CoD (Content on Demand) program.

16. The method of claim 15, wherein a response to a request for the list of one or more URIs includes URI list information, and wherein the URI list information contains URI information, audio and visual attributes information, and Secure execution environment profile information for each of the encodings.

17. The method of claim 16, further comprising:

selecting an encoding best suited to the audio and visual attributes information; and accessing the CoD program by using the URI information for a selected encoding.

18. An Internet Protocol Television (IPTV) receiver comprising:

a network interface configured to receive EPG metadata including a program information table and a purchase information table, wherein the program information table includes a purchase list element including a purchase list reference element, wherein the purchase list reference element includes a first offering identifier, and the purchase information table includes a purchase information element, wherein the purchase information element includes a flag indicating whether viewer will be able to suspend viewing of a program and resume viewing of the program later without additional charge, wherein the EPG metadata has a level which is determined based on an amount of the EPG metadata, wherein a type of the level comprises list level, lightweight level, and full level, wherein information on the list level has a list of contents for rapid information acquisition, wherein information on the lightweight level is configured according to a terminal, and wherein the information on the list level and the information on the lightweight level have more restricted information than information on the full level; and a service control manager configured to transmit, to a purchasing server, the first offering identifier to request a purchase for an offering, wherein the offering is a combination of one or more products to be purchased and purchase terms for the products, wherein the first offering identifier is a globally unique identifier that identifies a combination of the product to which the purchase list element is attached and the purchase terms of the purchase Information element referenced by the purchase list reference element, and wherein the network interface receives a response returned from the request to indicate success or failure of the requested purchase from the purchasing server.

19. The IPTV receiver of claim 18, wherein the purchase list element further includes a purchase list item element for specifying purchase price and terms, and the purchase list item element contains a second offering identifier, wherein the second offering identifier is a globally unique identifier that identifies the combination of the product to which the purchase list element is attached and the purchase terms of the purchase list item element, and the purchase list element is contained in at least one of service information, content description information for one or more programs and instance description information for a program instance.

20. The IPTV receiver of claim 19, wherein the purchase list item element includes a name for the purchase price and terms, and a locator for an image containing a description of the purchase price and terms.

21. The IPTV receiver of claim 19, wherein the EPG metadata contains service information that includes group purchase id reference information referencing purchase information in the purchase information table, and wherein the group purchase id reference information contains the second identifier of the offering that includes a group of services.

22. The IPTV receiver of claim 18, wherein the EPG metadata contains program information that includes media attribute information representing properties of a media encoding of the program when the program has multiple media encodings, and instance description information that includes media attribute information representing properties of a media encoding of the program instance when the program instance has multiple media encodings.

23. The IPTV receiver of claim 18, wherein the service control manager is further configured to:
   request a list of all offerings which has been purchased,
   wherein a response to a request for a list of the offerings which has been purchased includes purchased offer list information, and
   wherein the purchased offer list information contains product information about a product that is part of the purchased offering, purchase terms information of the purchased offering, and a unique identifier of the offering.

24. The IPTV receiver of claim 18, wherein the service control manager is further configured to:
   request a list of one or more URIs representing media encodings of a specified CoD (Content on Demand) program,
   wherein a response to the request for the list of the URIs includes URI list information, and
   the URI list information contains URI information, audio and visual attributes information, and Secure execution environment profile information for each of the encodings.

25. The IPTV receiver of claim 24, wherein the service control manager selects an encoding best suited to the audio and visual attributes information, and accesses the CoD program by using the URI information for the selected encoding.

* * * * *